INVENTORS.
BRUNO A. WITTKUHNS.
GILBERT F. HILL.
BY
ATTORNEY.

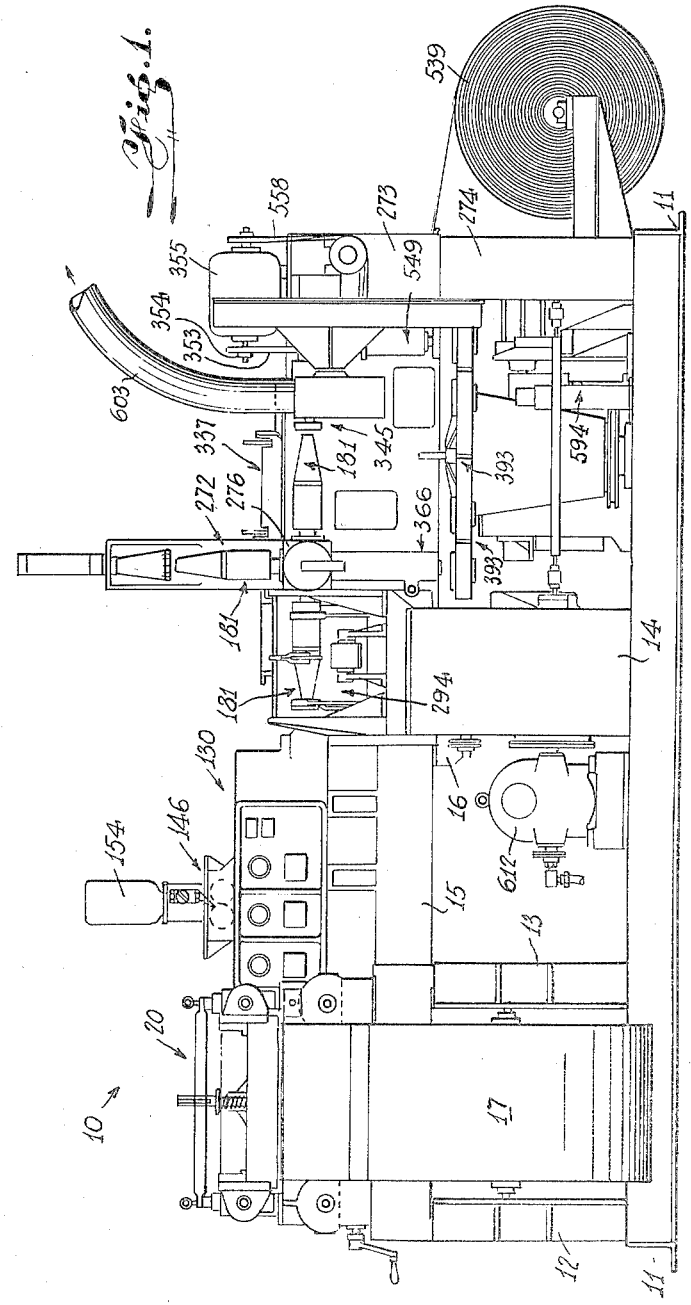

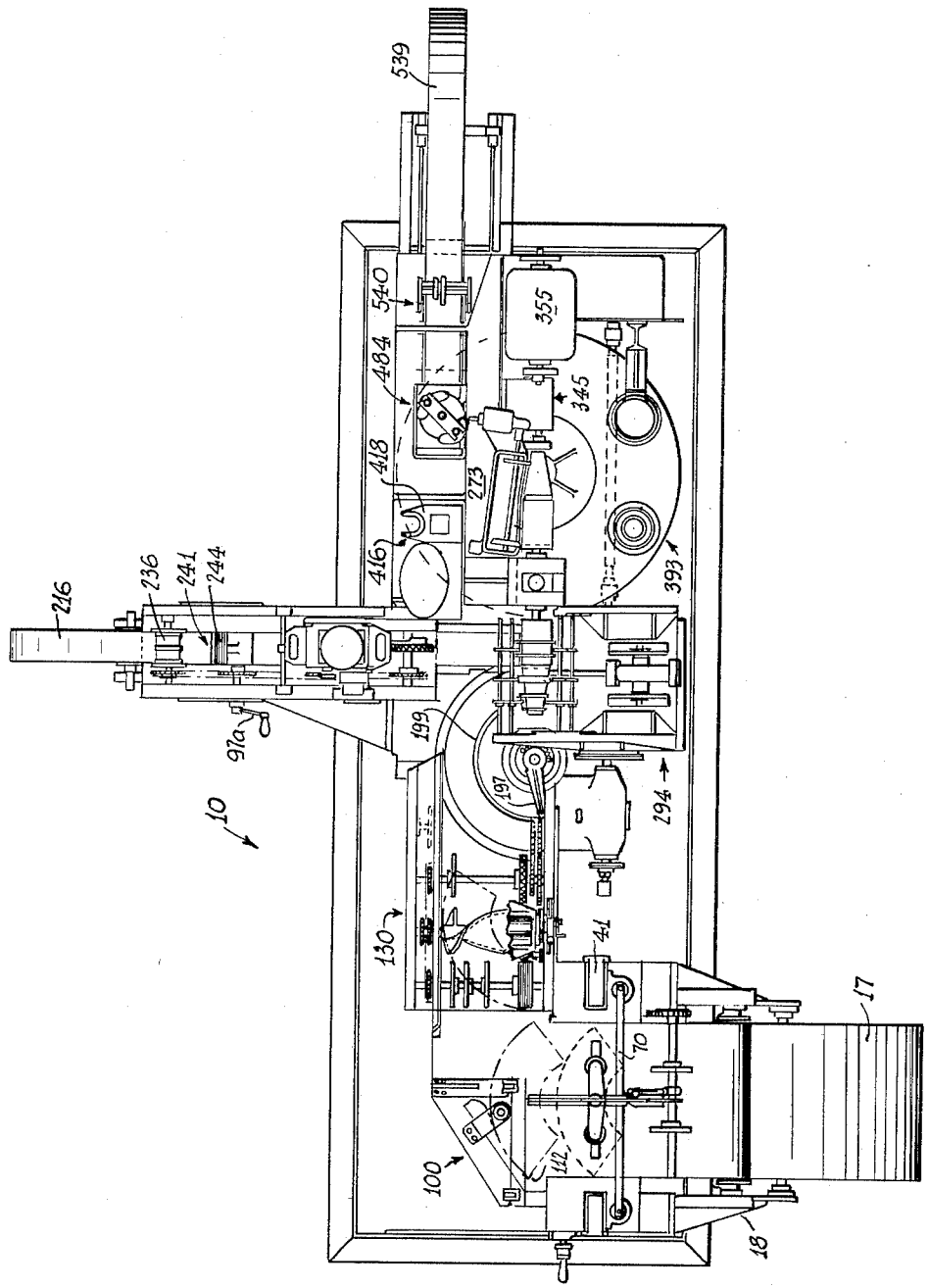

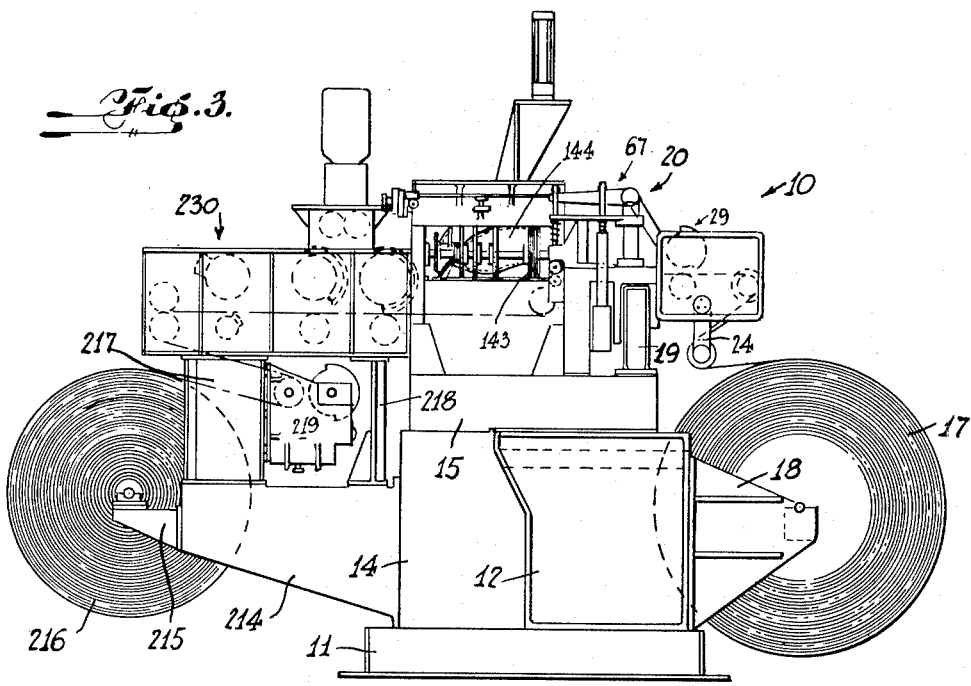
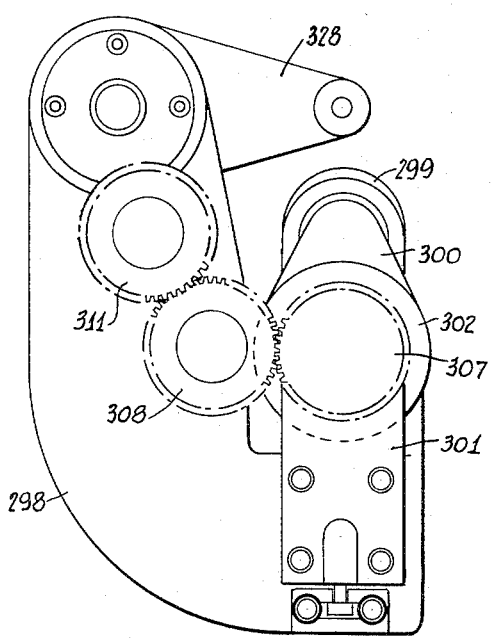

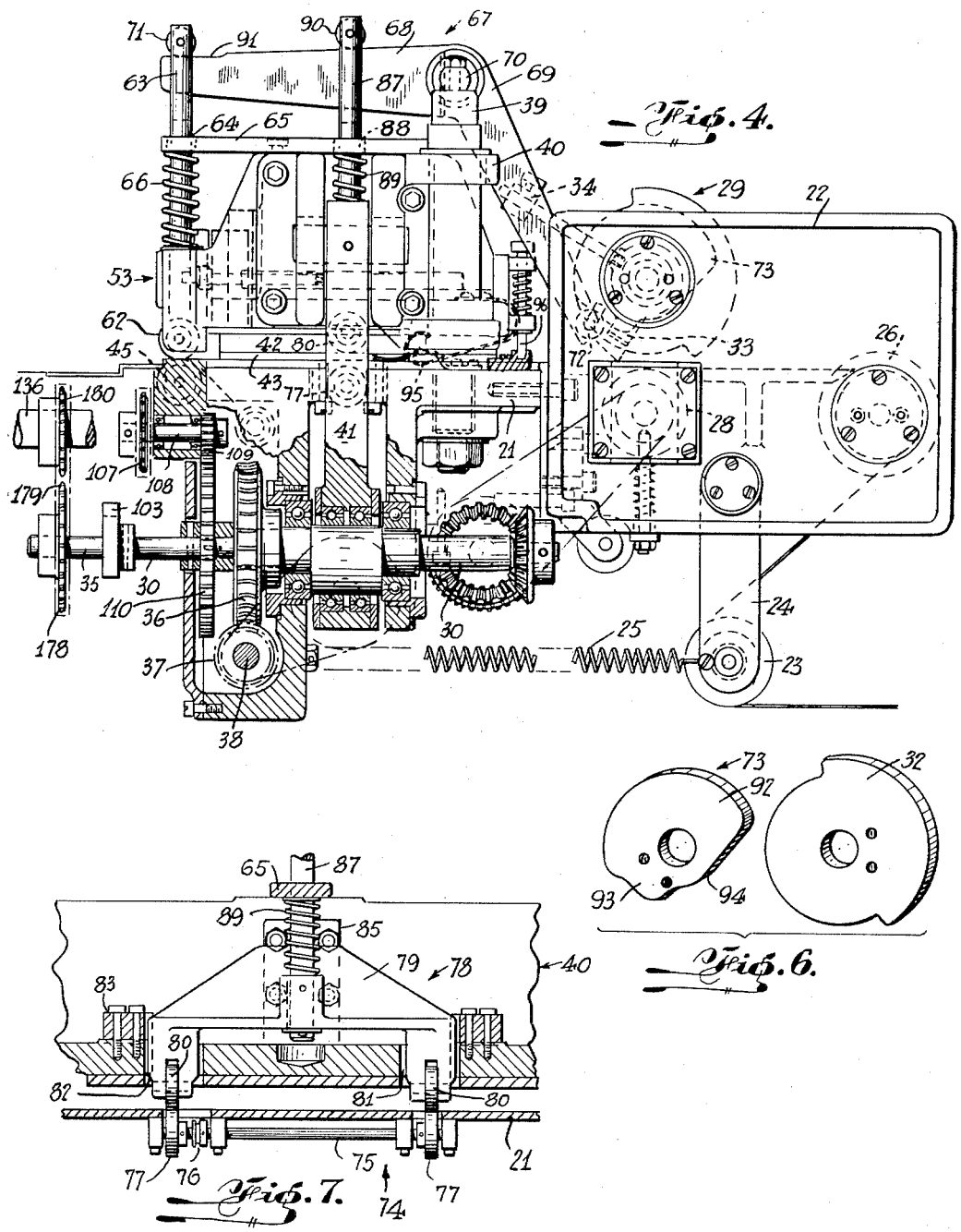

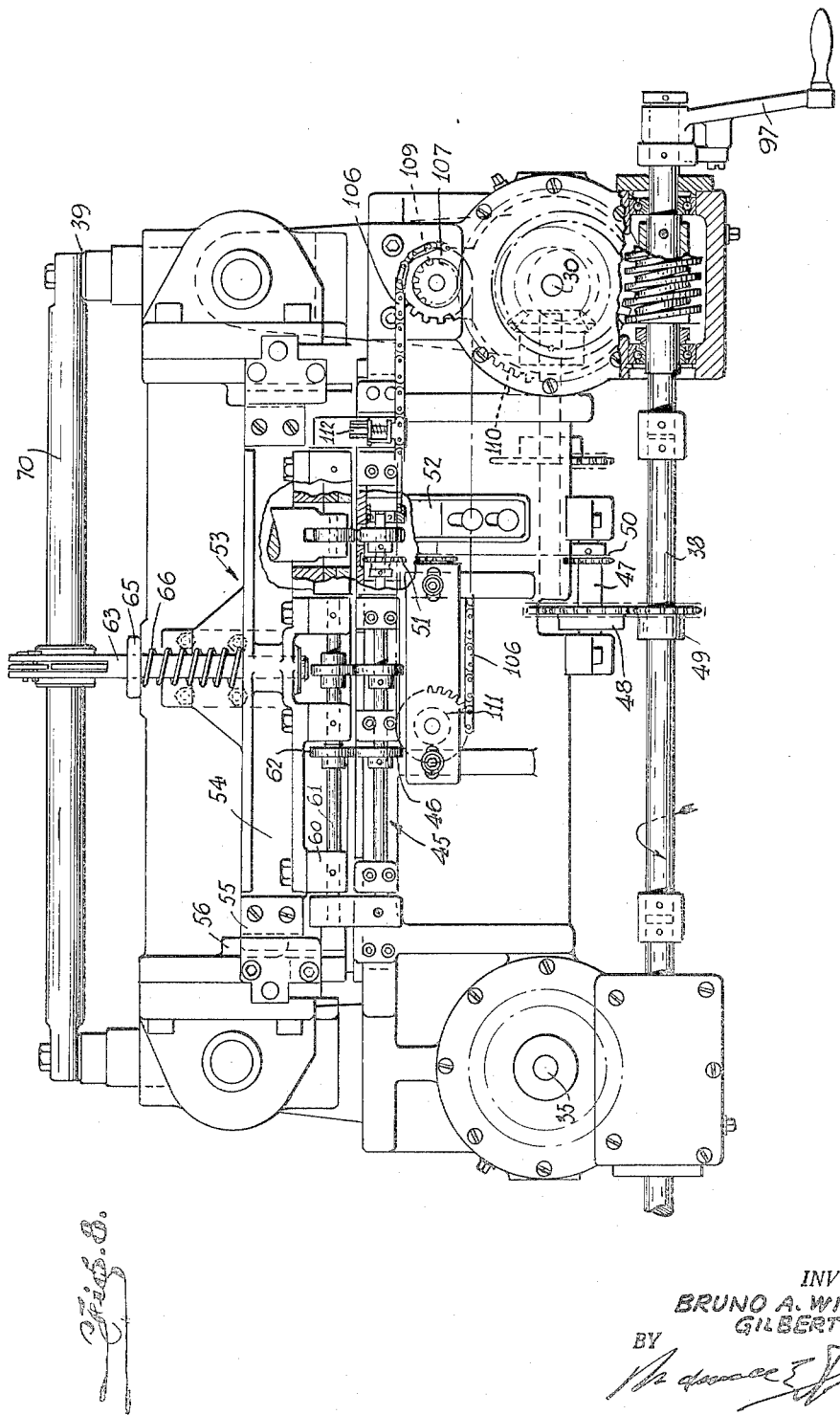

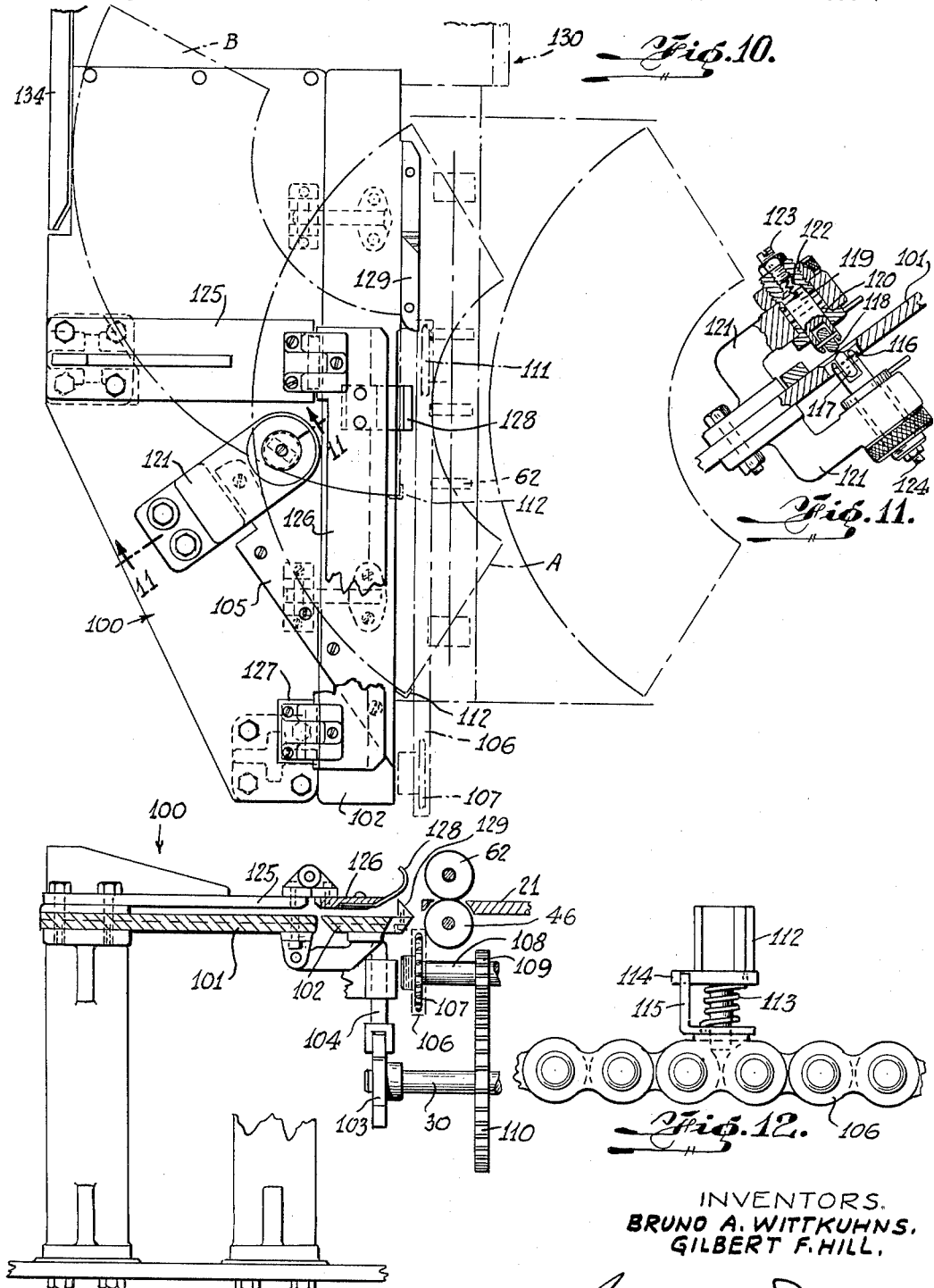

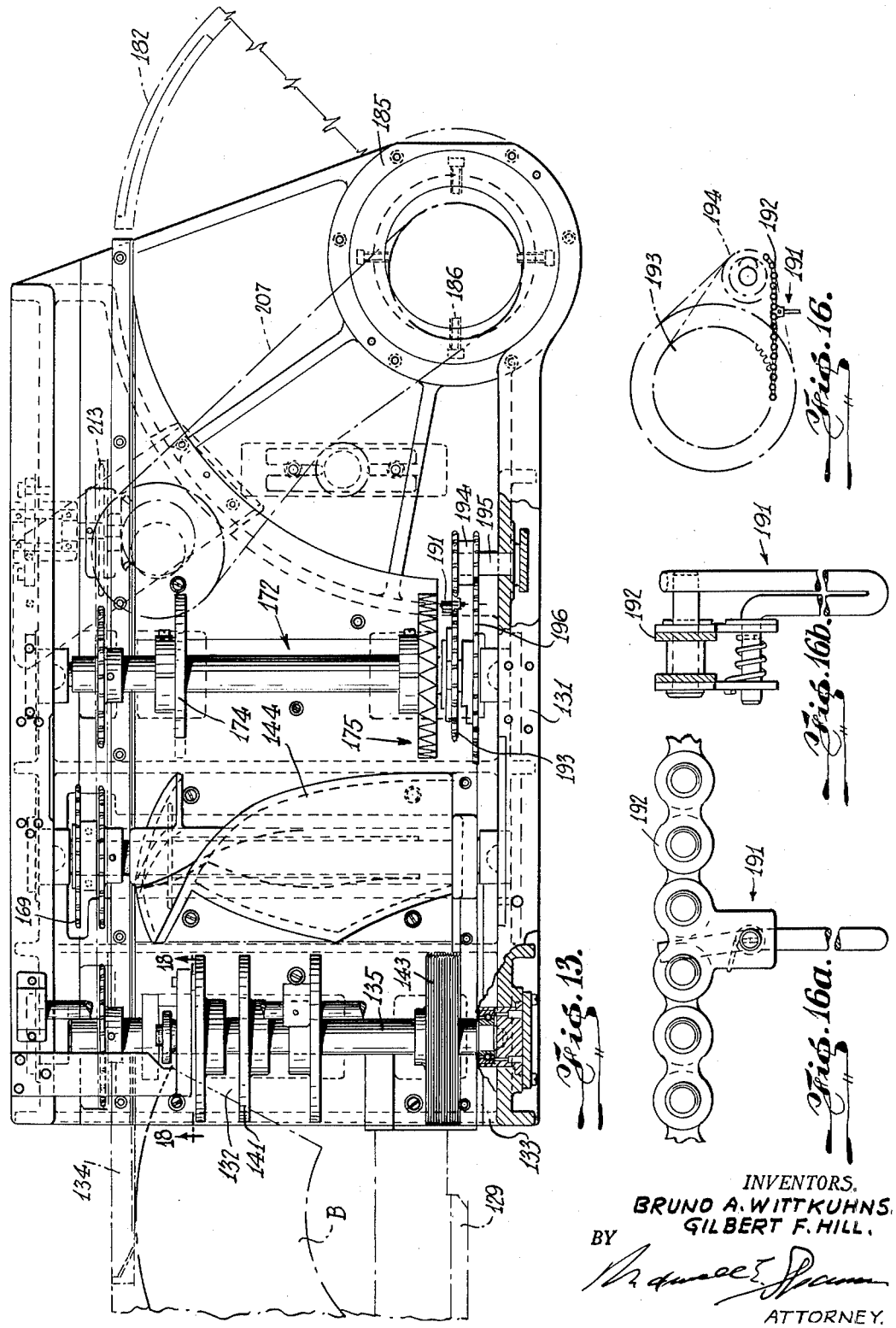

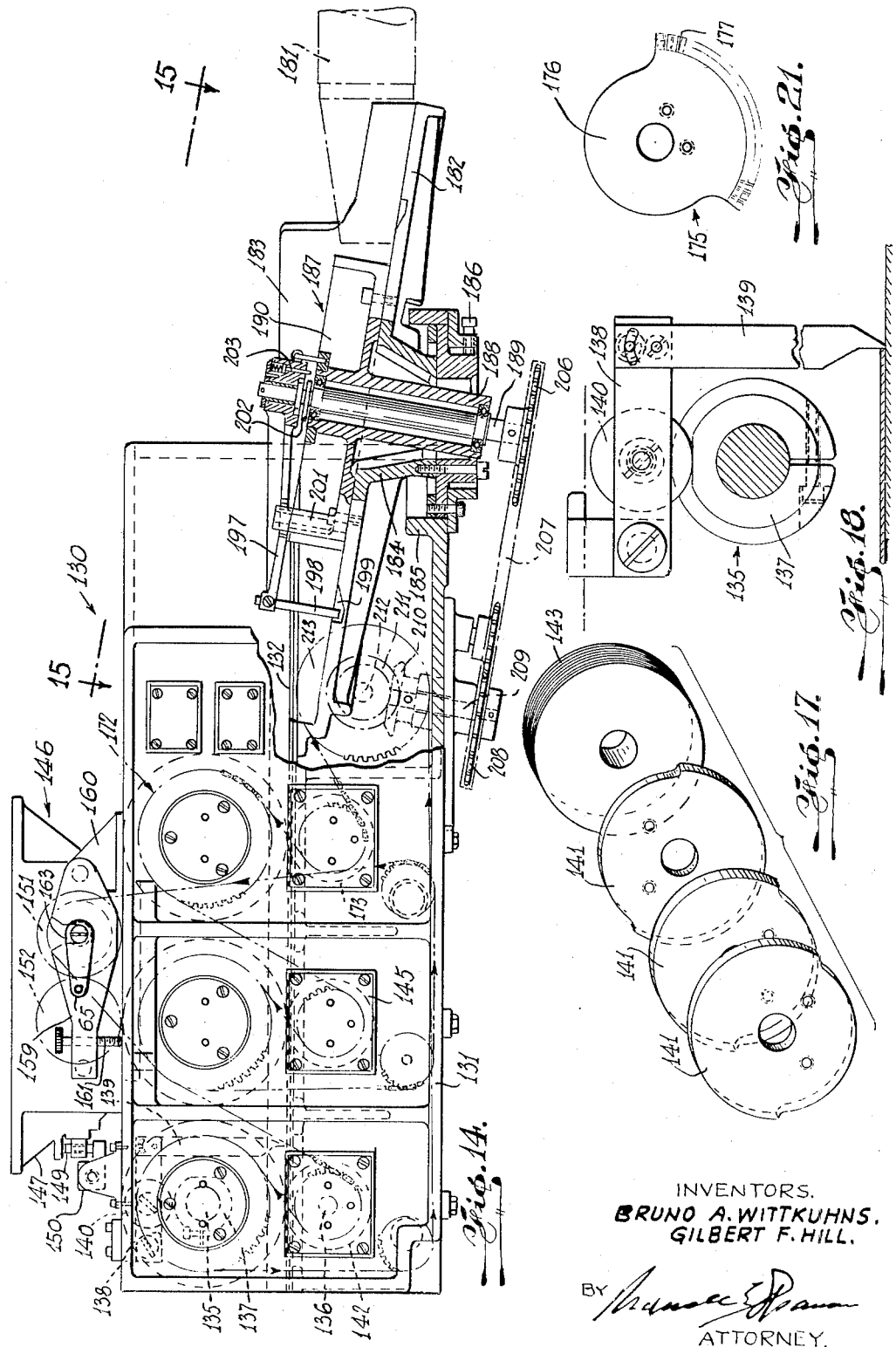

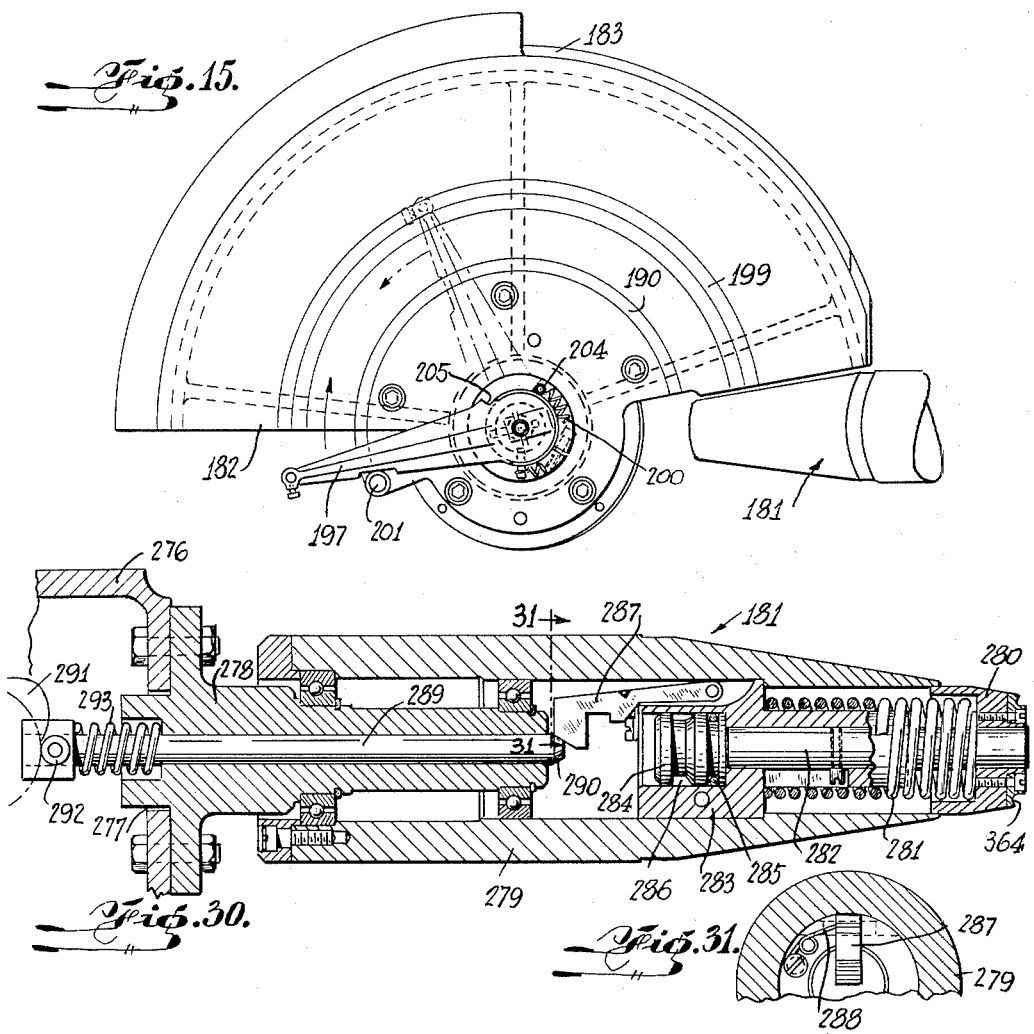

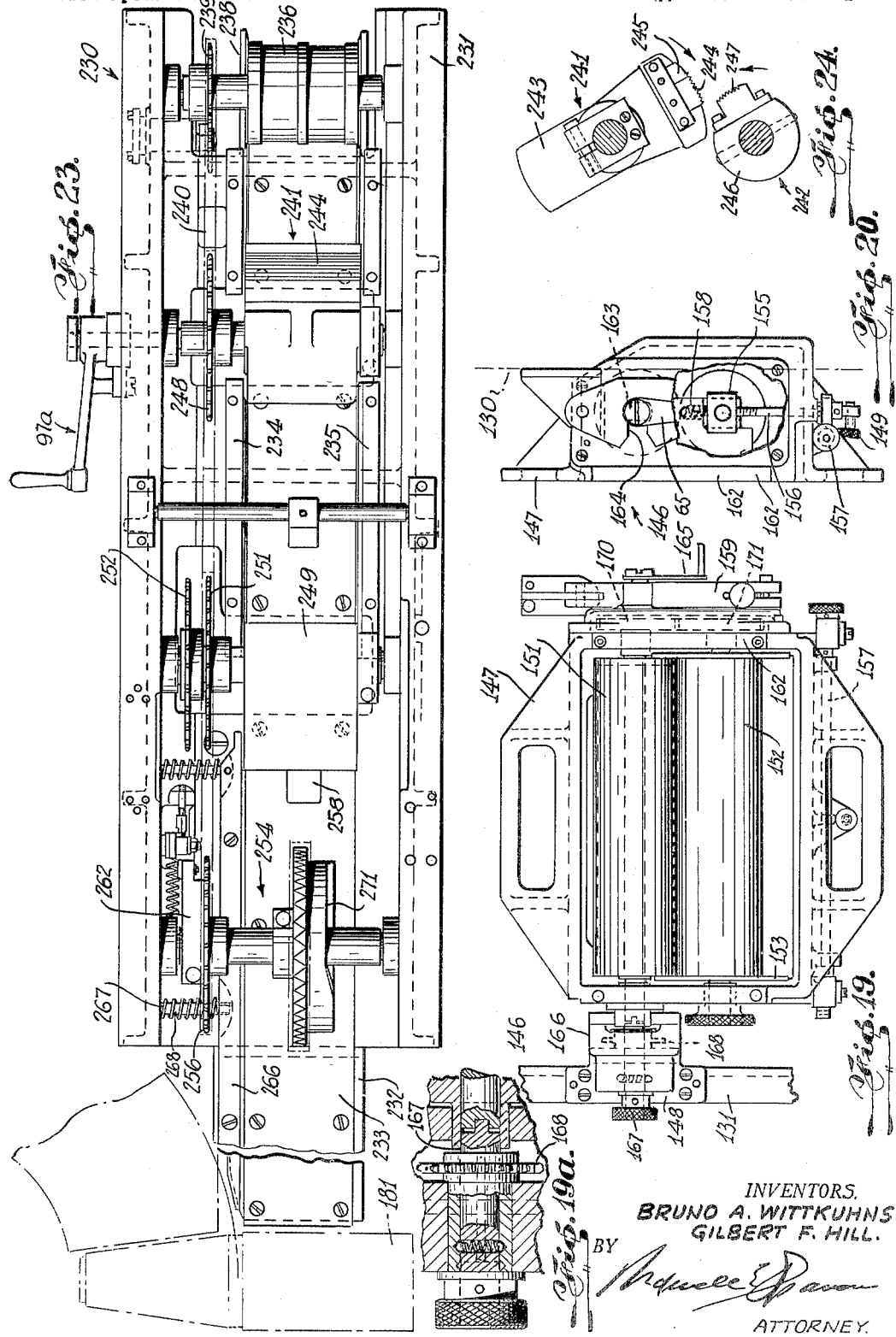

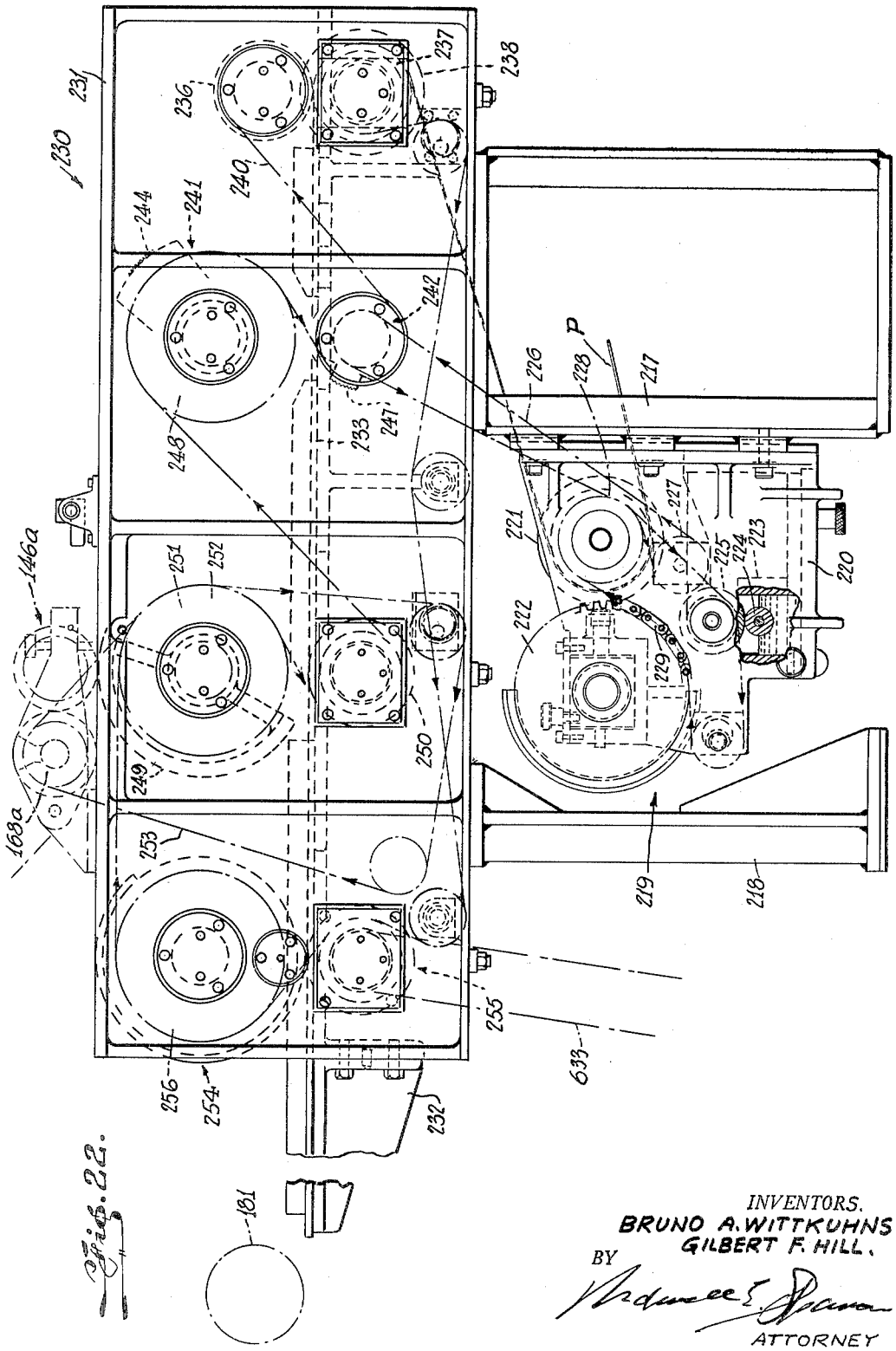

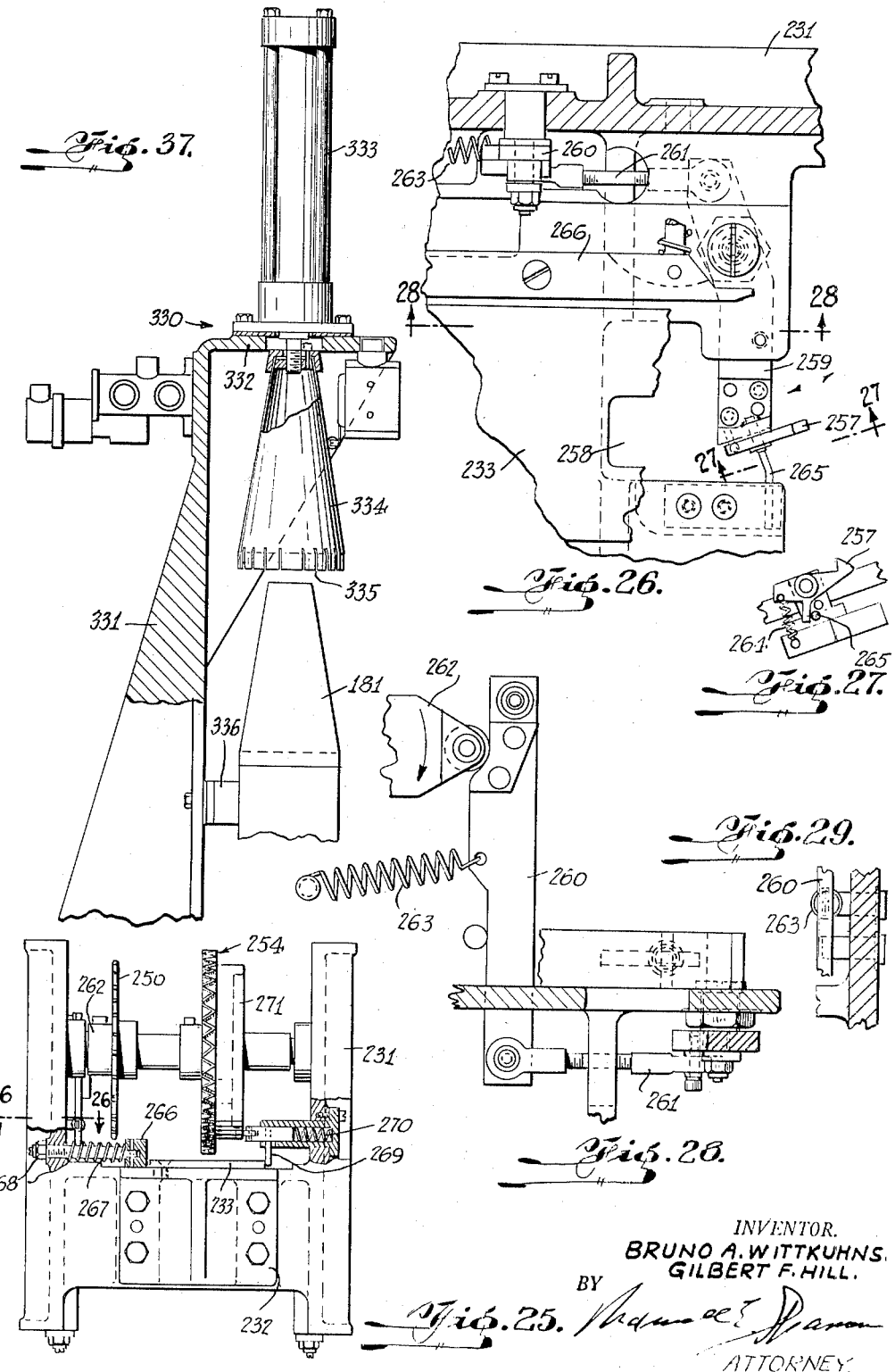

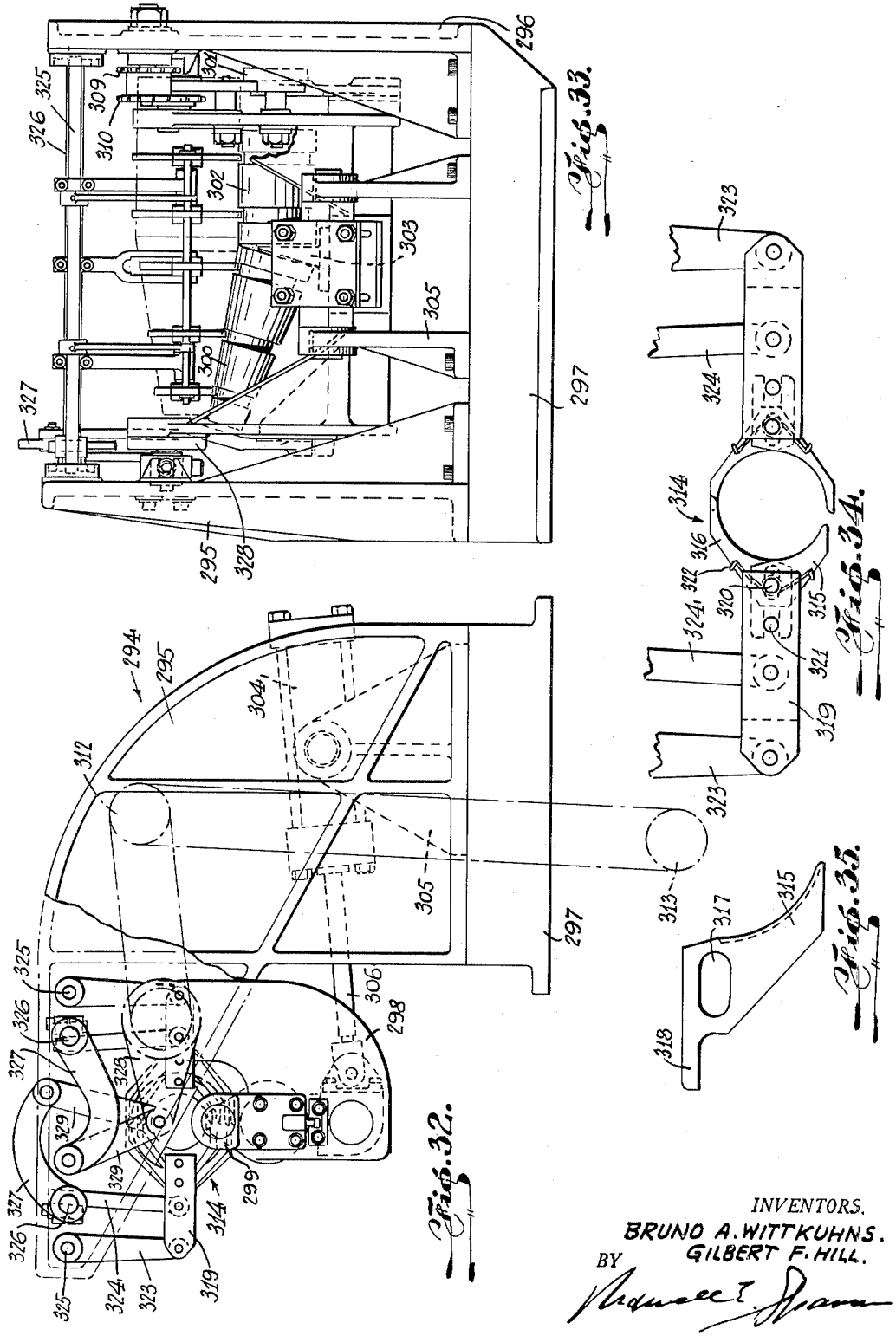

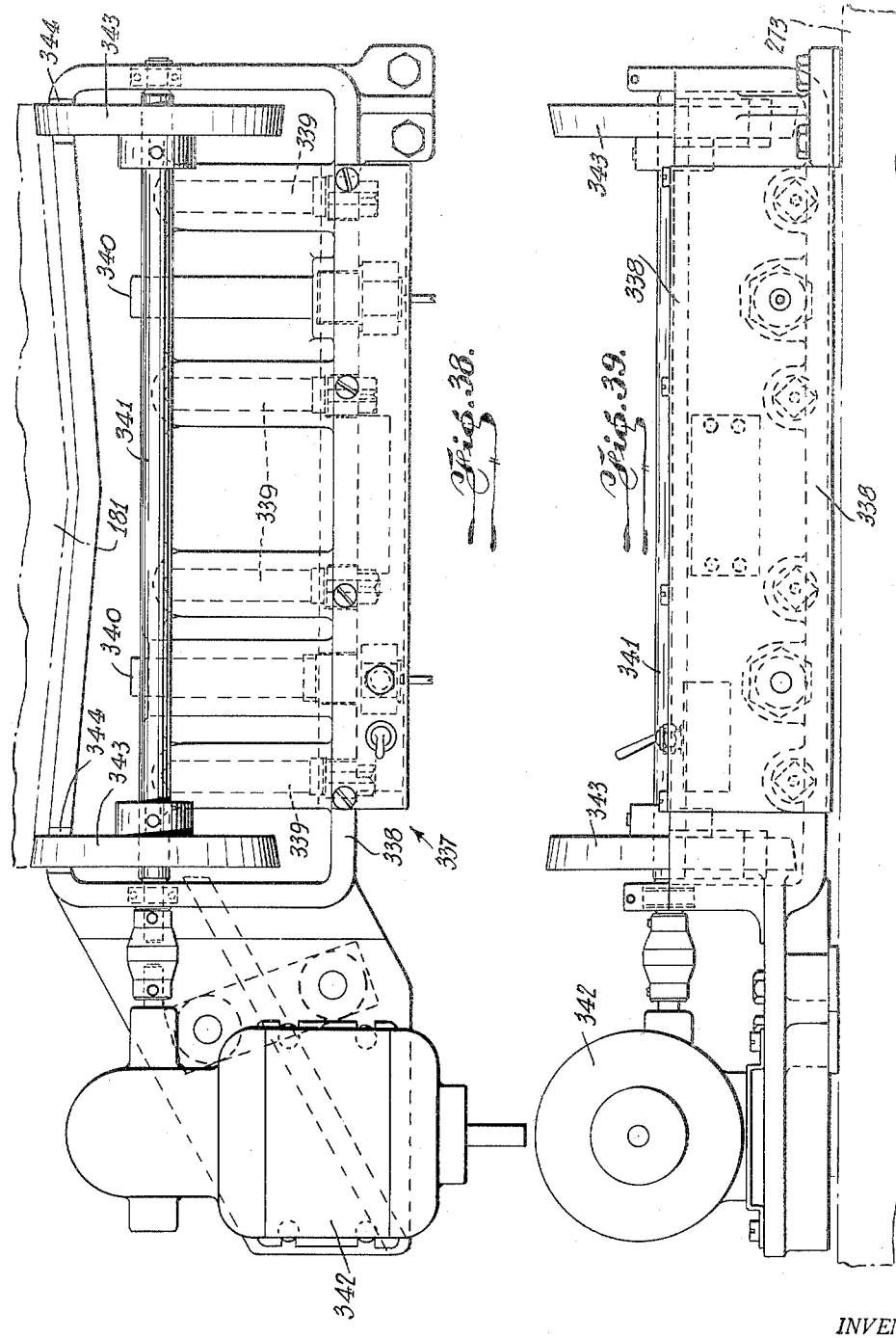

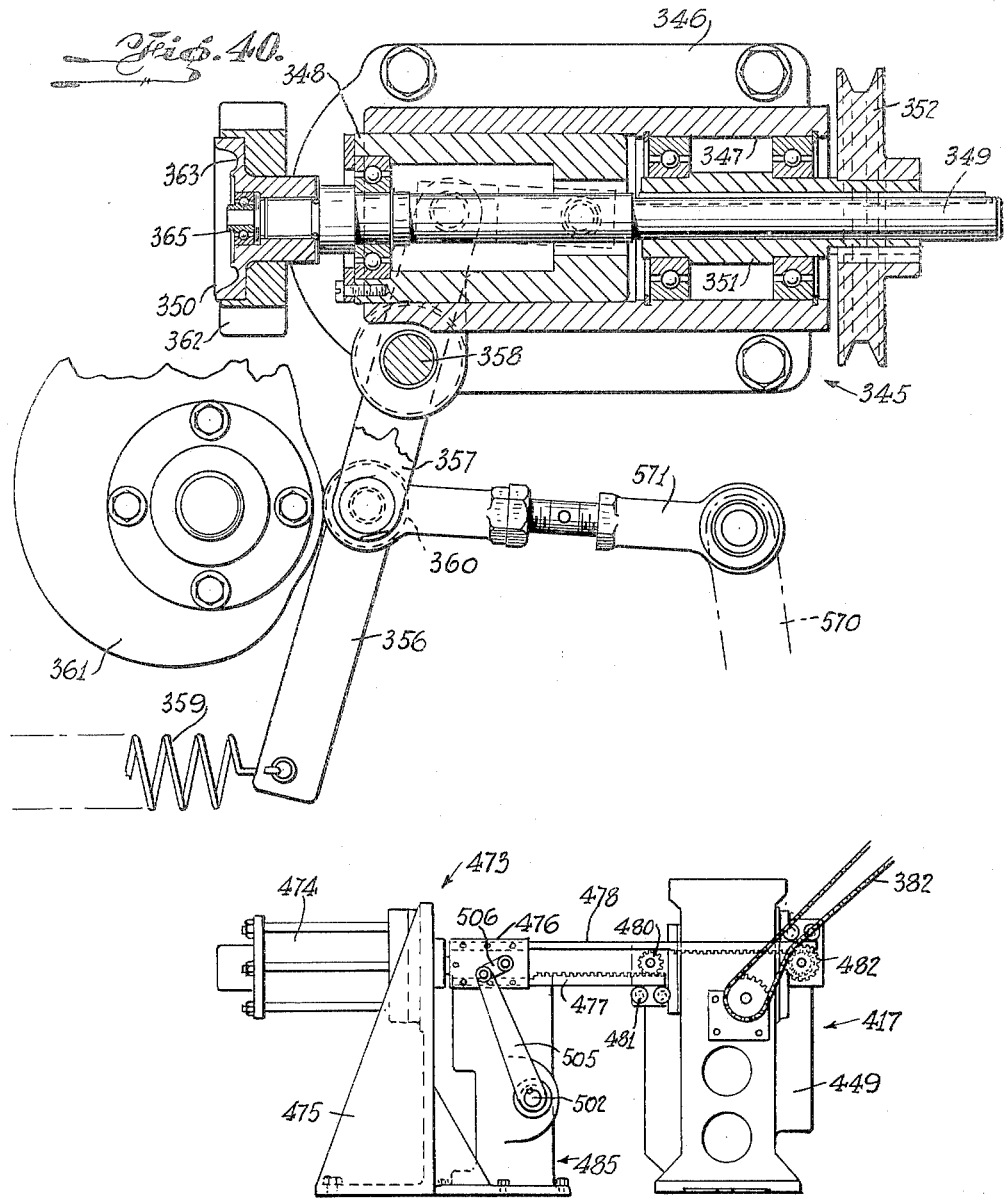

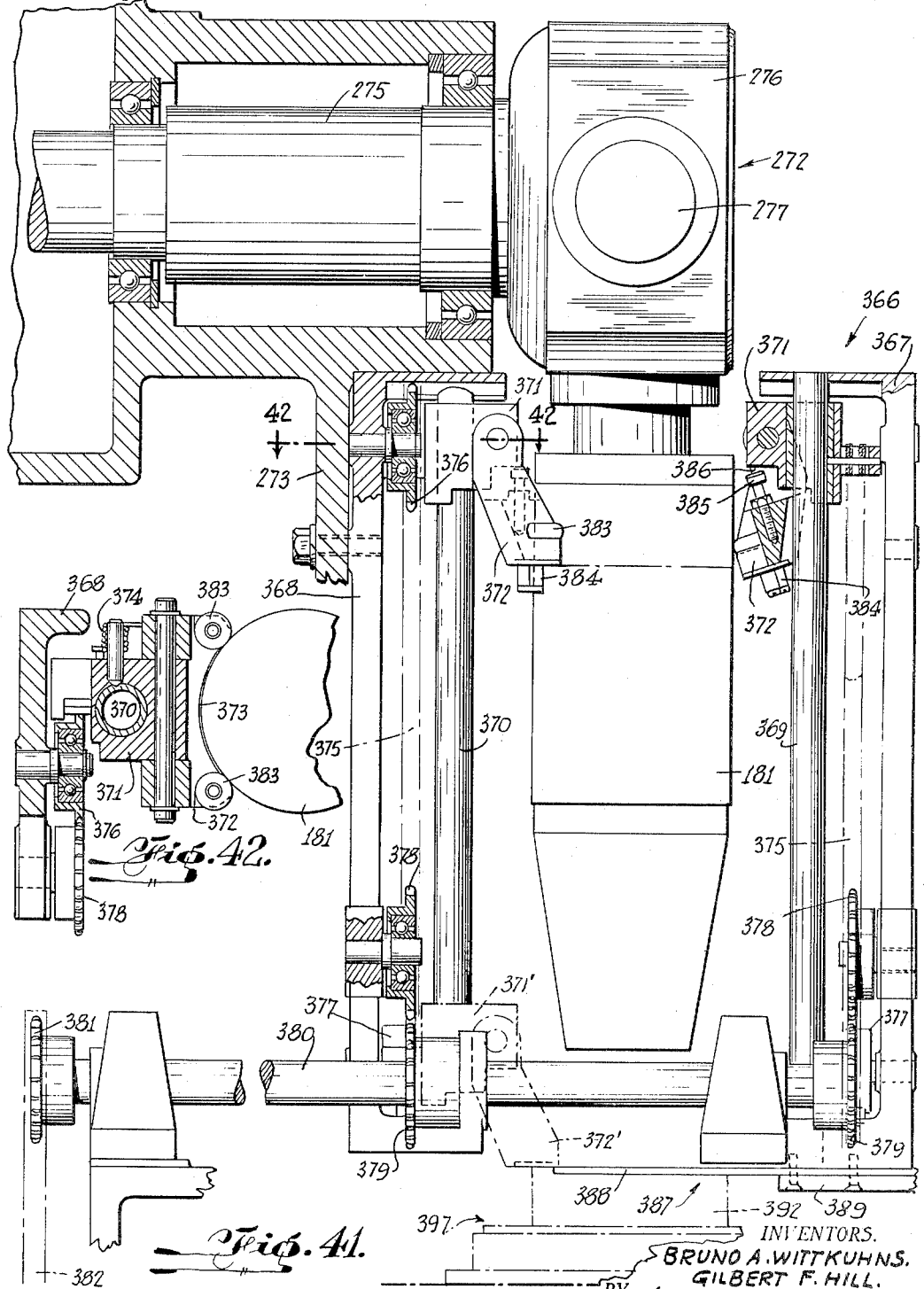

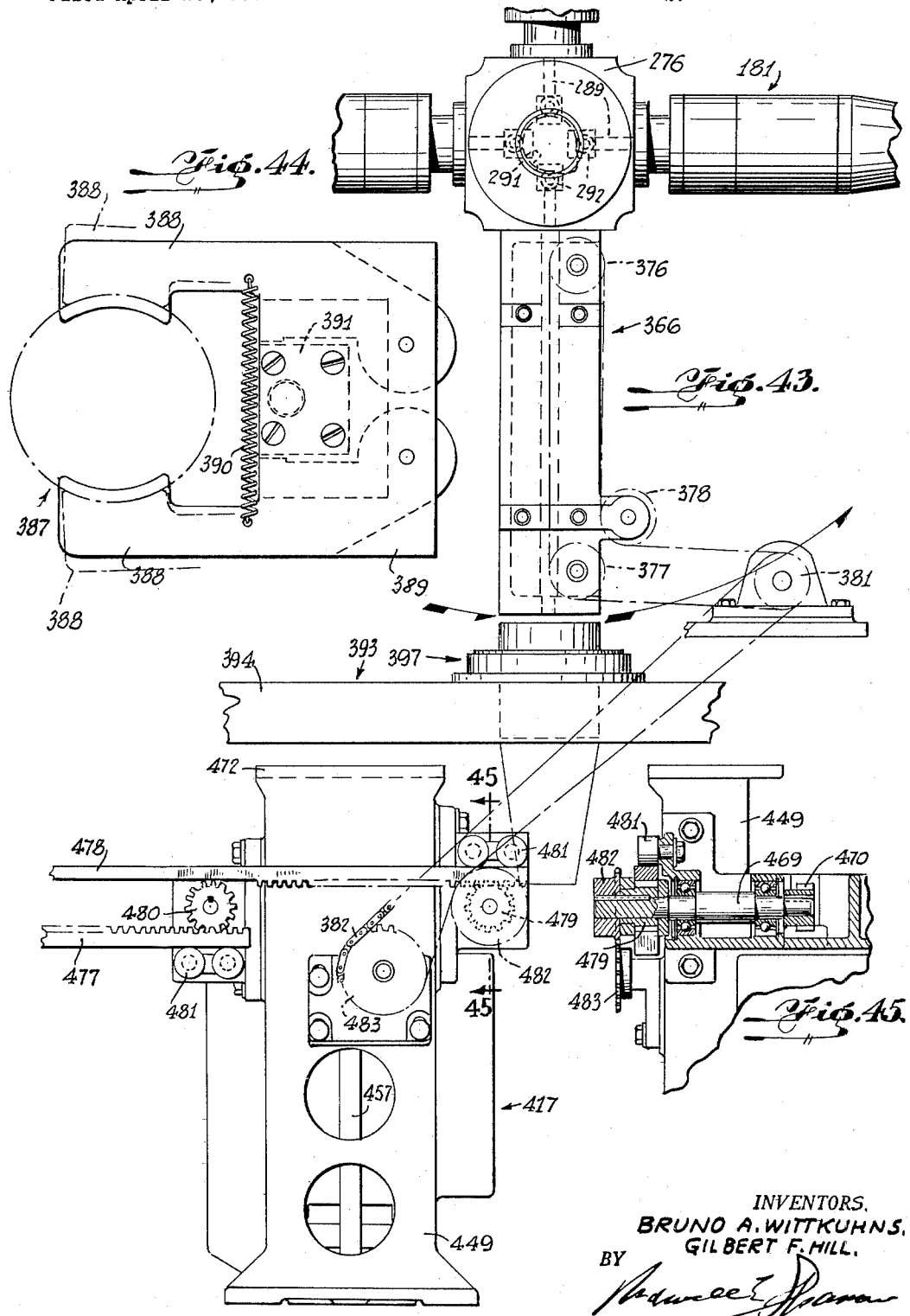

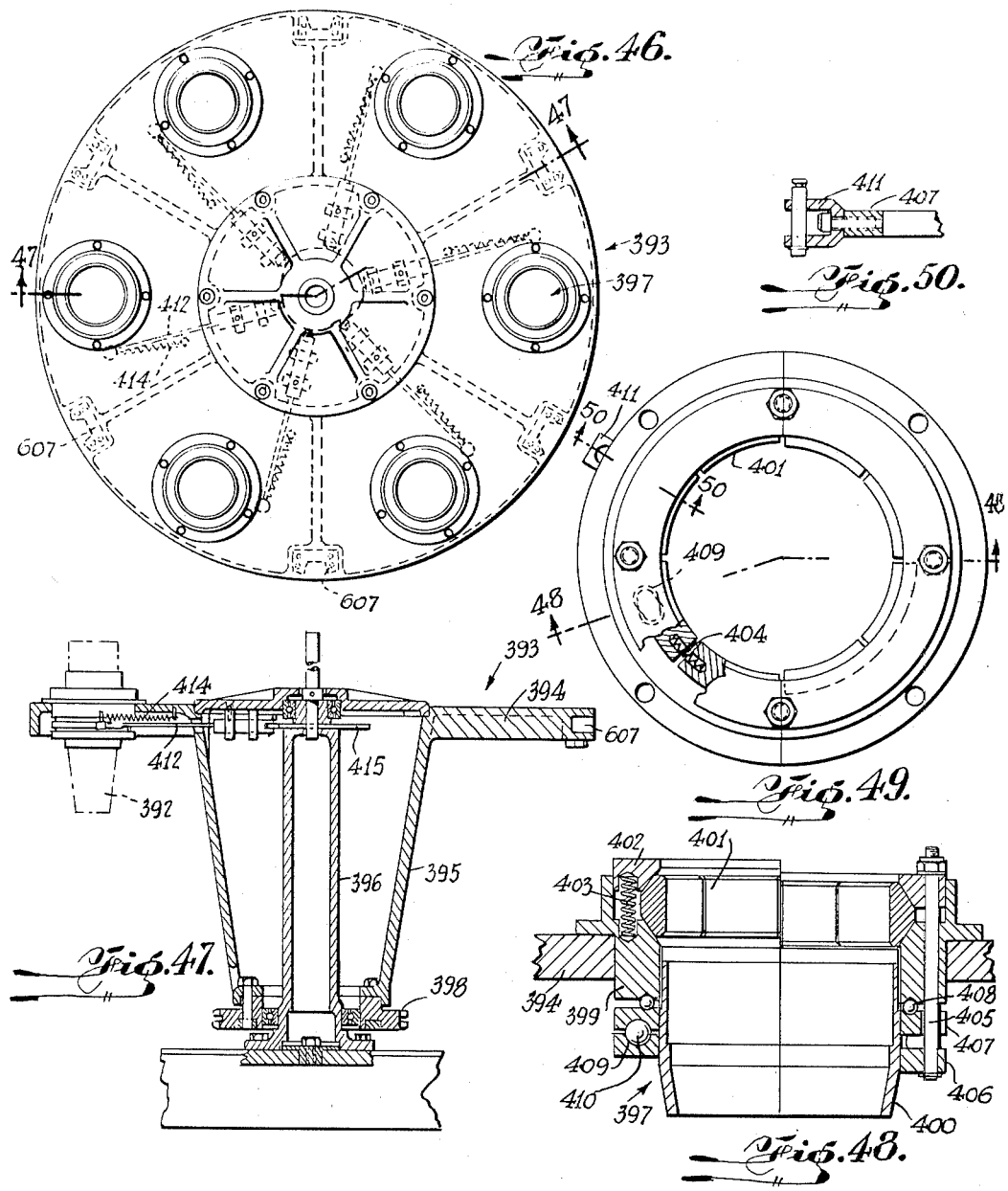

Oct. 4, 1955    B. A. WITTKUHNS ET AL    2,719,466
MACHINE FOR MAKING PAPER CONTAINERS
Filed April 26, 1951    29 Sheets-Sheet 20
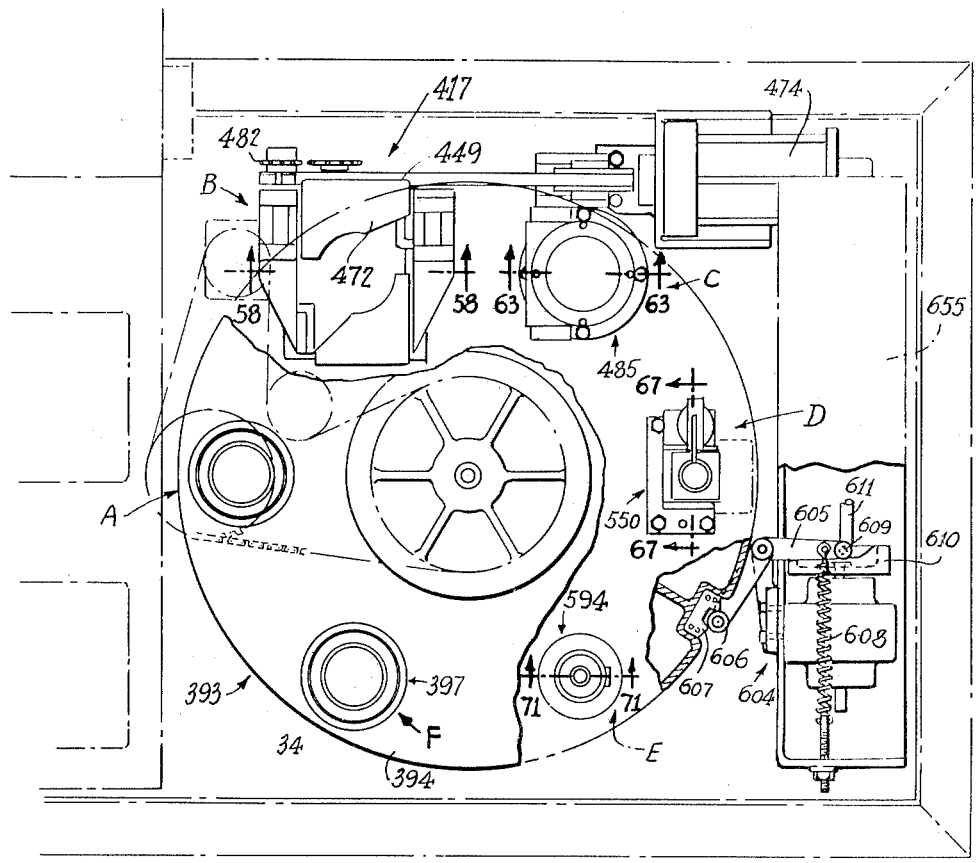
Fig. 52.
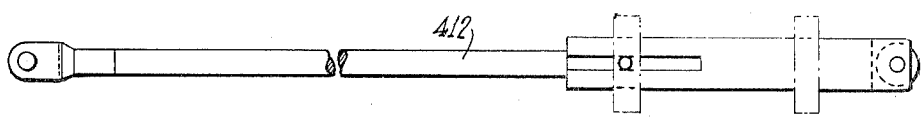
Fig. 51.
INVENTORS.
BRUNO A. WITTKUHNS,
GILBERT F. HILL.
BY
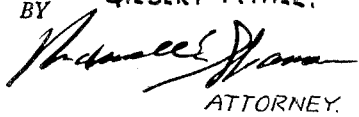
ATTORNEY.

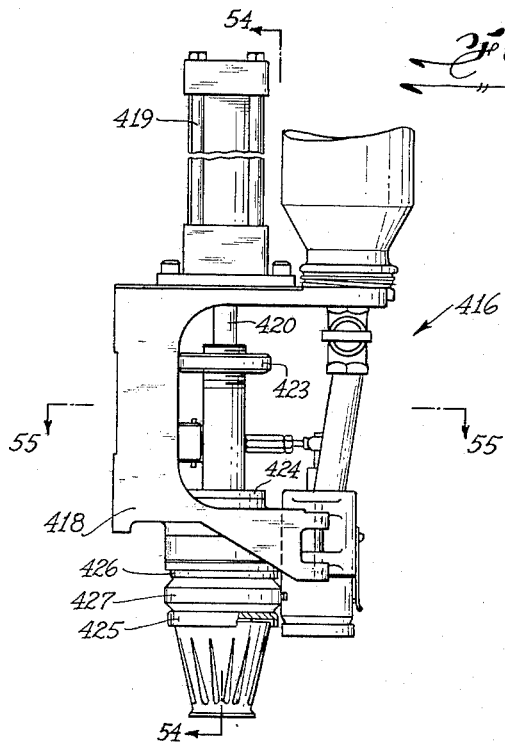
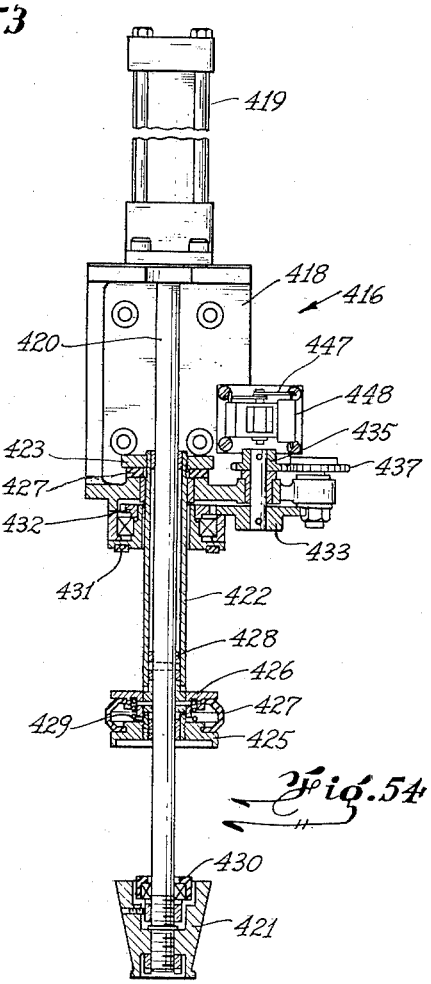
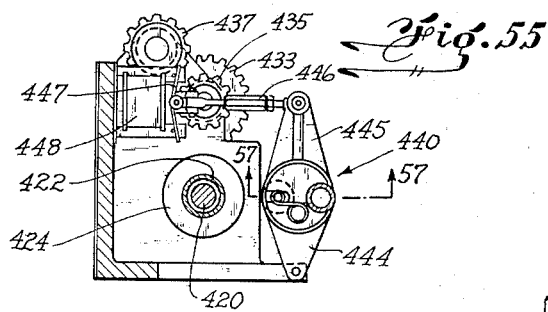
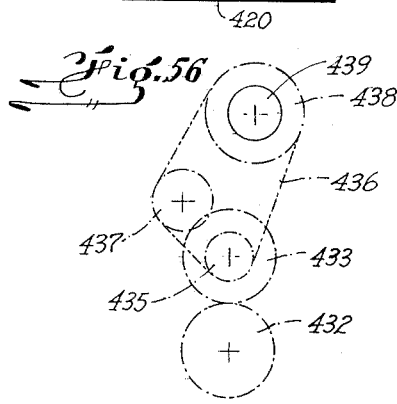
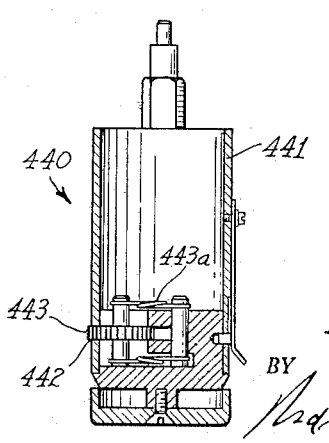

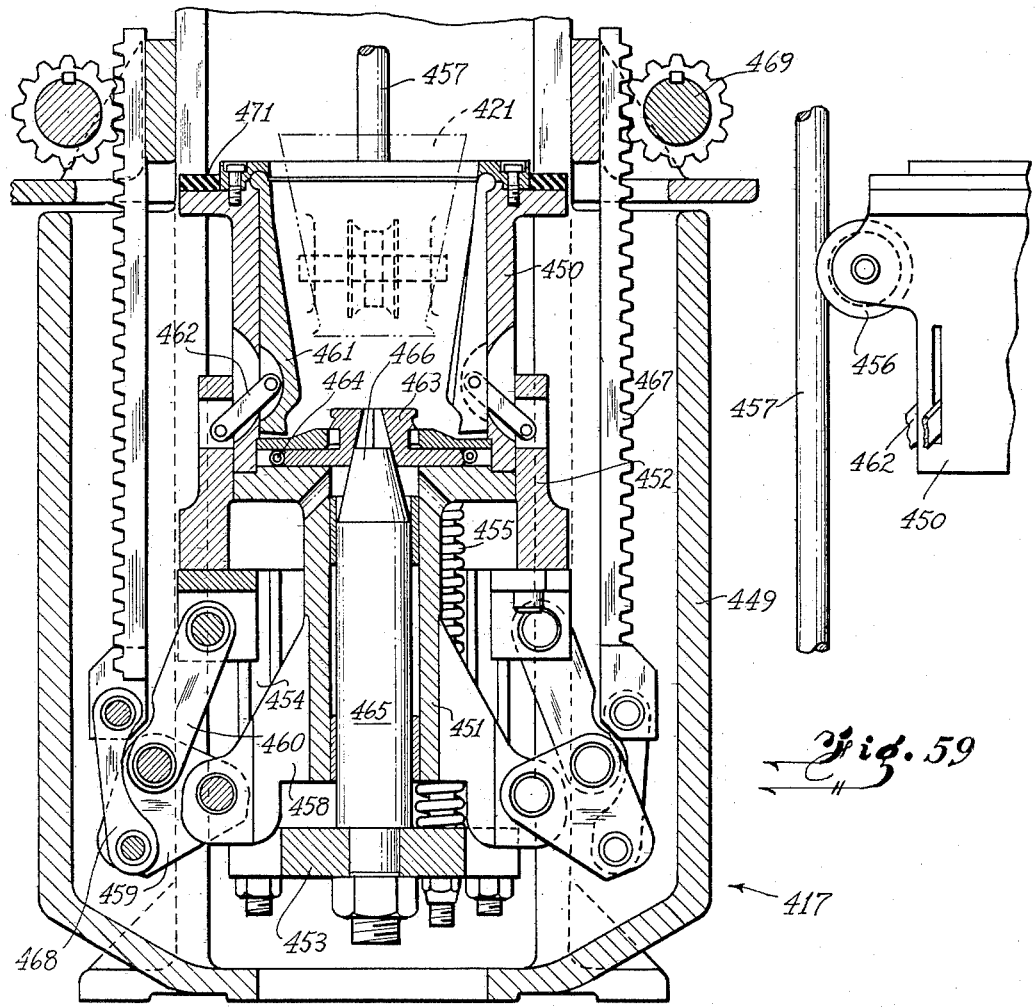

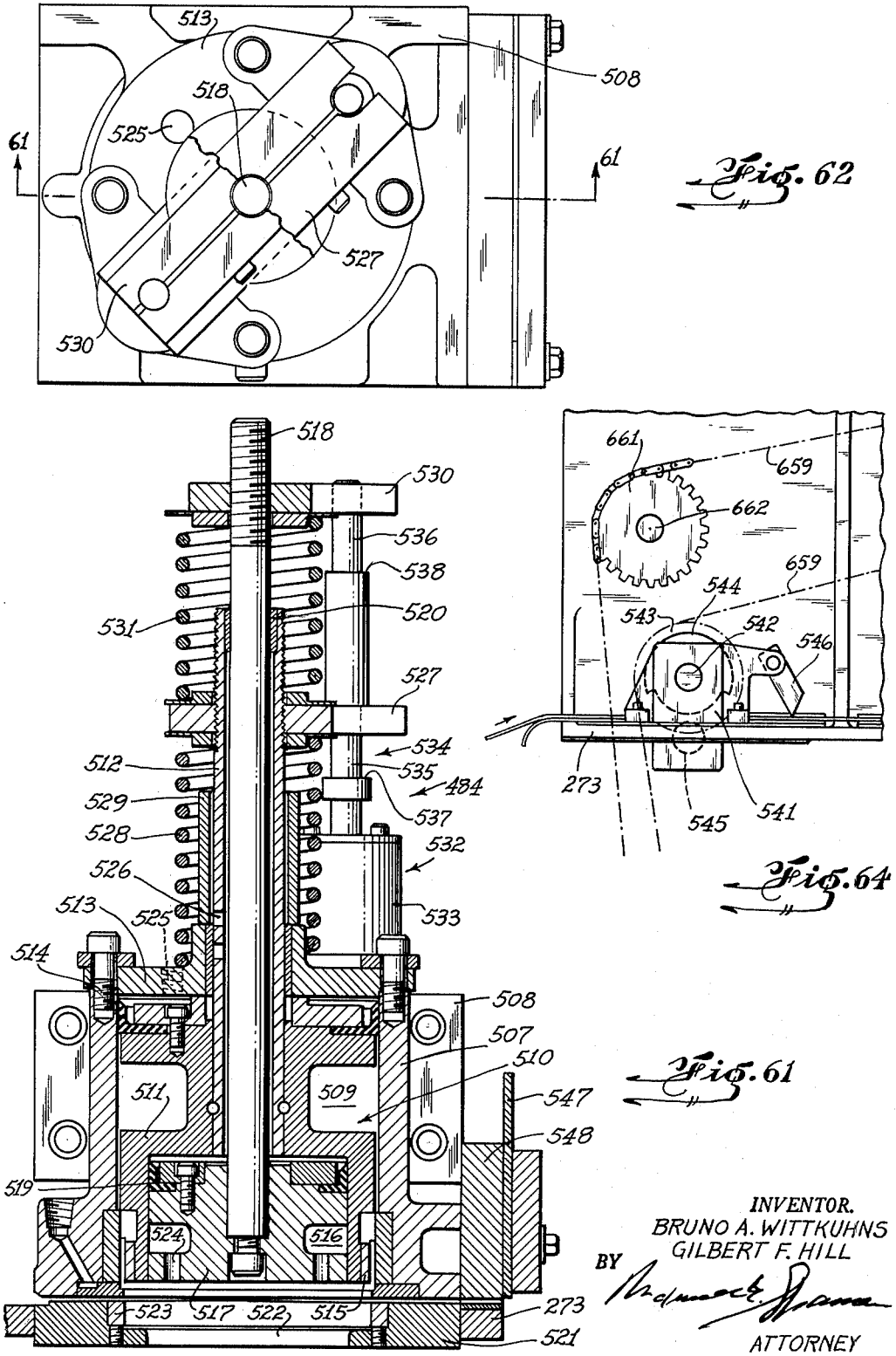

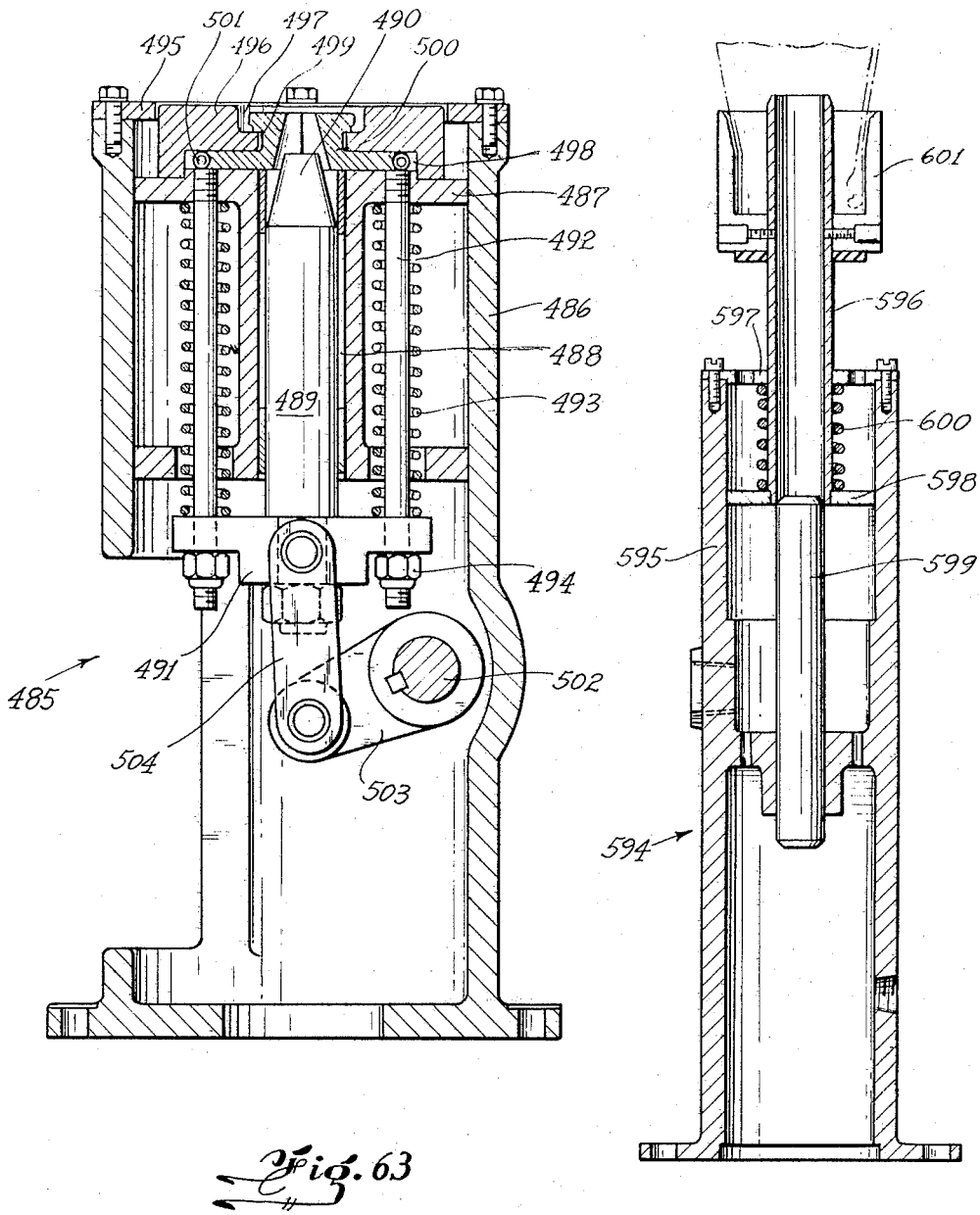

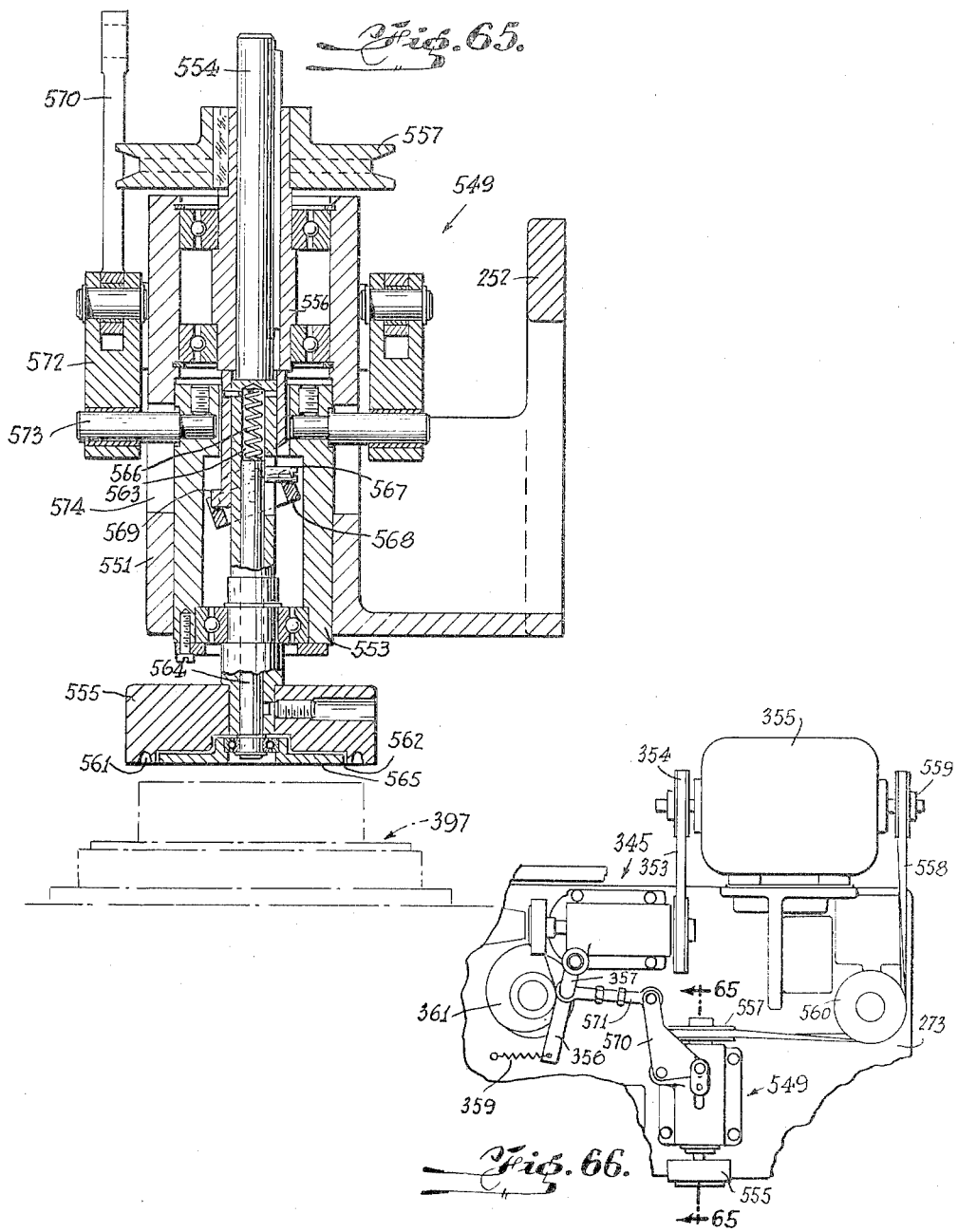

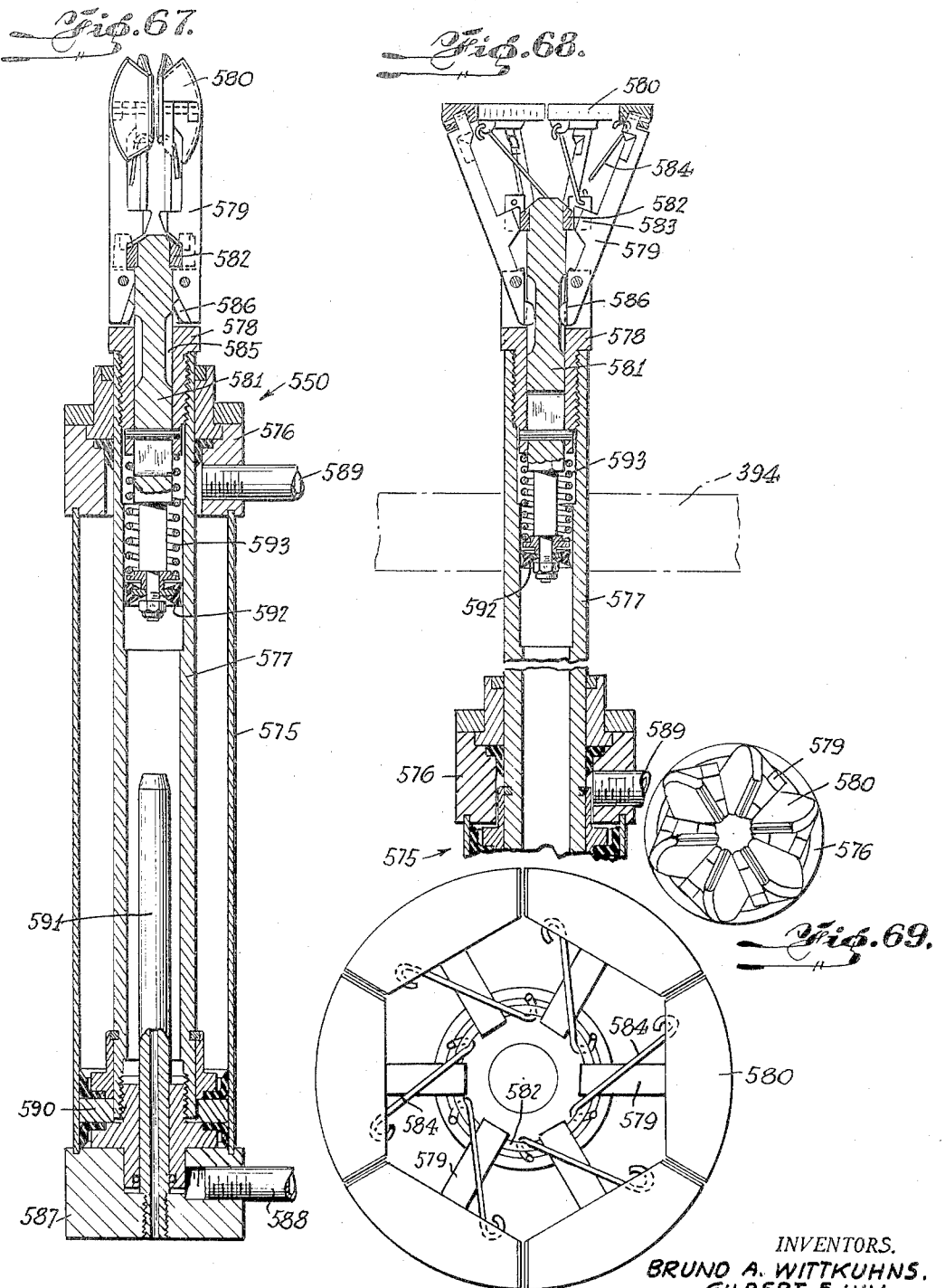

Oct. 4, 1955     B. A. WITTKUHNS ET AL     2,719,466
MACHINE FOR MAKING PAPER CONTAINERS
Filed April 26, 1951     29 Sheets-Sheet 27

Fig. 72

INVENTOR.
BRUNO A. WITTKUHNS
GILBERT F. HILL
BY
ATTORNEY

Oct. 4, 1955     B. A. WITTKUHNS ET AL     2,719,466
MACHINE FOR MAKING PAPER CONTAINERS
Filed April 26, 1951     29 Sheets-Sheet 28
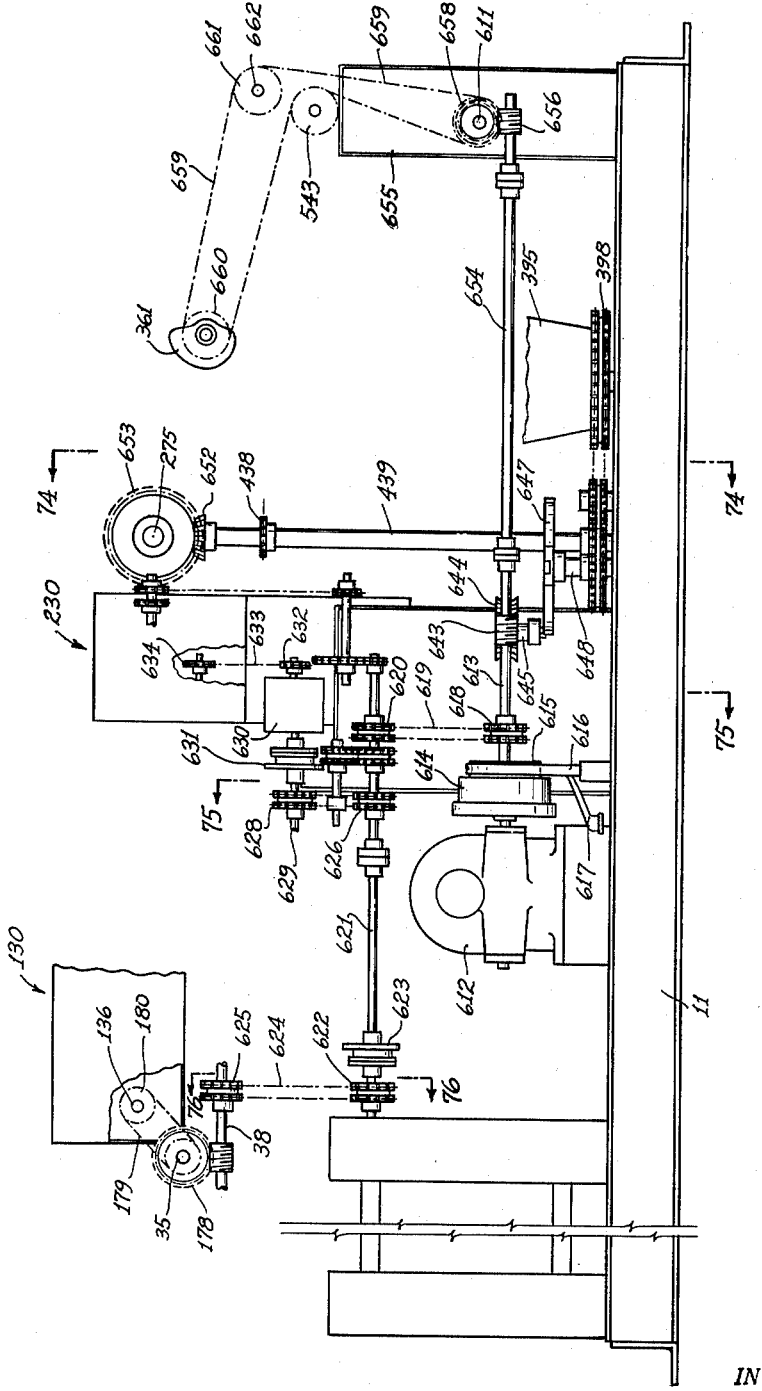
Fig. 73
INVENTOR.
BRUNO A. WITTKUHNS
GILBERT F. HILL
BY
ATTORNEY

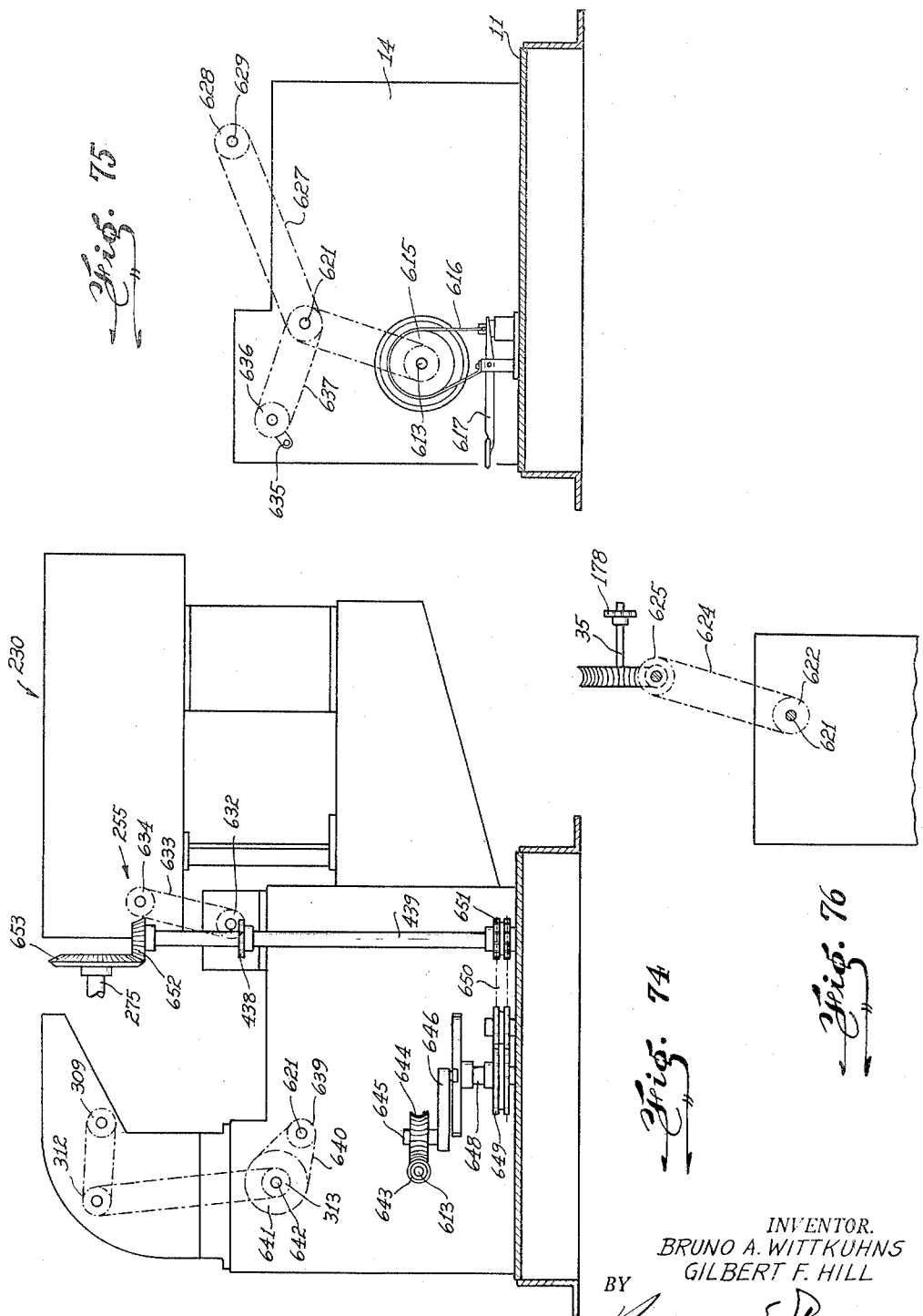

United States Patent Office 2,719,466
Patented Oct. 4, 1955

2,719,466

MACHINE FOR MAKING PAPER CONTAINERS

Bruno A. Wittkuhns, Summit, and Gilbert F. Hill, Madison, N. J., assignors to National Paper Bottle Co., Inc., New York, N. Y., a corporation of New York Application April 26, 1951, Serial No. 223,011

25 Claims. (Cl. 93—79)

The present invention relates to a machine for making paper containers, and more particularly to an improved machine for economically and conveniently cutting suitably shaped blanks from continuous strips or webs of paper and then forming such blanks into wound containers adapted for the packaging of milk or other free flowing materials.

Paper containers have, prior to this invention, been made in various shapes and forms for holding milk, fruit juices and other liquid or free flowing materials. Certain of these previous paper containers have been formed to the general shape of glass bottles, that is, a shape or form including a cylindrical lower portion and a truncated conical, contiguous neck portion. Paper containers having the described shape are particularly desirable and convenient for the packaging and transportation or delivery of milk and other liquid products since such containers are suited for filling on existing standard glass bottle filling equipment and may be conveniently grasped and carried at the truncated neck portion thereof.

As shown in the co-pending applications of Bruno A. Wittkuhns, H. George D. Nutting and Gilbert F. Hill, Serial No. 85,781, filed April 6, 1949; Serial No. 85,782, filed April 6, 1949; and Serial No. 85,783, filed April 6, 1949, paper containers simulating the shape of glass bottles may each be formed from a rectangular blank and a curved blank, cut from respective continuous webs or strips of paper, and paired for winding together into a container body of double-ply construction, with the curved blank providing the truncated conical neck portion of the body and being interleaved during the winding operation with the rectangular blank which forms the cylindrical portion in a manner to form a mid-sectional joint. The paper plies forming the container body are bonded together by an adhesive layer sandwiched therebetween, and the contracted end of the neck portion is spun over and shaped to form a reinforced mouth at that end of the container body for supporting and retaining a removable closure, while the large or bottom end of the container body is closed by a bottom disc having a depending marginal skirt which is spun inwardly together with the adjacent end portion of the container body to form a rolled bead sealing the bottom of the container body and providing a reinforced supporting base. In order to stiffen or strengthen the neck portion and to shape it for closely simulating the corresponding part of a glass bottle, the neck portion is formed with a plurality of longitudinal flutes extending from above the midsectional seam to the reinforced mouth.

The machine disclosed in this application includes substantial improvements over and above the machine disclosed in the co-pending applications referred to above, and comprises a first blank preparing assembly for successively cutting curved or arcuate blanks from a continuous web or strip of paper, for separating the cut arcuate blanks from the remainder or waste of the paper web or strip, and for applying adhesive to suitable areas of each arcuate blank and crimping the trailing end portion of the blank as the latter is fed or transported to a winding station; and a second blank preparing assembly, operating in synchronism with the first blank preparing assembly, for applying printed matter to a continuous web or strip of paper at suitably spaced locations along the length thereof, for successively cutting the printed web or strip along spaced transverse lines to provide rectangular blanks and simultaneously crimping the trailing end portion of each rectangular blank, and for applying adhesive to a suitable area of each rectangular blank while feeding or transporting such blank to the winding station in paired relation to a corresponding arcuate blank. The machine disclosed in this application further includes a first mandrel supporting conveyor, preferably in the form of a turret, which is indexed periodically and in synchronism with the first and second blank preparing assemblies to carry the plurality of mandrels successively to and from dwelling position at a plurality of operating stations disposed at spaced apart locations along the path of travel of the mandrels, as defined by the movement of the turret. These operating stations in the order in which they are arranged include the winding station at which devices are located for winding each pair of arcuate and rectangular blanks fed thereto onto the mandrel then in dwelling position at the winding station to form a wound container body on the mandrel; a pressing station having a device located thereat for pressing the wound container body on the mandrel in dwelling position at the pressing station to compress the midsectional seam and the longitudinal seam of the truncated conical portion of the container body and thus provide a secure bond; a mouth spinning station at which devices are located for spinning engagement with the contracted end of the container body on the mandrel in dwelling position at the spinning station to form a reinforcing rolled bead at the mouth of the container body; and a stripping station at which devices are located for removing the container body axially from the mandrel in dwelling position at the stripping station. In order to facilitate the spinning operations which form the reinforcing beads at the mouth end and base end of the container body and to prevent burning of the latter during such operations, a paraffin applying unit is arranged adjacent the path of travel of the mandrels, between the pressing and mouth spinning stations, for depositing small quantities of paraffin onto each container body, adjacent the opposite ends thereof, as the supporting mandrel is being indexed to the mouth spinning station. The machine for making paper containers, as disclosed in this application, still further includes a second conveyor, preferably in the form of a turntable, which carries a series of container body receiving cells successively to and from dwelling position at a plurality of operating stations arranged at spaced apart locations along the path of travel of the cells, as defined by the movement of the turntable. The operating stations associated with the cell carrying turntable, in the order in which they are arranged, include a loading station aligned with the stripping station associated with the turret so that a cell dwelling at the loading station is in position to receive a container body as the latter is removed from its supporting mandrel; a fluting, mouth shaping and glue applying station at which devices are located for simultaneously forming longitudinal flutes in the neck portion of the container body in the cell dwelling at the related station, initially shaping the bead at the mouth of that container body so that a removable closure will be retained therein, and applying glue to the inner surface of that container body adjacent the base end thereof; a bottom punching and inserting station at which devices are located for punching circular blanks from a continuous web or strip of paper, forming each circular blank into a bottom member of cup-like configuration and inserting the formed blank into the bottom end of the container body in the cell dwelling at the bottom punching and inserting station so that the skirt or marginal wall portion of the bottom member engages against the band of adhesive applied to the container body at the preceding station, and for completing the shaping of the bead at the mouth of the container body in the cell dwelling at the bottom punching and inserting station; a bottom spinning station at which devices are located for spinning engagement with the bottom end of the container body to roll the bottom end portion together with the skirt of the bottom member inwardly thus sealing the bottom of the container body and forming a reinforcing and supporting base for the container body, and for supporting the bottom member in position within the container body carried by the cell dwelling at the bottom spinning station during the performance of the bottom spinning operation; and an ejecting station at which devices are located for pneumatically removing the container body from the cell dwelling at the ejecting station.

A general object of the present invention is to provide a machine of the described character capable of producing paper containers automatically, economically and without imperfections at high production speeds.

Another general object of the present invention resides in the provision of a machine of the described character constructed and arranged so that operation and maintenance thereof are substantially facilitated.

Another general object of the present invention is to provide a machine of the described character in which the several assemblies thereof are constructed and arranged so that a compact machine results.

Another general object resides in the provision of a machine of the described character wherein the several assemblies thereof are constructed and arranged and related to each other so that the drives effecting the operation of such assemblies are integrated and simplified.

A specific object of the present invention is to provide a machine of the described character having an assembly for preparing arcuate blanks wherein such blanks are cut from a continuous web or strip of paper in a manner to conveniently utilize the maximum area of the paper web or strip so that the amount of waste or scrap paper is held at a minimum, and wherein the arcuate blank preparing assembly is arranged so that the overall dimensions of the machine are kept within reasonable limits for convenient installation in a container making plant.

Another specific object resides in the provision of a machine of the described character wherein the assembly for preparing the arcuate blanks positively separates the cut arcuate blanks from the waste or scrap and disposes of such waste or scrap in a manner so that it cannot interfere with the continued operation of the machine.

Another specific object resides in the provision of a machine of the described character wherein the arcuate blank preparing assembly includes an arrangement of simple construction for turning each of the cut arcuate blanks from the angular position necessary for maximum utilization of the paper web or strip to the position for linear feeding past the devices crimping the trailing end portion of each blank and applying glue to selected areas thereof.

Another specific object resides in the provision of glue applying devices for adhesively coating selected areas of the arcuate and rectangular blanks prepared in a machine of the described character which are constructed so that the thickness and uniformity of the adhesive coating may be controlled and so that the several parts thereof may be easily removed for greater convenience in cleaning and servicing the glue applying devices.

Another specific object resides in the provision of a machine of the described character wherein the assemblies for preparing the arcuate and rectangular blanks include feeding devices of simple construction for advancing the respective blanks from the related glue applying devices toward the winding station without substantial removal of glue from the selected adhesively coated areas of the blanks.

Another specific object is to provide, in a machine of the described character, a device for feeding the arcuate blanks to the winding station in a manner so that each blank is fed tangentially to the truncated conical portion of the mandrel dwelling at the winding station, without twisting or warping of the blank, for winding on that portion of the mandrel to form the neck portion of the wound container body.

Another specific object is to provide, in a machine of the described character, an arcuate blank preparing assembly including a device for final feeding of each arcuate blank to the winding station which is adjustable independently of the remainder of that assembly so that the arcuate blank fed to the winding station may be conveniently registered relative to the mandrel and relative to the paired rectangular blank.

Another specific object of the present invention is to provide a machine of the described character having a rectangular blank preparing assembly which includes devices for applying printed matter to the continuous paper strip or web from which the rectangular blanks are cut, wherein the printing devices are arranged so that the inked impression is afforded sufficient time for drying before the portions of the paper strip or web having such inked impressions are engaged by feed rollers or other similar elements likely to cause smearing or blurring of the inked impressions.

Another specific object resides in the provision of improved means for simultaneously cutting the printed paper strip or web into rectangular blanks and crimping the trailing end portions of the successive cut rectangular blanks.

Another specific object resides in the provision of a rectangular blank preparing assembly for a machine of the described character which includes means for advancing the cut rectangular blanks from the devices effecting the cutting of the continuous paper strip or web in a manner to positively separate the cut blanks one from the other.

Another specific object resides in the provision of a rectangular blank preparing assembly for a machine of the described character which includes adjustable devices controlling the lateral position and direction of the rectangular blanks during the final increment of movement of the latter to the winding station so that the rectangular blanks may be conveniently registered relative to the mandrels successively positioned at the winding station and to the corresponding or paired arcuate blanks, and so that such registration may be adjusted independently of the remainder of the rectangular blank preparing assembly.

Another specific object resides in the provision of a rectangular blank preparing assembly for a machine of the described character which includes means for positively effecting the final increment of movement of each rectangular blank to the winding station in a manner so that the leading edge of the rectangular blank may be registered relative to the corresponding arcuate blank and the mandrel on which the blanks are to be wound.

Another specific object of the present invention is to provide a machine of the described character having improved devices located at the winding station to move out of the path of travel of the mandrels during indexing of the latter to and from the winding station and to move into engagement with a pair of arcuate and rectangular blanks during winding of the latter onto a mandrel dwelling at the winding station for guiding and pressing the blanks onto the mandrel so that the blanks are wound uniformly.

Another specific object resides in the provision of devices located at the winding station for engagement with the arcuate and rectangular blanks during winding of the blanks onto a mandrel to guide the blanks on the latter and including relatively rigid fingers mounted for floating contact with the blanks being wound and spring urged against the blanks in a manner to provide uniform contact pressure at all points of contact.

Another specific object of the present invention is to provide a machine of the described character with a simplified device at the pressing station to compress the midsectional seam and the longitudinal seam extending along the neck portion of the wound container body on the mandrel dwelling at the pressing station so that a permanent adhesive bond is formed at such seams and so that the edge portion of the arcuate blank at the midsectional seam is pressed down to conform to the cylindrical configuration of the cylindrical portion of the container body.

Another specific object is to provide a device at the pressing station which compresses the seams of the wound container body as mentioned above without working the glue between the plies of the container body so that the development of wrinkles and other imperfections is avoided during the performance of the seam compressing operations at the pressing station.

Another specific object of the present invention resides in the provision of a machine of the described character including a device located adjacent the path of travel of the mandrels, between the pressing and mouth spinning stations, and operative to apply paraffin to the opposite ends of each container body as the supporting mandrel moves to the mouth spinning station so that such paraffin acts as a lubricant during the spinning of the mouth end and bottom end of the container body to facilitate such spinning operations and to prevent the development of excessive heat and consequent burning or scorching of the container body during such spinning operations.

Another specific object of the present invention resides in the provision of a machine of the described character including devices located at the mouth spinning and bottom spinning stations which are constructed and arranged to be operated by the same electric motor and which are interconnected for simultaneous movement into spinning engagement with the mouth end and bottom end, respectively, of the container body supported at the related station under the actuating influence of a single rotated cam member.

Another specific object of the present invention resides in the provision of a machine of the described character having devices at the stripping station for removing the wound container body from the mandrel dwelling at the stripping station and projecting the removed body accurately into the body receiving cell of the turntable simultaneously dwelling at the loading station.

Another specific object is to provide a frictional brake at the stripping station engageable with the container body as the latter is removed from its supporting mandrel so that free fall of the body is prevented after the cylindrical portion of the latter has been moved off the cylindrical portion of the mandrel and projection of the body into its receiving cell is accomplished under the continuous influence of the stripping elements.

Another specific object is to provide devices at the stripping station for removing the container body from the mandrel dwelling at such station, which devices include stripping elements shaped to engage the base or bottom edge of the container body and movable longitudinally along the sides of the mandrel, such stripping elements also including parts laterally engaging the base end portion of the container body being removed to maintain the body in axial alignment with the mandrel and with the receiving cell during the transfer of the container body from the former to the latter.

Another specific object of the present invention resides in the provision of a machine of the described character having container body receiving cells mounted on a turntable, for movement to and from a plurality of operating stations, and including an improved mechanism for gripping the container in its receiving cell with a variable gripping pressure corresponding to the position of the cell relative to the operating stations, the improved gripping mechanism being designed to provide more accurate control of the gripping pressure and to avoid damage to the gripped container body by reason of an excessive clamping force being applied against an insufficient area.

Another specific object of the present invention resides in the provision of a machine of the described character including a container body supporting conveyor for moving the container body to and from dwelling position at a glue applying station, and a device at that station operative to apply a band of adhesive to the inner surface of a container body dwelling at the related station; the device including a resilient glue applicator member designed to reciprocate into and out of the container body, means for circumferentially expanding the glue applicator member at the opposite limits of the reciprocating travel thereof, means for transferring a layer of adhesive to the perimeter of the glue applicator member during the latter's residence at the limit of its reciprocating travel remote from the container body, means continuously urging the glue transferring means to an inoperative position, electrically energized means for selectively displacing the glue transferring means to an operative position, and means for automatically manipulating the glue applicator member into and out of the container body during the interval of dwell of the latter at the glue applying station.

Another specific object of the present invention is to provide a machine of the described character including a container body supporting conveyor for moving container bodies to and from dwelling position at a fluting and mouth shaping station, and devices at the fluting and mouth shaping station including a fluting anvil designed to be reciprocated into and out of the container dwelling at said station through the base end thereof, mouth shaping anvil segments having head portions designed to be reciprocated into and out of the container body through the mouth end thereof, fluting segments designed to be reciprocated between a position clear of the container body and a position enveloping the neck portion thereof, pressure fluid operated means for manipulating the mouth shaping anvil segments and fluting segments, force transmission means between the pressure fluid operated means and the mouth shaping anvil and fluting segments for moving the segments into and around the container body dwelling at said station and including force amplifying link means for effecting radial movement of the anvil segments and fluting segments into forming engagement with the mouth and neck portions, respectively, of the container body, and other fluid pressure operated means synchronized with the first mentioned fluid pressure operated means for moving the fluting anvil into the container body just before the fluting segments are radially closed against the neck portion of the latter.

Another specific object of the present invention resides in the provision of devices at two successive stations for shaping the mouth end of the container body, each of the devices including anvil segments movable axially into the mouth of a container body dwelling at the related station and then radially to form a circumferential groove in the inner surface of the mouth for retaining a removable closure therein. The second of the mouth shaping devices referred to herein, being operative to eliminate the ridges formed between the anvil segments of the first mouth shaping device so that a smooth seat is provided for the removable closure member.

Another specific object is to provide mouth shaping devices at two successive stations which are operated simultaneously by a common fluid pressure operated device for rough shaping and finish shaping the mouth of the container bodies dwelling at the related stations.

Another specific object of the present invention is to provide a machine of the described character including a device for punching a circular blank from a continuous paper strip or web, shaping the circular blank to provide a bottom member of cup-shaped configuration, and inserting the shaped bottom member into the base end of a container body dwelling at the related station, and improved feeding mechanism for intermittently engaging the paper strip or web to advance the latter to the punching, shaping and inserting device, and for holding the paper strip or web against return or backward movement during the periods when the advancing mechanism is out of engagement with the paper strip or web.

Another specific object is to provide a bottom punching, shaping and inserting device of the described character having a cutting assembly associated therewith for cutting the waste or scrap remains of the paper strip or web into easily disposable pieces after the bottom forming blanks have been punched therefrom.

Another specific object of the present invention is to provide a machine of the described character including a conveyor for carrying container bodies having cup-shaped bottom members inserted in the base ends thereof to and from dwelling position at a bottom spinning station, devices at the bottom spinning station for spinning engagement with the bottom end of a container body at said station operative to roll the skirt of the bottom member and adjacent edge portion of the container body inwardly together to form a reinforcing and sealing rolled bead at the base end of the container body, and other devices at the bottom spinning station operated by pressure fluid to enter the container body dwelling at said station through the mouth end thereof and to provide internal supporting platform for the bottom member during the bottom spinning operation.

Another specific object of the present invention is to provide a machine of the described character including a conveyor for carrying container bodies to dwelling position at an ejecting station, and pneumatically operated mechanism at the ejecting station including a blow-out tube designed to be displaced axially into a container body dwelling at said ejecting station, a cup-shaped member on the blow-out tube to extend over the mouth portion of the container body when the tube is displaced into the latter for jarring the body loose from the conveyor, and means admitting compressed air into the blow-out tube when the latter enters the container body to thus eject the latter from the conveyor while the cup-shaped member substantially seals the mouth end of the container body to provide a substantial ejecting force.

The above and other objects, features and advantages of the present invention will be apparent in the following detailed description of a specific embodiment, while the invention consists of the novel combinations, arrangements of parts and details of construction set forth in the description and shown in the drawings and then more particularly defined in the appended claims.

In the drawings:

Fig. 1 is a front elevational view of a portion of a machine for making paper containers embodying the present invention wherein the container bodies are formed;

Fig. 2 is a top plan view of the portion of the machine shown in Fig. 1;

Fig. 3 is a side elevational view of the portion of the machine shown in Fig. 1;

Fig. 4 is a side elevational view, on an enlarged scale and partly broken away and in section, of a unit of the machine wherein the curved or arcuate blanks are cut from a continuous strip or web of paper;

Fig. 6 is a perspective view of two members forming part of an assembly for feeding the paper strip to the unit of Figs. 4 and 5;

Fig. 7 is a fragmentary, vertical sectional view taken along the line 7—7 of Fig. 5;

Fig. 8 is a fragmentary, rear elevational view showing the details of construction of elements of the unit of Figs. 4 and 5 that function to advance the waste paper and cut arcuate blanks from the position at which the latter are cut;

Fig. 9 is a side elevational view, partly in section, of a separator assembly for separating the curved blanks from the scrap or waste paper and for turning the curved blanks to the angular position required for further feeding of such blanks to the winding station;

Fig. 10 is a top plan view of the separator assembly of Fig. 9;

Fig. 11 is a sectional view on an enlarged scale taken along the line 11—11 of Fig. 10;

Fig. 12 is a detail view on an enlarged scale of a pusher finger forming a part of the separator assembly of Figs. 9 and 10;

Fig. 13 is a top plan view of a conveyor assembly for the curved blanks with the glue fountain and turntable assembly removed from the conveyor for the purpose of clarity;

Fig. 14 is a side elevational view, partly broken away and in section, of the conveyor assembly of Fig. 13 with the glue fountain and turntable assembly in place;

Fig. 15 is a view looking down on the turntable assembly of the conveyor, as viewed along the line 15—15 of Fig. 14;

Fig. 16 is a fragmentary side elevational view showing a feeding assembly for transporting the curved blanks from the feed table of the conveyor into the turntable well;

Fig. 16a is a detail view, on an enlarged scale, showing a pusher finger embodied in the assembly of Fig. 16;

Fig. 16b is an end view of the pusher finger of Fig. 16a;

Fig. 17 is a perspective view showing the manner in which blank transport members are arranged on a shaft assembly of the conveyor of Fig. 13;

Fig. 18 is a sectional view taken along the line 18—18 of Fig. 13;

Fig. 19 is a top plan view of a glue fountain mounted on the conveyor of Figs. 13 and 14;

Fig. 19a is a sectional view of the drive for the rollers of the glue fountain of Fig. 19;

Fig. 20 is a side elevational view, broken away and in section, of the glue fountain of Fig. 19;

Fig. 21 is a detail side elevational view of a glue walker wheel forming a part of the conveyor assembly of Figs. 13 and 14;

Fig. 22 is a side elevational view of an assembly for printing, cutting, gluing and feeding the rectangular blanks;

Fig. 23 is a top plan view of the assembly of Fig. 22;

Fig. 24 is a detail side elevation of the cutting devices included in the assembly of Fig. 22;

Fig. 25 is an end elevational view, partly broken away and in section, of the assembly of Fig. 22;

Fig. 26 is a fragmentary horizontal sectional view, taken along the line 26—26 of Fig. 25, and on an enlarged scale;

Fig. 27 is a fragmentary side elevation of a feeding element as seen along the line 27—27 of Fig. 26;

Fig. 28 is a fragmentary vertical sectional view taken along the line 28—28 of Fig. 26;

Fig. 29 is a fragmentary end view of a portion of the device shown in Fig. 28;

Fig. 30 is an axial sectional view of a mandrel forming a part of the upper turret in an embodiment of the present invention;

Fig. 31 is a fragmentary transverse sectional view taken along the line 31—31 of Fig. 30;

Fig. 32 is a side elevational view of a winding device embodying the invention, partly broken away for the purpose of clarity;

Fig. 33 is a front elevational view of the winding device of Fig. 32;

Fig. 34 is a fragmentary side elevational view, on an enlarged scale, of a pressure finger assembly included in the winding device of Figs. 32 and 33;

Fig. 35 is a detail view of one of the finger elements included in the finger assembly of Fig. 34;

Fig. 36 is a side elevational view, on an enlarged scale, of a rocker arm assembly included in the winding device of Fig. 32 when viewed in the direction opposite to that of the latter;

Fig. 37 is a side elevational view, partly broken away and in section, of a pressing device included in the machine embodying the present invention;

Fig. 38 is a top plan view of a paraffin applying device included in the machine embodying the present invention;

Fig. 39 is a rear elevational view of the paraffin applying device of Fig. 38;

Fig. 40 is a vertical, axial, sectional view of a mouth spinning device included in the machine embodying the present invention;

Fig. 41 is a side elevational view, partly broken away and in section, of a container stripping or transferring device included in the machine embodying the present invention;

Fig. 42 is a fragmentary, horizontal sectional view along the line 42—42 of Fig. 41;

Fig. 43 is a front elevational view of a portion of the machine embodying the present invention and illustrating the drives for the stripping or transferring device of Fig. 41;

Fig. 44 is a top plan view of a braking device associated with the stripping or transferring device of Fig. 41;

Fig. 45 is a sectional view taken along the line 45—45 of Fig. 43;

Fig. 46 is a top plan view of a lower turret or turntable included in the machine embodying the present invention;

Fig. 47 is a vertical sectional view of the lower turret or turntable taken along the line 47—47 of Fig. 46;

Fig. 48 is a vertical sectional view, on an enlarged scale, of a container receiving cell of the turret of Fig. 46, taken along the line 48—48 of Fig. 49, with the left hand side of the view showing the cell in released condition, and with the right hand side of the view showing the cell in clamping condition;

Fig. 49 is a top plan view of the cell of Fig. 48;

Fig. 50 is a detail sectional view taken along the line 50—50 of Fig. 49;

Fig. 51 is a detail view, on an enlarged scale, of an actuating rod included in the lower turret of Fig. 46;

Fig. 52 is a fragmentary top plan view, with the lower turret partly broken away, showing the several devices located below that turret;

Fig. 53 is a side elevational view of a fluting and glue applying device included in the machine embodying the present invention, with the device being shown in its retracted condition;

Fig. 54 is a vertical sectional view, taken along the line 54—54 of Fig. 53, but with the device shown in its extended condition;

Fig. 55 is a horizontal sectional view, taken along the line 55—55 of Fig. 53;

Fig. 56 is a diagrammatic, top plan view of a driving arrangement for a clutch element of the fluting and glue applying device of Fig. 53;

Fig. 57 is a vertical sectional view, on an enlarged scale, taken along the line 57—57 of Fig. 55;

Fig. 58 is a fragmentary vertical sectional view of a fluting and mouth shaping device, taken along the line 58—58 of Fig. 52;

Fig. 59 is a fragmentary detail view of an element included in the fluting and mouth shaping device of Fig. 58;

Fig. 60 is a rear elevational view showing the mechanism for actuating the fluting and mouth shaping device of Fig. 58;

Fig. 61 is a vertical sectional view of a bottom punching, forming and inserting device included in the machine embodying the present invention and taken along the line 61—61 of Fig. 62;

Fig. 62 is a top plan view, partly broken away, of the bottom punching, forming and inserting device of Fig. 61;

Fig. 63 is a vertical sectional view of a second mouth shaping device taken along the line 63—63 of Fig. 52;

Fig. 64 is a rear elevational view of a device for intermittently feeding a paper strip to the bottom punching, forming and inserting device of Fig. 61;

Fig. 65 is a vertical sectional view of a bottom spinning device, taken along the line 65—65 of Fig. 66, and on an enlarged scale;

Fig. 66 is a fragmentary, front elevational view illustrating the mechanisms for actuating the spinning devices of Figs. 40 and 65;

Fig. 67 is a vertical sectional view of a platform erecting device, taken along the line 67—67 of Fig. 52, on an enlarged scale, and with the device shown in its retracted or inoperative position;

Fig. 68 is a fragmentary vertical sectional view, similar to Fig. 67, but with the device shown in its extended condition;

Fig. 69 is a top plan view, on an enlarged scale, of the platform erecting device in the condition of Fig. 67;

Fig. 70 is a top plan, on an enlarged scale, of the platform erecting device in the condition of Fig. 68;

Fig. 71 is a vertical sectional view of an ejecting device, taken along the line 71—71 of Fig. 52, and on an enlarged scale;

Fig. 72 is a diagrammatic top plan view of driving mechanisms included in the machine embodying the present invention;

Fig. 73 is a front elevational view of the driving mechanisms of Fig. 72;

Fig. 74 is a vertical sectional view taken along the line 74—74 of Fig. 73;

Fig. 75 is a vertical sectional view taken along the line 75—75 of Fig. 73;

Fig. 76 is a vertical sectional view taken along the line 76—76 of Fig. 73.

Figure 5:
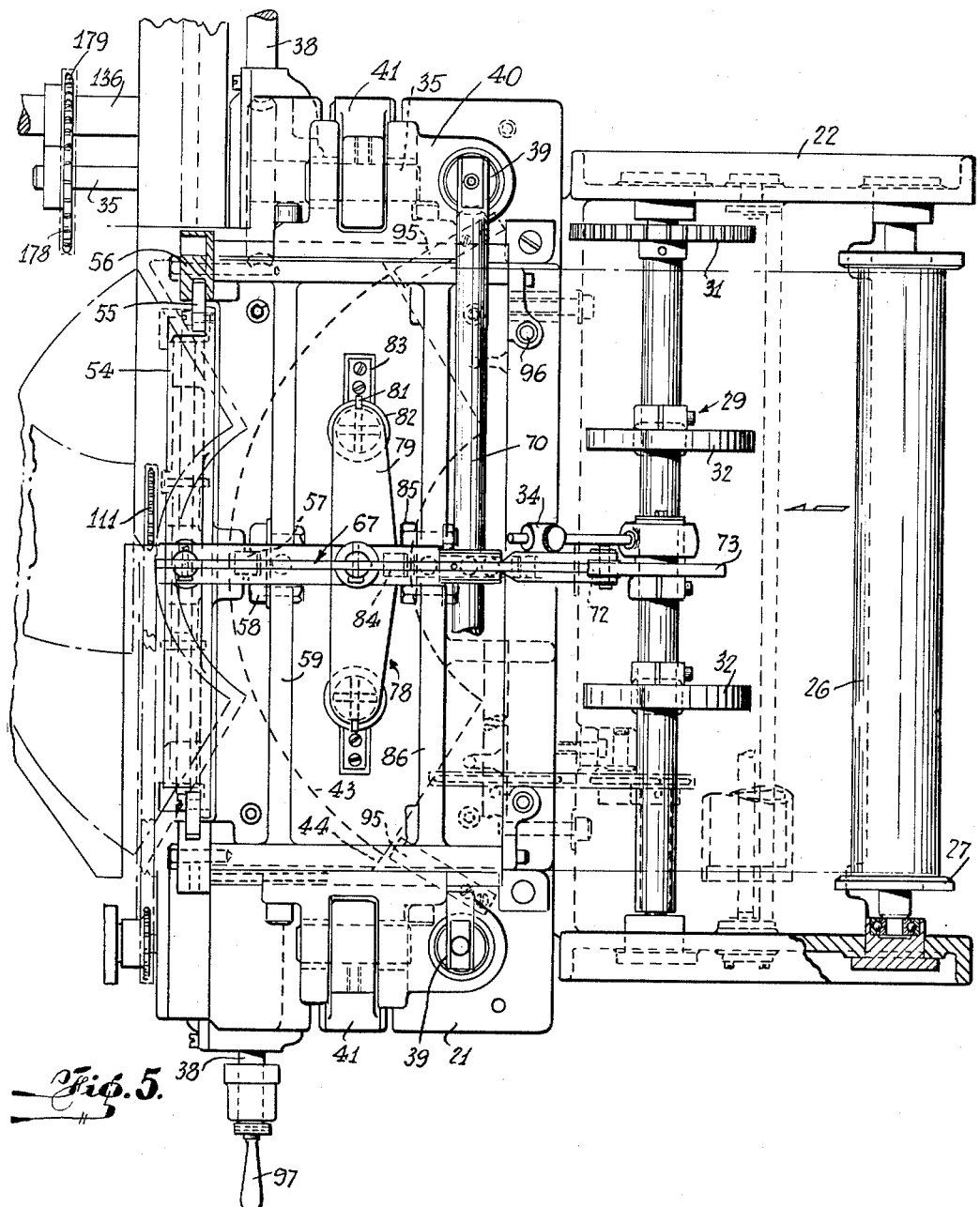
Fig. 5 is a top plan view of the unit of the machine shown in Fig. 4.

Referring to the drawings, and initially to Figs. 1, 2 3 thereof, the portion 10 of the machine in which the container bodies are formed is there seen to include a substantially rectangular base 11 having two upstanding support members 12 and 13 adjacent one end and a pedestal or support 14 substantially at the center of the front portion of the base. An L-shaped frame member 15 has one leg extending forwardly, or toward the viewer in Fig. 1, and mounted on the support members 12 and 13, and its other leg extending longitudinally of the base 11 to rest upon a lug 16 extending from pedestal 14. The continuous paper strip or web from which the arcuate blanks are formed is stored in the form of a roll 17 which is rotatably mounted between brackets 18 extending forwardly from the support members 12 and 13. The paper strip is drawn off the top of roll 17 toward the rear and is fed to a curved blank cutting assembly which is mounted above the forwardly extending leg of frame 15 by an auxiliary frame part 19 and is generally indicated by the reference numeral 20.

*Section of the machine preparing the arcuate blanks for winding*

The curved or arcuate blank cutting assembly 20 shown in Figs. 4 to 8, inclusive, includes an anvil table 21 (Fig. 4) from which a feeding table 22, of substantially H-shaped cross-section, extends forwardly. The paper strip from the roll 17 supported at the front of the frame is led under and around a tension roller 23 which is rotatably carried by pivoted arms 24 depending from the table 22 and is continuously urged by the springs 25 in the direction for applying tension to the paper strip.

From the tension roller 23, the paper strip or web is led over an idler roller 26 at the front of the table 22, which idler roller is provided with end flanges 27 for laterally positioning the paper strip. Continuing rearwardly, the paper strip is passed over the table 22 and between a back-up roll 28, engaging the strip from below, and a transport roll assembly 29 constructed for intermittent engagement with the strip from above. The back-up roll 28 is continuously rotated through a chain and sprocket arrangement which is driven by suitable gearing from an eccentric rod or shaft 30 journalled below one side of the anvil table 21, and the transport roll assembly 29 is in turn continuously rotated by meshing gears 31 carried at the adjacent ends of the back-up and transport roll shafts. In order to effect the intermittent feeding of the paper strip to the cutting station on the anvil table where the curved blanks are cut therefrom, the transport roll assembly 29 includes two cam-shaped transporting members 32 (Fig. 6) which are formed with radially raised portions, extending over substantially one-half of the periphery thereof, to grip and forward the paper strip when the transport roll is rotated to position such raised portions opposite the rotated back-up roll, while the paper strip is released when the portions of reduced radius of the transporting members confront the back-up roll. A paper stop assembly is mounted on the shaft of the transport roll to hold the paper strip in place when the strip is released by the transporting members 32 to thereby prevent withdrawal of the paper strip from between the transport and back-up rolls by the action of the tension roll 23. The paper stop assembly is formed of a dog or striker 33 which is pivotally supported on the shaft of the transport roll assembly and urged into contact with the paper strip by a weight 34. The dog or striker 33 does not interfere with the feeding of the strip to the punching station and only operates to resist movement of the strip in the opposite direction. The tension roller 23 absorbs the shock imparted to the paper strip by the abrupt or sudden forwarding action of the transport roll, and the initial feeding movement of the paper strip is achieved by extension of the spring 25, rather than by movement of the mass of the heavy paper roll 17, to thereby prevent rupture of the paper strip.

A single complete rotation of the transport roll assembly 29 represents a cycle of the machine, and during each cycle the paper strip is advanced a distance substantially equal to the peripheral length of the radially raised portion of the member 32, while the paper is held immobile for the period of time required for rotation of the transport roll assembly through the angle enclosed by the ends of the portions of reduced radius of the transporting members.

The punch or cutting device for cutting the arcuate blanks from the paper strip advanced intermittently onto the anvil table 21 includes the eccentric shaft 30 mounted rotatably below the anvil table at one side and a similar eccentric shaft 35 mounted below the anvil table at the other side of the latter (Fig. 5). Each eccentric shaft has a worm gear 36 fixed thereon (Fig. 4) which meshes with a worm 37 on a driving shaft 38 extending transversely below the anvil table. A pair of columns 39 extend upwardly from the anvil table at the front corners thereof, and a punch die carrier or shoe 40 is slidably mounted on those columns for vertical reciprocation. The vertical reciprocation of the die carrier is effected by connecting rods 41 rotatably mounted on the eccentric portions of the eccentric rods or shafts 30 and 35 and pivotally connected to the die carrier 40. A back-up plate 42 and a cutting die 43 are removably carried at the bottom of the die shoe to cut a curved blank, curving away from the direction of feed of the paper strip and having the shape of a segment of a ring, from the advanced section of the paper strip during the final increment of downward movement of the die shoe 40. It will be noted that the center of the area enclosed by the die 43 lies substantially in the lateral plane extending through the connecting rods 41 so that there is little if any rocking force exerted on the die shoe during the cutting operation. As seen in the top plan view of Fig. 5, the cutting die is formed to also cut the paper strip along lines 44 extending from the outermost corners of the curved blank to the adjacent side edges of the strip so that the scrap in advance of the cut blank is simultaneously cut free of the remainder of the paper strip when the blank is formed.

In order to clear the scrap from ahead of the cut blank prior to the advancement of the latter from the cutting or punching station, a feed roll assembly 45 is journalled in a recess provided in the anvil table at the rear thereof with the feeding rollers 46 thereof extending to the surface of the anvil to engage the lower surface of the paper positioned thereabove (Fig. 8). This lower rear feed roll assembly is continuously rotated through suitable sprockets and chains by an idler or transmission shaft 47 rotatably mounted below the anvil and carrying two sprockets. One of the sprockets 48 on the idler shaft assembly is driven by a chain trained over a sprocket 49 on the drive shaft 38, while the other sprocket 50 on the idler shaft drives a chain that is trained over a sprocket 51 on the lower rear feed roll assembly. A tensioning sprocket assembly 52 is adjustably supported below the anvil and engages the last mentioned chain for maintaining it under suitable tension.

With the paper freely resting on the surface of the anvil table, the contact pressure between the lower rear feed roll assembly 45 and the paper will be insufficient to effect advancement of the latter and the feed rollers 46 will merely slide or slip relative to the paper. In order to effect increased contact pressure between the paper and the rotated lower rear feed roll, an upper rear feed roll assembly 53 (Fig. 8) is provided to reciprocate vertically at desired intervals. The upper rear feed roll assembly includes a frame 54 extending laterally and having guide blades 55 affixed to its opposite ends to be slidably received within vertically extending guide blocks 56 mounted on the die carrier or shoe 40 (Figs. 5 and 8). The frame of this assembly is also provided with a guide key 57 mounted centrally on the front thereof for engagement in a vertical groove of a guide block 58 mounted on the rear face of the rear cross-web 59 of the shoe 40 (Fig. 5). Thus, the frame is stabilized both laterally and fore and aft during its vertical movement. Laterally spaced blocks 60 are secured to the bottom of the frame and support a shaft 61 on which rollers 62 are rotatably mounted. The rollers are spaced laterally so as to be disposed in vertical alignment with the respective rollers 46 of the lower rear feed roller assembly 45. A rear lift rod 63 extends upwardly from the center of frame 54 and through a rear opening 64 formed in a longitudinally extending guide plate 65 secured to the top of the die shoe 40. A compression spring 66 is disposed on the rear lift rod between the guide plate 65 and the frame 54 of the upper rear feed roller assembly to resiliently urge the latter downwardly relative to the cutting die shoe and into contact with the paper positioned therebelow. The downwardly directed pressure of spring 66 acting on the paper through the rollers 62 is sufficient to increase the contact pressure between the lower surface of the paper and the rollers of the lower rear feed assembly so that the latter will be effective to advance the paper.

In order to effect periodic lifting of the upper rear feed roller assembly 53 and disengagement of the latter from the paper, a lift bellcrank 67, having two angularly related lever arms 68 and 69, is pivoted between such arms on a laterally extending shaft or support 70 carried by the upper ends of the guide posts 39. The free end of the lever arm 68 extending rearwardly and overlying the cutting die shoe engages under a roller 71 mounted at the upper end of the lift rod 63. The free end of the other lever arm 69 carries a rotatable roller 72 acting as a cam follower and engaging the periphery of the radial cam 73 (Fig. 6) mounted on the transport shaft assembly 29 for rotation with the latter. The shape of this cam will be specifically discussed below, however, for the time being it will merely be noted that the cam rocks the lift bellcrank 67 to periodically raise the lift rod 63 and its associated feed roller assembly.

In addition to the upper and lower rear feed roller assemblies, upper and lower front feed roller assemblies are provided at the cutting or punch station to advance the cut curved blank from that station. The lower front feed roller assembly 74 is set into a recess formed in the face of the anvil table 21 in substantially lateral alignment with the plane of movement of the connecting rods 41 and includes a rotatable shaft 75 (Fig. 7) journalled in such recess and having a sprocket 76 fixed thereon to be driven by the same chain drive effecting rotation of the lower rear feed roller assembly. Two rollers 77 are fixed on the shaft and project to the surface of the anvil table to engage the paper on the latter.

The upper front feed roller assembly 78 (Fig. 7) includes a frame 79 having depending legs at its opposite ends rotatably supporting feed rollers 80 and extending through suitably positioned openings 81 formed in the die carrier or shoe 40, and in the backing plate and cutting die for contact with the paper therebelow. The frame 79 is guided in its vertical reciprocation by guide strips or blades 82 at its opposite ends working in guide blocks 83 carried by the die shoe 40 at the sides of the openings 81 therein through which the depending frame legs extend, and also by a guide key 84 (Fig. 5) secured centrally at the rear of the frame to move in a grooved guide 85 on the front web 86 of the die shoe 40. A lift rod 87 extends upwardly from the frame 79 of the upper front feed roller assembly and passes through the foremost opening 88 in the guide plate 65 with a compression spring 89 being interposed between the guide plate 65 and the frame 79 to resiliently urge the rollers of the upper front feed roller assembly into contact with the paper. As in the case of the upper rear feed roller assembly, the lift rod 87 is provided with a roller 90 at its upper end to engage on top of lever arm 68 of the rockable lift bellcrank intermediate the length of that arm, so that the upper front rollers will be lifted clear of the paper when the lift bellcrank is rocked through a predetermined angle.

It will be noted, that the free end portion of the lever arm 68 engaging the roller 71 of lift rod 63 is recessed at its top surface as at 91, so that, when such lever arm is rocked upwardly, it will first engage the roller 90 and lift the upper front feed roller assembly and then, only after further upward rocking, will it engage roller 71 and lift the upper front feed roller assembly; and conversely, downward rocking of the lever arm 68 first effects engagement of the upper rear roller assembly with the paper and then, after further downward rocking, effects engagement of the upper front roller assembly with the paper.

Referring to the specific form of cam 73 (Fig. 6), which controls the rocking of the lift bellcrank 67, it will be noted that the cam has a peripheral portion of large radius 92, dimensioned to effect the raising of both the front and rear upper feed roller assemblies when contacted by the cam follower 72 of the lift bellcrank, followed by a first step 93 of decreased radius, dimensioned to maintain the upper front assembly in raised position while permitting contact of the upper rear assembly with the paper, and then by a second step 94 of further decreased radius dimensioned to permit contact of both upper feed roller assemblies with the paper on the anvil table. The several peripheral portions 92, 93 and 94 of the cam extend over angles, and the cam itself is angularly positioned on the transport shaft assembly 29, so that the sequence of operation that follows is realized.

*Sequence of operation of the devices at the curved blank cutting station*

When the transport shaft assembly 29 is rotated to engage the enlarged portions of the transport members 32 with the paper strip on the feeding table 22, and the paper is thereby being advanced onto the anvil table at the cutting station, the eccentric shafts 30 and 35 are positioned to raise the die carrier or shoe 40 from the anvil table and the spring elements 95 (Figs. 4 and 5) function to guide the advancing paper under the cutting die. When the paper strip is being advanced to the cutting station and the die is raised, the cam follower 72 of the lift bellcrank engages the portion 92 of cam 73 of greatest radius so that both of the upper feed roller assemblies are raised out of contact with the paper. As the paper completes its intermittent advance to the cutting station the die shoe is brought down so that the die 43 cuts the advanced section of the paper strip, and while the die remains in paper engaging position, the lift bellcrank is rocked through its first increment of rocking motion by the first step 93 of the cam to engage the rear upper feed roller assembly with the paper scrap in advance of the cut blank so that such scrap paper is separated from the blank and moved to the rear by the cooperating upper and lower rear feed roll assemblies for disposal in a manner hereinafter indicated. As the cutting die begins its upward stroke and has released the cut blank, the second step 94 of the cam permits further rocking of the lift bellcrank to engage the upper front feed roller assembly with the cut blank so that the upper and lower front feed roller assemblies then cooperate to advance the cut blank from cutting station and between the still engaged upper and lower rear feed roller assemblies for further advancement. It will be observed that two pressure pad assemblies (Fig. 4) are mounted on the front of the die shoe 40 and each includes a plunger 96 spring urged downwardly into contact with the paper strip. The downward movement of the plunger 96 is limited so that it is raised clear of the paper strip when the die shoe has been lifted a predetermined amount to present no interference to the intermittent advance of the paper strip to the cutting station. However, during the advancement of the cut blank from the cutting station the pressure pads are still operative to engage the paper strip behind the cut blank so that the blank will be torn free of the following section of the paper strip in the event that the die has not severed the blank completely along the cutting lines. As the die once again reaches the upper extreme of its movement, both upper feed roller assemblies are again lifted and the advancement of the paper strip to the cutting station is repeated.

Finally, a hand crank assembly 97 is provided on the end of the worm shaft 38 which drives the eccentric shafts 30 and 35 for manually cycling the machine when the paper strip is being initially fed through the cutting assembly preparatory to the normal operation thereof. The hand crank is of conventional form and is constructed to remain motionless or coast during the ordinary operation of the machine and for this reason is provided with a one-way coupling to the worm shaft 38.

Positioned after the curved blank cutting assembly 20, described above, is a separator assembly 100 constructed to perform a dual function. The separator assembly 100 (Figs. 9, 10, 11 and 12) first serves to dispose of the paper scrap so that it will not interfere with the further advancing of the curved blanks, and also serves to advance and swing or turn the blanks to the required position for further movement along a conveyor to the winding station. It is necessary to swing or turn the curved blanks after they have been cut in order to satisfy the dual requirements of economy in the use of paper, that is, cutting the blanks from the paper strip so that a minimum of paper is wasted, and of efficiency in holding the overall dimensions of the machine to a minimum for easy installation and servicing.

The separator assembly 100 includes a table 101 and a trap door 102 hinged at an edge of the table to swing upwardly. The table and hinged door are supported to the rear of the cutting assembly 20 in a horizontal plane so that the table and the door, when the latter is flat, are positioned below the level of the surface of the anvil table 21 of the cutting assembly. The table and hinged door are positioned so that a laterally extending space is provided between the adjacent edges of the door and the anvil table.

A cam 103 is fixed on the end of eccentric shaft 30 underlying an end portion of the trap door 102, and a plunger 104 is supported for vertical reciprocation and is provided with a cam follower engaging the cam 103 to be moved vertically by the latter. The upper end of the cam actuated plunger 104 engages against the bottom of the trap door to periodically raise the door to a position in which the free edge of the latter facing toward the cutting assembly is raised above the level of the anvil table of the latter. The cam 103 is dimensioned and angularly positioned on its driving shaft 30 so that the trap door 102 is raised during that interval of the operating cycle when the rear feed roller assemblies 45 and 53 are effective to forward the paper scrap disposed ahead of the cut blank. The paper scrap is thus deflected downwardly through the opening provided by the lifting of the trap door and may be conveniently caught in a suitable receptacle (not shown) positioned below that door. As soon as the paper scrap has been thereby disposed of, the door operating cam 103 permits closing of the trap door so that the subsequently forwarded curved blank may pass onto the depressed supporting surface provided by the table 101 and the closed door 102. The curved blank is advanced by the front feed roller assemblies and the rear feed roller assemblies of the cutting assembly to a position in which the trailing portions of the blank are just clear of the contact points of the rollers of the rear feed roller assemblies. In this advanced position, a portion of the curved edge of the blank comes into contact with the similarly curved portion of the face of a fence 105 (Fig. 10) mounted on the table 101. This fence serves to position the curved blank prior to the swinging or turning movement of the latter in the manner hereinafter described from the position indicated in broken lines at A to the position indicated at B in Fig. 10.

The devices effecting swinging or turning of the curved blank include a continuous chain 106 moving in a vertical plane extending along the space provided between the free edge of the trap door and the adjacent edge of the anvil table of the cutting assembly, and having its upper run or pass disposed below the level of the table 101. The chain located as above is trained, at one end of its path, over a sprocket 107 carried by a stub shaft assembly 108 which has a gear 109 fixed thereon to be driven by a meshing gear 110 on the eccentric shaft assembly 30 and, at the other end of its path of travel, over an idler sprocket assembly 111 (Fig. 7) which is adjustably mounted at the rear of the anvil table 21. A finger element (Fig. 12), consisting essentially of an angle member 112 is mounted on the chain to extend substantially above the surface of the table when moving along the upper run of the path of travel of the chain and to engage the outer end corner of the curved blank during such movement. The mounting structure supporting the finger element 112 on the chain is preferably formed to permit pivoting of the element around its longitudinal axis so that continuous contact with the blank corner may be maintained during swinging of the blank, and the element is resiliently urged by a torsion spring 113 to the pivoted position required for initial contact with the blank corner which pivoted position is determined by cooperating stops 114 and 115 on the finger element and on the mount. The finger element 112 is positioned relative to the length of the chain so that the element comes into engagement with the blank corner immediately after the blank has come to rest against the positioning fence 105.

Since the line of movement of the finger element 112, and hence the line of application of force applied by it to the corner of the curved blank, lies to the front of the center of area of the blank, that is, to the front of the center of the frictional forces resisting movement of the blank, the lateral movement of the finger element in engagement with the corner of the curved blank produces a turning moment and will effect swinging as well as lateral movement of the curved blank. In order to increase the swinging effect of the force applied to the blank corner by the finger element, a drag force is applied to the blank to the rear of the center of area of the latter. This drag force is preferably applied to the curved blank by wheels lightly engaging the upper and lower surfaces of the blank and mounted for rotation about axes inclined relative to the lateral direction of movement of the finger element (Figs. 10 and 11).

In the illustrated embodiment of the invention the table 101 is provided with an opening 116 through which the lower drag wheel 117 projects to engage the lower surface of the curved blank. Each of the drag wheels 117 and 118, the latter engaging the blank from above, is rototably carried by a plunger 119 which is slidable in a guide 120 mounted for rotatable adjustment in the free end of a support arm 121. The upper dragwheel 118 is resiliently urged downwardly by a spring 122 compressed between the related plunger and an adjustment screw 123, while the vertical position of the lower drag wheel 117 is determined by an adjustment screw 124 carried by the related guide and engaging the end of the associated plunger. The rotatable adjustment of the guides 120 provides for adjustment of the inclination of the axes of rotation of the drag wheels so that the rapidity of the swinging motion of the blank may be conveniently varied.

Since the curved blank may have some tendency to bulge or buckle when force is applied by the finger element 112 to the corner thereof, an overlying roof assembly is provided for maintaining the curved blank in a substantially flat condition. The roof assembly includes a fixed roof element 125 supported at one end and extending forwardly over the table, and a hinged roof element 126 overlying a portion of the trap door 102 and hinged to the free end of the fixed roof element and to a hinge supporting spacer 127 adjacent the side edge of the spacer. The hinges supporting the hinged roof element 126 are constructed to stop the downward swinging of the latter at the horizontal position, while the trap door lifts the hinged roof element during the paper scrap disposing phase of operation. A deflector 128 is carried by the hinged roof element to guide the curved blank under the roof when the blank is advanced from the cutting station.

In order to limit the swinging or turning effect of the force applied by the finger element 112 to the curved blank and to positively position the blank after such turning or swinging movement for travel along a following conveyor assembly, a fence 129 is secured on the top surface of the trap door 102 adjacent its free edge to engage the trailing straight edge of the curved blank after the latter has been laterally moved and turned to a position in which that trailing straight edge is substantially parallel to the longitudinal axis of the base of the machine. It will be noted that the fence 129 is bevelled at the side facing the cutting station and that by reason of the depressed level of the table it does not extend above the surface of the anvil table (Fig. 9), so that the fence will not interfere with the movement of the cut curved blank from the cutting station to its position for turning against the curved fence 105.

A conveyor assembly 130 is mounted on the longitudinally extending leg of the frame 15 (Fig. 1) to receive the curved blank after the latter has been turned on the separator assembly 100 described above and then advance the curved blank to the winding station while glue is applied to selected areas of the blank and the trailing end portion is crimped. The conveyor assembly 130 shown in Figs. 13, 14, 15, 16 and 17 includes an elongated, preferably cast, frame 131 of H-shaped cross-section through a substantial portion of the length thereof, with the top surface of the horizontal web thereof supporting floor plates 132 at the level of the table 101 of the separating assembly and extending from the exit side of the latter to provide a feed table over which the curved blanks may be successively advanced. Edge guides 133 and 134 extend along the front and rear sides of the feed table, and the rear edge guide 134 extends over the table 101 of the separator assembly (Figs. 10 and 13) to provide a fence engageable with the outer curved edge of the turned blank for cooperation with the fence 129 in limiting the turning of the blank and in guiding the blank onto the feed table of conveyor assembly 130. When the blank is in its turned position B (Figs. 10 and 13), the leading portion thereof extends onto the conveyor feed table 132 to be gripped by advancing or transporting members for movement along the conveyor.

In order to grip the curved blank and advance it along the feed table 132 while simultaneously corrugating the trailing end portion along lines extending parallel to the trailing straight edge, laterally extending shaft assemblies 135 and 136 are rotatably and removably mounted in the frame 131 above and below the feed table and adjacent the entrance end of the latter. The upper shaft assembly 135 is provided with a lift-cam 137 (Figs. 14 and 18) for actuating a longitudinal registration device which positions the curved blank longitudinally preparatory to the movement of the blank along the conveyor feed table. The registration device includes a pivoted arm 138 from which a stop or registration element 139 depends, and a cam follower, in the form of a roller 140 which engages the lift-cam. The cam is formed with a flat portion for periodically lowering the stop or registration element to the feed table so that the leading end of the curved blank being advanced onto the feed table from the separator assembly may engage against the lowered stop and be positively positioned by the latter.

The upper shaft assembly also has mounted thereon three cam-shaped transport members 141 (Fig. 17) having raised portions extending on the peripheries thereof to engage the top surface of the positioned blank for forwarding the latter along the feed table. The cam-shaped transport members 141 cooperate with corresponding back-up rollers 142 secured on the lower shaft assembly 136 and extending through suitable openings in the feed table 132 for contact with the lower surface of a positioned curved blank. Since the curved blank when being forwarded along the feed table presents the portion thereof adjacent the edge guide 134 to the transport members 141 before the portions remote from that edge guide are so presented, the cam-shaped transport members 141 are fixed on the upper shaft assembly in angularly staggered relationship, as illustrated in Fig. 17, so that the raised portion of each comes into active position as the portion of the blank engaged thereby reaches the vertical plane extending through the axes of rotation of the upper and lower shaft assemblies. The upper and lower shaft assemblies are simultaneously rotated by chain and sprocket drives at rotative speeds sufficient to produce the same peripheral speeds at the surfaces of the raised portions of the cam-shaped transport members 141 and at the surfaces of the back-up rollers 142. The trailing end portions of the curved blanks are crimped by interengaging rollers 143 (Fig. 13) fixed to the upper and lower shaft assemblies and formed with a series of circumferentially extending grooves cooperating to form the desired corrugations extending parallel to the direction of movement of the curved blanks, that is, parallel to the trailing straight edge of the latter, as the blanks are advanced along the conveyor feed table.

From the station at which the blanks are longitudinally registered and the trailing end portion of each blank is crimped, the blanks are fed between an upper, profiled glue applying roller 144 (Fig. 13) engaging the top surface of the blank and a lower back-up roller 145 extending through the space between the adjacent end edges of two feed table forming plates for engagement with the lower surface of the blank. The glue applying roller 144 is formed with a relieved contacting surface rolled into a cylindrical form and having a flat plan form corresponding to a strip extending along the forward half of the outer curved edge of the curved blank and the trailing half of the blank. Thus, as the blank is passed between the upper profiled roller 144 and the lower back-up roller 145, the former is effective to apply glue to a strip along the leading half of the outer edge of the blank and the trailing half of the top surface of the blank. The rollers 144 and 145 have sprockets thereon of suitable pitch diameter to be driven by the same chain rotating the forwarding shaft assemblies 135 and 136 so that the rollers at the glue applying station are rotated at the same peripheral speed as the forwarding members.

A glue fountain assembly 146 (Figs. 14, 19 and 20) is mounted on top of the conveyor frame 131 for supplying glue to the profiled glue applying roller 144. The glue fountain assembly includes a housing 147 open at the top and bottom and extending across the conveyor frame, and pivoted adjacent one end on one side of the frame by a bracket 148 (Fig. 19). The opposite end of the housing is adjustably supported by a bolt 149 which extends threadedly down through a lug on the housing to bear against a toggle 150 mounted on a toggle shaft spanning the top of the conveyor frame. A driving roller 151 and a driven roller 152 are rotatable within the fountain housing 147 in side-by-side surface contacting relation, and the driven roller 152 constitutes a glue transfer roller for contact with the glue applying roller 144. Since the glue transfer roller is located adjacent the end of the fountain housing supported by the adjusting bolt 149, movement of the latter provides a control of the contact pressure between the glue transfer and applying rollers. The transfer roller 152 is provided with end flanges 153 which receive the roller 151 therebetween and define the opposite ends of a glue reservoir formed between the rollers 151 and 152 above the contact line thereof. The supply of glue is discharged into the reservoir defined as above from a supply bottle 154 (Fig. 1) to maintain a constant level in the reservoir. It is apparent that the thickness of the layer of glue transferred to the glue applying roller will depend upon the contact pressure between the rollers 151 and 152. In order to vary the contact pressure between the last mentioned rollers, the roller 152 is journalled adjacent its opposite ends (Fig. 20) in slidable bearing blocks 155 which are simultaneously moved back-and-forth by worm-gear driven screw members 156 acting against the blocks in one direction and actuated by a single worm shaft 157 and by springs 158 acting on the slidable bearing blocks 155 in the opposite direction. Further, in order to adjust the parallelism of the axes of rotation of the rollers 151 and 152 the roller 151 is mounted at one end in a bearing support (Fig. 14) including a lever 159 pivoted at one end in the bracket 160 on the conveyor frame for swinging in a vertical plane and threadedly carrying an adjusting bolt 161 for engagement with the top of the conveyor to provide for the lifting or lowering of the related end of the roller 151. Thus, the glue fountain 146 incorporates provisions for adjusting the contacting relationships of the several rollers so that a film of glue of uniform and desired thickness may be transferred to the glue applying roller 144 for application to the selected areas of the curved blank. The glue fountain also is constructed to permit the easy and quick removal of the rollers 151 and 152 from the housing 147. This quick removal is made possible by the removable side plates 162 which form the upper guides for the slidable bearing blocks 155 of the roller 152 and by the disconnect arrangement between the lever 159 and the support bearing for the roller 151. This disconnect arrangement includes a bearing 163, having one end of the shaft of roller 151 journalled therein, which is formed with two flattened sides and an upwardly opening recess 164 formed in the lever 159 to receive the bearing 163. The recess 164 has a substantially circular lower portion in which the bearing 163 may be turned and an outlet portion of reduced width through which the bearing 163 may pass only when the latter is arranged so that the flattened sides thereof engage the sides of the outlet portion. An operating handle 165 is secured to the bearing 163 for selectively manipulating the latter from a position in which the bearing is held within the circular portion of the recess 164 to a position in which the bearing may be removed upwardly with the shaft of roller 151. The end of the shaft of roller 151 opposite from the bearing 163 extends into a driving coupling assembly (Fig. 19) which includes a housing 166 pivoted on the bracket 148 and containing an axially movable clutch plunger 167 which is spring urged into driving engagement with the shaft of roller 151 and is splined or otherwise keyed to a driving sprocket 168. The sprocket 168 is driven by a chain trained over a sprocket 169 fixed on the shaft of the glue applying roller 144 (Fig. 13) and the glue transfer roller 152 is driven by meshing gears 170 and 171 (Fig. 19) on the shafts of rollers 151 and 152 so that the glue transfer roller 152 is driven at the same peripheral speed as that of the glue applying roller.

After passing between the profiled glue applying roller 144 and the back-up roller 145, the blank having glue on selected areas of the top surface thereof is further advanced along the feed table by a glue walker assembly 172 engageable with the top surface of the blank, and a cooperating back-up assembly having rollers 173 projecting through suitable openings in the feed table to engage the lower surface of the blank. The glue walker assembly 172 includes a shaft journalled in the frame 131 and having a cam-shaped transfer member 174 fixed thereon which is formed with a radially enlarged peripheral portion engageable with the portion of the top surface of the blank to which glue has not been applied and angularly positioned on its supporting shaft so that the radially enlarged portion comes into active position as the leading portion of the curved blank approaches the contact line of the transfer member 174 with the back-up roller 173. The assembly 172 further includes a glue walker wheel 175 (Figs. 13 and 21) which is formed of a disc core or body 176 having relatively thin blades 177 extending from the periphery thereof in a zig-zag course and positioned on the supporting shaft to make contact with the glued portion of the top surface of the blank adjacent the trailing straight edge of the latter. Since the blades 177 contact the glued surface only along a thin, continuous line there is practically no removal of glue from the blank. As in the case of the other rotating shaft assemblies of the conveyor, each of the assemblies 172 and 173 is provided with a sprocket driven by the common drive chain so that the rotation of all of these shaft assemblies is synchronized.

The source of driving power for rotating the several shaft assemblies of the conveyor 130 comes from a sprocket 178 (Figs. 4 and 5) on the eccentric shaft 35 of the cutting assembly 20 which is operatively connected, by a suitable chain 179, to a sprocket 180 fixed on the shaft 136 below the feed table at the entrance end of conveyor 130, so that the operation of the various units of the conveyor assembly is synchronized with the operation of the cutting assembly 20, as well as with that of the separator and turning assembly 100.

Since the curved blank is destined to form the frusto-conical neck part of the container and must be wound on the suitably tapered frusto-conical portion of the mandrel 181 at the winding station (Fig. 14), a problem is presented in feeding the curved blank to the tapering surface of the mandrel without twisting or warping the blank. This is accomplished by a turntable assembly which feeds the curved blank along a circular path in a plane inclined relative to the horizontal so that the leading end of the blank tangentially approaches the mandrel at the bottom of the latter. This inclined plane is provided or defined by the surface of an inclined table 182 (Figs. 14 and 15) mounted on the conveyor frame at the exit end of the feed table thereof and inclining or dipping away from the exit end at the same angle as the angle of taper of the frusto-conical portion of the mandrel, this angle being 9° in the illustrated device. The table 182 is formed with a curved wall 183 of constant radius at its outer edge which increases in depth so that the top thereof is substantially horizontal and fits under the curved end edge of the floor plate 132. The inclined table is formed with a depending hollow boss 184 concentric with the center of curvature of its curved outer wall and fitting loosely into a collar 185 forming part of the conveyor frame 131. Radially extending bolts 186 extend threadedly through this collar to engage the hollow boss 184 of the inclined table and provide means for adjusting the locating of the delivery end of the inclined table relative to the winding station. A hub 187 is mounted on the inclined table and includes a hollow cylindrical part 188 positioned in the hollow boss 184 through which a shaft 189 extends rotatably and an upstanding curved wall 190 on the table parallel to the outer wall 183 of the latter. The outer wall 183 of the table and the wall 190 of the hub cooperate to define a curving, downwardly inclined trough into which the curved blank may be dropped for the final stage of feeding to the winding station.

The final increment of advancement of the curved blank along the feed table effective to drop the blank from the level of the feed table into the curved trough of the inclined table 182 is effected by a finger assembly 191 (Figs. 13 and 16) carried for movement linearly along the exit end portion of the front side edge of the feed table to engage the trailing portion of the curved blank and push the latter before it. The finger assembly 191 is mounted on a continuous chain 192 running over a sprocket 193 rotatable on the glue walker shaft assembly 172 and over one course of a double sprocket 194 rotatable on an idler post or shaft 195 carried by the conveyor frame. The double sprocket 194 is driven by a chain passing around the other course thereof and around a sprocket 196 fixed on the glue walker shaft assembly. The various sprockets cooperating in driving the finger element 191 are dimensioned so that the linear velocity of the latter, when moving along the lower horizontal run or pass of its supporting chain, is the same as the peripheral speed of the other feeding members, for example, the glue walking wheel 175.

Once the curved blank has been dropped into the curved trough of the inclined table it is advanced along the path defined by the trough until the leading straight edge arrives tangentially at the take-up line at the bottom of the surface of the frusto-conical portion of the mandrel 181. To produce this last advancement of the curved blank, a radial arm 197 is fixed on the top end of the shaft 189 and carries a depending pin 198 at its free end to extend down and ride in a curved groove 199 formed in the bottom of the trough. When the arm 197 is rotated clockwise, as viewed from above (Fig. 15), the depending pin 198 engages the trailing straight edge of the blank and pushes the latter ahead of it to the take-up point. The arm 197 is resiliently urged by a spring 200 in the counter-clockwise direction, to a starting position against a stop 201 in which starting position the depending pin 198 does not interfere with the entrance of the curved blank into the inclined, curved trough. In order to swing the arm 197 clockwise, the shaft 189 is continuously rotated clockwise, as viewed in Fig. 15, and carries a radially projecting pin 202 below the arm 197 for engagement with the lower rounded end of a clutch pin 203 movably carried by the arm and spring urged into the path of the radial pin 202. When the radial pin 202 rotates with the shaft 189 against the clutch pin 203, the latter and the related arm 197 are swung before it to feed the curved blank to the take-up line. The movement of the swinging arm in the feeding direction is limited by a stop 204 projecting into the path of travel of a shoulder 205 on the hub of arm 197 and when engagement with the stop is affected the clutch pin 203 is pushed upwardly and passed by the radial pin 202 on the rotating shaft 189. The return spring 200 then swings the arm 197 counter-clockwise back to its starting position.

The continuous rotation of the shaft 189 is effected by a sprocket 206 fixed to its lower end and receiving a continuous chain 207 which also runs around a sprocket 208 of a transmission assembly which is fixed on a shaft 209 rotating about an axis inclined parallel to the axis of shaft 189. The transmission assembly shaft 209 has a bevel gear 210 thereon which meshes with a bevel gear 211 fixed on a horizontal, rotatable stub shaft 212 journalled on a side of the frame 131. A sprocket 213 is fixed on the shaft 212 and is driven by the same continuous chain driving the other rotating units of the conveyor assembly.

Thus, the operations of the cutting assembly, separator assembly, conveyor assembly and turntable assembly are all integrated and synchronized to successively cut curved blanks and advance the same to the take-up or winding station in position for winding on the frusto-conical portion of the mandrel 181 then residing at the winding station. While these assemblies are successively performing the respective functions, other mechanisms hereinafter described are simultaneously operating during each cycle to provide a suitably formed rectangular blank positioned at the winding station in proper relation to the curved blank for winding with the latter onto the mandrel to form the container body.

*Section of the machine preparing the rectangular blanks for winding*

The mechanism for preparing the rectangular blanks for winding draws a continuous strip or web of paper from a roll, applies printed matter to the strip at suitably spaced locations, cuts the strip into rectangular sections or blanks while simultaneously crimping the trailing end portion of each blank, applies glue to the trailing half of the upper surface of each blank and forwards the glued blanks to the winding station while registering each blank longitudinally and laterally relative to the corresponding one of the curved or arcuate blanks and relative to the mandrel at the winding station.

The mechanism for preparing the rectangular blanks is carried by a cantilever support 214 extending rearwardly from the central support pedestal 14 (Fig. 3) and having brackets 215 at its rear end between which a roll of paper 216 is rotatably mounted. Upstanding frame members 217 and 218 are mounted on the cantilever support 214, adjacent the rear and forward ends, respectively, of the latter, and a printing unit 219 (Fig. 22) is positioned between these frame members.

The printing unit 219 is of the "Anilox Type" and includes a frame 220, secured to the front face of frame member 217, and rotatably carrying a back-up roller 221 and a printing cylinder 222 arranged for rotation about parallel horizontal axes with the back-up roller 221 being disposed to the rear of the printing cylinder and having end flanges for laterally guiding the paper strip P which is drawn from the roll 216 under and around the back-up roller. The printing cylinder 222 is formed with a radially raised portion extending around substantially one-half of the periphery thereof to carry the printing plate for contact with the paper strip on the back-up roll 221. The printing cylinder is dimensioned so that the circumference of a circle having the radius of its raised portion is substantially the length of the rectangular blank to be cut from the continuous paper strip.

An ink reservoir 223 is carried by the frame 220 and has a rotatable ink supplying roller 224 dipping therein and effecting surface contact with a rotatably ink transferring roller 225 positioned to transfer ink to the printing plate on the raised portion of the cylinder 222. Since the plate carrying portion of the cylinder extends only around one-half of the periphery thereof, only that raised half is operative to receive ink from the transfer roll 225 and to impress the paper strip backed by the back-up roll 221 and, thus, the printed areas of the paper strip are spaced apart by bare areas of equal length which form the inner plies of the container bodies provided by winding of the blanks.

The printing unit is operated by a chain 226 running over and idler sprocket 227 carried by the frame 220, and meshing with a sprocket 228 fixed on one end of the shaft of the back-up roll 221. Another sprocket is fixed on the other end of the shaft of the back-up roller and sprockets are also fixed on the adjacent ends of the printing cylinder 222 and ink transfer roll 225 with a continuous chain 229 running around these sprockets to drive the printing cylinder and ink transfer roll from the back-up roll and at the same peripheral speed as the latter.

From the back-up roll 221, the printed paper strip P runs upwardly and rearwardly to the entrance end of the rectangular blank conveyor or feeder assembly 230 (Figs. 22 and 23). The distance traveled by the paper strip from the printing unit 219 to the entrance end of the feeder assembly 230 is sufficiently great to provide ample time for drying of the printed impression.

The feeder or conveyor assembly 230 includes an elongated frame 231 of generally H-shaped cross-section, and a bracket or extension 232 secured to the end of the frame 231 facing the winding station with the horizontal portion of the bracket 232 disposed at the same level as the horizontal web of the frame 231. The frame 231 is mounted at its forward end on the frame member 218 and at its rear end on the frame member 217 so that the horizontal portion of bracket 232 and the web of frame 231 lie in a plane which is substantially tangential to the bottom of the cylindrical portion of the mandrel at the winding station. Floor plates 233 are mounted on the bracket 232 and the web of the frame 231 to form a feed table over which the rectangular blanks are advanced to the winding station. Edge guides 234 and 235 are mounted along portions of the side edges of the floor plates to guide the rectangular blanks along the feed table.

At the entrance end of the frame 231 remote from the winding station, an upper feed roll shaft assembly 236 and a lower feed roll shaft assembly 237 are journalled removably in the sides of the frame above and below the level of the feed table. The printed paper strip is fed over the lower feed roller provided with side flanges 238 for laterally positioning the paper strip, and the paper is withdrawn from the roll 216 and pulled through the printing unit as well as forwarded over the feed table by the cooperative action of the rotated upper and lower feed roll assemblies. In order to reduce the space required for the feed roller assemblies, the feed rollers are of reduced diameter so that they rotate twice for each cycle of the machine. Each of the feed roll shaft assemblies includes a sprocket 239 adjacent one end for engagement by a driving chain 240 which synchronizes the operation of the various devices working on the rectangular blanks during movement over the feed table.

From the upper and lower feed rollers 236 and 237, the paper strip is pushed along between cooperating shaft assemblies 241 and 242 (Fig. 24) which cut the strip into lengths to provide the rectangular blanks and corrugate the trailing edge portion of each blank in substantially simultaneous operations. The cutting and crimping shaft assembly 241 is journalled in the frame above the feed table and includes a radially extending, counter-balanced body 243 providing a holder for a crimping or corrugating blade 244 and an adjacently arranged cutting blade 245. The shaft assembly 241 is rotated once during each cycle of the machine and the active faces of the crimping and cutting blades are spaced from the axis of rotation a distance so that the peripheral speed thereof is the same as that of the advancing paper strip. The cooperating shaft assembly 242 is mounted below the feed table and has a body 246 mounted thereon to carry an anvil 247 having axial crimping grooves formed in the face thereof to project through an opening in the feed table. The shaft assembly 242 is rotated at twice the rotational speed of the assembly 241 but the anvil 247 is distanced from its axis of rotation only one-half the distance of the cutting and crimping blades from their axis of rotation, so that the cutting and crimping blades 244 and 245 and the anvil 247 have the same peripheral velocities and act as flying shears to cut the paper strip into suitable lengths and crimp the trailing end portions thereof. Each of the shaft assemblies 241 and 242 has a sprocket 248 thereon to be engaged by the driving chain 240 for operation in synchronism with the feed roll assemblies, and the chain 226 driving the printing unit 219 is driven from a sprocket on the shaft assembly 242 so that the cutting and crimping operation is also synchronized with the printing operation. A crank assembly 97a is mounted on an end of the shaft assembly 242 for manually operating the straight feed assembly in initially passing the paper strip therethrough. The crank assembly 97a is similar to the crank 97 on the curved blank cutting assembly 20 and is coupled to the shaft for one-way rotation so that the crank freewheels or coasts during normal operation.

From the cutting and crimping station, the cut rectangular blanks each pass along to a gluing station at which glue is applied to the trailing half of the upper surface thereof. A glue applying roll assembly 249, journalled in the frame above the feed table, and a cooperating glue back-up roll assembly 250, journalled in the frame below the feed table and projecting through openings in the latter, are located at the gluing station. The glue applying roll assembly 249 makes one revolution for each cycle and includes a glue applying roll having a semi-cylindrical radially raised surface portion for applying glue to only the trailing half of each blank. The radius of this radially raised surface portion is slightly larger than the radius at the active face of the cutting blade 245 of the cutting and crimping shaft assembly 241 so that the peripheral speed of the former is greater than that of the latter to thereby create a pull on the paper strip during the cutting thereof and insure the separation of the strip along the sheared line.

The glue back-up roll assembly 250 and the glue applying assembly 249 are each provided with a sprocket 251 engaged by the driving chain 240 so that the peripheral speeds of the back-up roll and of the raised portion of the glue applying roller are the same, and the glue applying assembly includes a second sprocket 252 driving a chain 253 which runs over the sprocket 168a on the driving roll of a glue fountain assembly 146a which is positioned on top of the feeder frame 231 to deposit glue on the glue applying roll and which is similar in construction and operation to the glue fountain 146 of the curved blank conveyor hereinbefore described.

The glued rectangular blank is forwarded from the gluing station by a glue walker shaft assembly 254 mounted above the feed table and working against a cooperating rubber roll shaft assembly 255 mounted below the feed table and projecting through suitable openings in the latter for engagement with the lower surface of the glued blank. Both of the shaft assemblies 254 and 255 are provided with sprockets 256 engaged by the driving chain 240 for rotation synchronized relative to the other units operated by that chain.

The glue walker assembly includes a glue walker wheel similar to the wheel 175 and formed with blank engaging blades extending from the periphery thereof in zig-zag fashion over a length of the periphery enclosed by approximately 230°. The glue walker wheel is angularly arranged on its shaft assembly so that the last of the blades thereof is moved out of engagement with the advanced blank before the leading edge of the latter moves into take-up position at the bottom of the cylindrical portion of the mandrel 181 in residence at the winding station.

The final increment of longitudinal movement of the rectangular blank is produced by a pusher mechanism (Figs. 26 to 29 inclusive) which includes a swinging finger 257 which is operated to project through a longitudinal opening 258 in the feed table 233 and engage against the rear edge of the blank to forward the latter after the glue walker assembly 254 has released the blank. The swinging finger 257 is pivoted on the end of a lever arm 259 mounted below the feed table for swinging in a horizontal plane. A jack lever 260 is rockably mounted at a side of the feed table for movement in a vertical plane and is connected to the lever arm 259 by a link 261 of adjustable length. A cam arm 262 is fixed on the shaft assembly 254 for rotation with the latter and is engageable with the jack lever 260 to rock the latter in the direction for moving the swinging finger 257 against the rear edge of the blank to feed the latter, while a spring 263 is connected to the jack lever 260 for moving the latter in the direction returning the swinging finger to its inoperative position. The swinging finger 257 itself is urged by a spring 264 (Fig. 27) to a position projecting above the feed table surface and a finger trip 265 is positioned below the table to engage the finger when the latter is returned to its inoperative position and pivot the finger to a position below the feed table surface.

In order to laterally register the rectangular blank during its last increment of movement by the above described swinging finger, a side guide 266 (Figs. 23 and 25) is adjustably mounted at one side edge of the terminal portion of the feed table. This side guide is urged by springs 267 toward the adjacent side edge of the blank and the movement of the guide in that direction is limited by adjustable bolts 268 adjacent its ends so that the lateral position of the blank as well as its angular relation to the axis of the mandrel 181 in residence at the winding station may be conveniently varied. The rectangular blank is moved laterally against the side guide by a lateral pusher 269 which is urged by a spring 270 toward the adjacent edge of the blank and is held in inoperative position by an axial cam 271 on the shaft assembly 254 until the blank has been released by the glue walker and is under the forwarding influence of the swinging finger 257.

The shaft assembly 255 carries a sprocket, in addition to the sprocket 256 engaging the chain 240, which is rotated to effect operation of the units or assemblies of the conveyor or feeder assembly 230 as well as of the printing unit 219. As will be hereinafter seen, the driving worm shaft 38 of the cutting assembly 20 and shaft assembly 255 of the rectangular blank preparing mechanisms are both driven from the same main drive shaft of the machine forming the container bodies so that the operation of the section of the machine preparing the rectangular blanks is synchronized with that section preparing the curved blanks to simultaneously provide paired rectangular and curved blanks at the winding station. The adjustable side guide rail 266 provides for the directional adjustment of the final increment of travel of the rectangular blanks, while the adjustable link 261 provides for longitudinal adjustments of this final increment of travel. These adjustments for positioning the rectangular blanks at the winding station and the adjustments previously referred to for controlling the position of the curved blanks at the winding station, make it possible to conveniently arrange the parts so that each curved blank arrives at the winding station with its outer curved edge underlying the adjacent straight side edge of the related rectangular blank, and with its leading straight edge somewhat trailing the leading edge of the rectangular blank.

*The upper turret assembly*

As seen in Figs. 1 and 2 of the drawing, an upper turret assembly 272 is rotatably mounted on a turret supporting frame 273 which extends longitudinally of the base 11 and is supported at one end on the central pedestal 14 and at the other end on a frame member 274 extending upwardly from the base at the end of the latter remote from the cutting assembly 20. The upper turret assembly 272 includes a turret shaft 275 (Fig. 41) journalled in the frame 273 adjacent the upper corner of the latter nearest the center of the base 14 for rotation about a fore-and-aft extending horizontal axis. A hollow hub 276 is provided on the forward end of shaft 275 and has four flat outside faces square to each other and each formed with a radial bore 277. The turret shaft is rotated through suitable gearing by a turret drive, hereinafter described, in a step-by-step manner. For the present it is sufficient to state that the turret drive provides for the rotation of the hub 276 through an angle of 90° for each cycle of the machine, with the hub being maintained for a predetermined interval at an indexed position during each cycle.

A radially extending mandrel assembly 181 is mounted on each of the flat side faces of the hub 276 for swinging movement with the latter along an orbital path which lies in a vertical plane in front of the frame 273. The axis of rotation of the hub is disposed so that, when each mandrel assembly 181 reaches the horizontal position extending toward the conveyor assembly 130, that mandrel assembly is then at the winding station to have a rectangular blank paired with a curved blank wound thereon.

Each mandrel assembly 181 (Figs. 30 and 31) includes a hollow shaft or trunnion 278 secured to the hub 276 with its longitudinal bore registering with the radial bore 277 of the hub opening at the related flat side face. A hollow mandrel shell 279 is supported rotatably at one end on the trunnion by suitable anti-friction bearings, and is formed with an outer surface having a cylindrical portion, extending to the supported end thereof, and a frusto-conical portion, extending to the free end thereof, to receive the rectangular and curved blanks, respectively. A spinning nose 280 is formed to telescope into the open free end of the mandrel shell 279 and a spring 281 is provided within the shell to resiliently urge the nose to a projecting position. A latch shaft 282 is fixed to the spinning nose 280 and extends axially into the shell 279 for sliding movement in a bushing 283. The latch shaft 282 is formed with an enlarged head or piston 284 at its end which is slidable into a cylinder-like counter-bore formed in the bushing 283 when the spinning nose is in projecting position. A sealing ring 285 is carried by the head 284 of the latch shaft so that the movement of the nose to its projecting position under the influence of the operating spring is retarded by an air cushion in the cylinder-like counter-bore of the bushing. The head 284 of the latch shaft is formed with a circumferentially extending groove 286 in which a latch lever 287 engages when the nose is retracted into the mandrel shell. The latch lever 287 is pivotally mounted for swinging in a radial plane and is urged by a spring 288 (Fig. 31) inwardly to engage in the groove of the head of the latch shaft for holding the nose in retracted position.

A latch releasing rod 289 is slidably extended through the bore of the shell supporting trunnion 278 and at its outer end is formed with an inclined surface 290 engageable with the latch lever to rock the latter to release position when the releasing rod 289 is moved outwardly by a radial cam 291 adjustably fixed within the hub 276 and engaging a cam follower roller 292 on the inner end of the releasing rod. The rod is continuously urged to an inoperative position by a spring 293 and is moved outwardly to release the latch when the cam follower rides on the raised portion of the cam 291. The raised portion of the cam is angularly positioned relative to the path of travel of the mandrels to effect release of the latch of each mandrel as the latter is indexed to the winding station so that the spinning nose 280 of the mandrel assembly is in projecting position when the mandrel reaches the winding station to have a curved blank and a rectangular blank wound thereon.

A winder assembly 294 (Figs. 32 and 33) is located at the winding station and includes a frame mounted atop the front portion of the pedestal support and formed by an outer support 295 disposed outside of the path of travel of the free ends of the mandrels and extending from in front of the plane of movement of those mandrels to a point in back of that plane and an inner support 296 disposed in front of the plane of movement of the mandrels so as not to interfere with the indexing of the latter, with a base 297 joining the inner and outer supports and secured to the central pedestal support. A rocker arm assembly includes a cast rocker arm 298 having substantially L-shaped sides pivoted on the adjacent inner and outer supports for swinging about an axis in front of the plane of movement of the mandrels and connected together by a cross-portion at their free ends. A bracket 299 extends from the outer L-shaped side to provide a bearing for the outer end of a frusto-conical section 300 of a pressure roller, while a bracket 301 extends from the inner L-shaped side to rotatably support the inner end of the cylindrical section 302 of the pressure roll. A bearing bracket 303 extends from the center of the cross-portion of rocker arm 298 to support the adjacent ends of the conical and cylindrical sections of the pressure roller. Miter gears (not shown) are carried by the adjacent ends of the roller sections 300 and 302 and mesh so that both sections rotate together. An air cylinder 304 is rockably mounted between supporting brackets 305 on the frame base 297, and the piston rod or plunger 306 of the air cylinder is pivotally connected to the rocker arm assembly 298 to swing the latter between an operative position, shown in Fig. 32, in which the pressure roller effects linear contact with the bottom of a mandrel at the winding station, and an inoperative position, in which the pressure roller is swung to the rear of the plane of movement of the mandrels so as not to interfere with indexing of the latter to and from the winding station.

With a mandrel in residence at the winding station and the rocker arm assembly in operative position to contact the pressure roller with the mandrel surface, the paired curved and rectangular blanks are fed between the contacting surfaces of the mandrel and roller by the respective feeding mechanisms. The pressure roller is then rotated to frictionally effect rotation of the mandrel dwelling at the winding station while the blanks are guided around the mandrel to encase the latter in a container body of double layers of paper with an interlocked seam between the conical and cylindrical portions thereof. In order to rotate the pressure roller and, by frictional contact, the mandrel at the winding station, a gear 307 is fixed to the shaft extending from the inner end of the cylindrical section 302 thereof and meshes with a gear 308 rotatably mounted on the adjacent side of the rocker arm 298. A sprocket 309 and a spur gear 310 are rotatable together on the inner pivot of the rocker arm assembly, and an idler gear 311 is rotatable on the rocker arm in continuous meshing engagement with the gear 310 as well as the gear 308. A double sprocket 312 is rotatably mounted on the support 296 and a chain runs over one course of the double sprocket 312 and around the sprocket 309 to drive the latter. A driving chain runs over the other course of the double sprocket 312 and around a sprocket 313 on an idler shaft which is in turn driven, through a sprocket and chain connection by the main feeder drive shaft assembly hereinafter described.

In order to guide the blanks around the mandrel during the winding operation, a plurality of pairs of front and rear sets of finger assemblies 314 (Fig. 34) are mounted to substantially embrace the circumference of the mandrel from opposite sides during winding and to be withdrawn out of the path of the mandrels during indexing of the latter. Each of the front and rear sets of finger assemblies includes two separate fingers 315 and 316 having inner surfaces shaped to conform to the circumference of the mandrel at their location. Each finger is formed with an elongated slot 317 and an offset lug 318 at the base end thereof and the bases of the fingers 315 and 316 of each set are received within a clevis bar 319 which has two pivot pins 320 and 321, one extending through both slots 317 and the other located between the lugs 318. A spring member 322 engages both of the fingers at about the midpoints thereof to urge the fingers together while the lugs 318 engaging the related pin 321 limit the spring urged movement. Each clevis bar 319 is pivotally supported at spaced points on its length by arms 323 and 324 depending respectively from parallel rockable shafts 325 and 326. This support for the clevis bars constitutes a parallel motion so that when the shafts 325 and 326 are rocked, the clevis bars 319 are moved substantially linearly toward and away from the path of movement of the mandrels. In embracing the mandrel, the fingers 315 and 316 are spread apart from their spring urged positions, while the floating nature of the fingers attachment to the supporting clevis bar permits orientation of the fingers for even contact with the mandrel along the entire surface of contact. A control lever 327 is fixed to each shaft 326, and a crank arm 328 is fixed to the rocker arm assembly 298 for pivoting movement with the latter, with the free end of the crank arm 328 connected to the levers 327 by links 329 so that the control shafts 326 are rocked to move the fingers away from the path of travel of the mandrels, when the rocker arm assembly is swung to inoperative position, and conversely to move the fingers to mandrel embracing position when the rocker arm is rocked to operative position.

In order to synchronize the actuation of the pressure roller and finger supports with the indexing of the upper turret, the flow of compressed air to the actuating air cylinder is controlled to retain the rocker arm in inoperative position, during indexing of the turret and to move the rocker arm to operative position during the interval of dwell of the mandrel at the winding station.

After the paired rectangular and curved blanks have been wound upon the mandrel to form a container body encasing the mandrel shell, the turret is rotated 90° in a clockwise direction as viewed from the front to next position the container body carrying mandrel at a pressing station, which station is located at the top center of the orbital path followed by the mandrels. A pressing assembly 330 (Fig. 37) is disposed at the pressing station and includes a support 331 extending upwardly from the top flange of the turret supporting frame 273 (Fig. 3) and terminating at the top in a horizontal shelf 332 on which an air pressure operated cylinder 333 is mounted. The plunger of the air cylinder extends through an opening in the shelf, and at its lower end carries a cone shaped presser 334 having the same taper as that of the frusto-conical part of the mandrel and in axial alignment with the mandrel 181 at the pressing station. The lower edge portion of the presser 334 is formed with axial slots 335 and is bent inwardly to form a cylindrical lower edge portion having an inner diameter the same as the outer diameter of the container body at the laminated midsectional seam between the conical and cylindrical portions thereof. When the air cylinder 333 is actuated during the residence of a container body carrying mandrel at the pressing station, the presser 334 moves downwardly onto the container body to press together the doubled layers of the curved blank forming the conical portion of the body and to press the lower edge of the curved blank onto the underlying portion of the rectangular blank forming the cylindrical portion of the body so that a secure and tight bond is obtained at the several seams and between the doubled layers. In order to prevent the removal of the container body from the supporting mandrel when the presser 334 is lifted, a snubber assembly 336 is mounted on the side of the support 331 to resiliently engage the cylindrical portion of the container body and frictionally hold the body on the mandrel. During indexing of the mandrel to and from the pressing station, the mandrel is free to roll about its longitudinal axis for movement onto and off the snubber assembly, but once at the pressing station, with the mandrel in its dwell condition, the snubber assembly prevents rotation of the mandrel as well as axial removal of the container body. The flow of compressed air to the air cylinder is controlled to provide a complete cycle of operation of the pressing assembly during the dwell interval of a mandrel at the pressing station.

From the pressing station the container body supporting mandrel is moved to a mouth forming station, by further rotation of the upper turret 272 through an angle of 90°, at which station a rolled bead or rim is formed on the end of the conical portion of the container body by a spinning operation. However, in moving from the pressing station to the mouth forming station, each container body supporting mandrel 181 sweeps past a wax pot assembly 337 (Fig. 1) which applies paraffin or wax to the container body adjacent its opposite ends to act as a lubricant during subsequent spinning operations. The wax pot assembly (Figs. 38 and 39) includes a wax pot or reservoir 338 mounted on top of the turret supporting frame 273 in back of the plane of travel of the mandrels and just above the mouth forming station. Electric heaters 339 extend into the wax pot to maintain the wax contained therein in a fluid condition and the supply of electrical energy to the heaters is controlled by thermostatic switches 340. A shaft 341 journalled in the end walls of the wax pot 338 is rotated by a suitable electric motor 342 and carries two wax wheels 343 dipping into the liquid wax and projecting through suitable slots 344 in the front wall of the reservoir for momentary engagement with the container body on the mandrel (shown in broken lines in Fig. 38) adjacent its opposite ends.

A mouth spinner assembly 345 (Fig. 40) is located at the mouth forming station which is diametrically opposed to the winding station and includes a housing 346 secured to the front side of the turret supporting frame 273 (Fig. 2) and formed with a horizontally extending bore 347 in axial alignment with the mandrel in residence at the mouth forming station. A bushing 348 is slidable axially in the bore 347 of the housing and rotatably carries a shaft 349 having a spinner 350 mounted on the end thereof extending toward the free end of the mandrel. A driving sleeve 351 is rotatable in the housing with the shaft 349 extending slidably through the sleeve 351 and keyed thereto. A pulley 352 is fixed on the driving sleeve 351 and engaged by a drive belt 353 which extends around a driving pulley 354 on one end of the shaft of an electric motor 355 (Figs. 1 and 2) mounted on top of the turret supporting frame 273. In order to effect axial movement of the shaft 349 and its spinner into and out of spinning engagement with the mouth end of the container body on the mandrel in residence at the mouth forming station, the bushing 348 is provided with diametrically opposed trunnions extending through longitudinal slots in the housing 346 and pivotally connected by links to the adjacent ends of lever arms 356 and 357 each of which is fixedly mounted intermediate its length on a pin 358 pivotally carried by the housing 346. The lever arm 356 is of greater length and at its end remote from the link connection to the bushing is secured to a spring 359 which resiliently rocks the lever arm 356 to a position withdrawing the spinner 350 from the mouth end of the container. A cam follower roller 360 is rotatably mounted on the lever arm 356 at a point between the pivot pin 358 thereof and the end connected to the spring 359 and engages the periphery of a radial cam 361 which is rotated so that the cam is operative to periodically effect rocking of the lever arm 356 in the direction for moving the spinner axially into spinning engagement with the mouth end of the container. The rotation of the operating cam 361 is controlled so that the spinner is moved into spinning position, when a mandrel is in residence at the spinning or mouth forming station, and is withdrawn to inoperative position by the spring 359, outside the path of travel of the mandrels, during indexing of the mandrels to and from the mouth forming station.

The spinner 350 is provided with a finned member 362 extending therearound to dissipate the heat generated during the spinning operation and the confronting faces of the spinner 350 and the spinning nose 280 (Fig. 30) are formed with circular complementary grooves 363 and 364, respectively, to direct the edge of the container body into the form of a compactly rolled bead or rim as the spinner is moved axially toward the spinning nose and rotated. As the spinner moves axially in the direction toward the mandrel, a roller 365 mounted in the spinner engages the latch shaft 282 of the mandrel assembly to push the shaft 282 before it and telescope the spinner nose 280 into the mandrel shell, with the latch device or lever 287 then being conditioned to hold the latch shaft in nose retracting position at the completion of the spinning operation.

After the rolled bead or rim has been formed on the conical end of the container body to define a mouth, the upper turret 272 is further indexed through 90° to position the container body supporting mandrel at a stripping or transfer station, at which station the mandrel extends vertically down from the turret hub. A transfer assembly 366 (Fig. 41) is located at the stripping or transfer station to remove the container body from the mandrel at that station.

The transfer assembly 366 (Figs. 41, 42 and 43) includes elongated, vertical supports or frame members 367 and 368 disposed at the transfer station in front of and in back of the plane of movement of the mandrels, respectively. Vertical guide shafts 369 and 370 are supported in the frame members and a block 371 is vertically slidable on each of the guide shafts. A stripping element 372 is pivotally mounted on each block, and is formed with an arcuate side face 373 shaped to conform to the adjacent portion of the surface of the cylindrical section of the mandrel shell. The elements 372 are urged by springs 374 to pivot to positions in which the arcuate side faces thereof contact the surface of the mandrel shell so that the lower edges of the side faces 373 may engage the base edge of the container body to push the latter downwardly off the mandrel as the blocks 371 travel down the guide shafts. Vertical movement of the blocks 371 is effected by continuous chains 375 affixed thereto and trained over sprockets 376 and 377 rotatably carried by each frame member adjacent the upper and lower ends thereof, respectively, and idler sprockets 378 mounted on the frame, and finally around sprockets 379 on a driving shaft 380. The shaft 380 has a driving sprocket 381 fixed on one end thereof which is driven by a chain 382 (Fig. 43) from a swagger assembly as hereinafter described.

The rotational movement of the shaft 380 is controlled so that the stripping elements 372 are at their uppermost positions as the container body carrying mandrel moves to the transfer station, and each stripping element is provided with rollers 383 at its opposite ends to be engaged by the mandrel so that the latter may spring the stripping elements apart to the position of the right hand element of Fig. 41 in moving to residence at the transfer station between the arcuate faces of the elements. Each stripping element 372 is further provided with pins 384 depending from the lower end thereof in facial alignment with the arcuate side face 373 to prevent lateral tilting of the container body after stripping thereof has proceeded to the point where the cylindrical section of the container body no longer engages the cylindrical section of the mandrel shell. The swinging movement of the stripping elements toward each other is adjustably limited by a bolt 385 threadedly carried by each element for engagement with a shoulder 386 formed on the related guide block 371.

In order to prevent free fall of the container body after its cylindrical section has passed off the cylindrical section of the mandrel shell, a brake assembly 387 (Figs. 41 and 44) is mounted on the lower end of frame member 367 to frictionally retard the downward movement of the container body so that the stripping elements are in continuous pushing contact with the base edge of the container during the entire stripping stroke. This brake assembly 387 includes two claw-shaped members 388 pivoted on a support 389 for swinging in a horizontal plane across the path of movement of the container body and urged together by a light spring 390 to grasp the container body between arcuate gripping edges thereof. A stop block 391 is interposed between the claw-shaped members 388 to limit the movement of the latter toward each other.

Thus, when the stripping elements 372 are both displaced downwardly to the position of the element shown in broken lines at the left hand side of Fig. 41, the wound container body 392 is pushed off the mandrel, and, as will hereinafter appear, is projected into a suitable receptacle of a lower turret or turntable assembly.

The lower turret or turntable assembly

The lower turret assembly, generally indicated by the reference numeral 393 (Figs. 1, 46 and 47), which receives the container body at the stripping or transfer station includes a turntable having a circular table portion 394 and a depending, hollow base portion 395 within which a king pin or fixed pedestal 396 extends for rotatably supporting the turntable. The king pin 396 extends vertically from the base 11 of the machine and is positioned so that the six equally spaced container body receiving cells, each generally indicated by the numeral 397 and mounted on the turntable, travel along a circular path which at the transfer station is in vertical alignment with a vertical line passing through the axis of rotation of the upper turret. While the drive of the upper turret is arranged to index it one-quarter of a revolution during each cycle of the machine, the drive of the lower turret assembly, having six equally spaced container body receiving cells 397, is arranged to index the turntable only one-sixth of a revolution during each cycle of the machine.

The drive for the lower turret turntable includes a double sprocket 398 secured concentrically to the lower end of the base portion 395 of the turntable assembly and driven by a drive chain in a manner hereinafter more fully described.

Each of the six container body receiving cells 397 is formed by a clamp assembly (Figs. 48, 49 and 50) which includes a substantially cylindrical housing 399 fitting into a suitable circular opening in the turntable 394 at the cell location and formed with a radial, outwardly directed flange at its upper end to overlie the turntable around the opening and to be secured to the turntable.

A cup 400 open at both ends is formed with a cylindrical upper portion threaded into the housing 399 and a frusto-conical lower portion of relatively small length. The cup 400 is formed to receive the container body in inverted position with the lower portion of the cup snugly engaging the widest portion of the conical section of the container to prevent dropping through of the latter. The container body 392, when positioned in the cup, has its mouth end extending substantially below the bottom of the cup and its base end extending above the top-surface of the turntable, as shown in Fig. 47.

In order to securely clamp the container body within the cup 400 during certain of the operations performed on the body while carried by the lower turret or turntable assembly 393, eight clamping sectors 401, combining to form a circular, radially contractible collar, are mounted on the cell 397. Each sector 401 is provided with an outer surface which is formed with substantial bevels at the top and bottom thereof, with the lower bevel resting upon a complementary beveled edge at the top of the inner surface of housing 399. A circular top ring 402 is disposed on top of the sectors 401 and is bevelled at its lower inner edge to engage the top bevels of the sectors so that downward movement of the top ring 402 causes the sectors to move radially inward for clamping upon the container body supported in the cup. Springs 403 are positioned between the top ring 401 and the housing 399 to resiliently lift the top ring, while springs 404 are interposed between adjacent sectors so that the sectors are resiliently urged apart to enclose the largest central space that the relative positions of the top ring 401 and housing 399 will permit. In order to move the top ring 401 downwardly, tie bolts 405 extend from the top ring to a pull ring 406 slidable axially on the cup 400. A ring 407 is rotatable on the cup between the pull ring 406 and the bottom edge of the housing 399 with ball bearings 408 being interposed between the latter and the adjacent face of the ring 407, to reduce the frictional resistance to rotation of the latter. Grooves 409 having depths increasing progressively in opposite directions are formed in the confronting faces of the pull ring 406 and the rotatable ring 407 with balls 410 being positioned in these grooves so that rotation of the last mentioned ring in one direction causes the balls to travel into the shallow portions of the related grooves for moving the pull ring and the top ring downwardly. A clevis 411 (Fig. 50) is secured to the ring 407 and extends radially therefrom for pivotal connection to the outer end of a radial connecting rod 412 (Figs. 46 and 47) which is slidably mounted on the underside of the turntable 394 and carries a cam follower roller 413 (Fig. 51) at its inner end. A return spring 414 is secured to each of the rings 407 and to the turntable for resiliently urging the rings to rotate in the direction permitting expansion of the clamping sectors. A radial cam 415 is mounted on the fixed pedestal 396 in a manner to permit angular adjustment of the cam, and the latter effects radial movement of the connecting rods 412 as the turntable is rotated.

The cam 415 is shaped to effect release of the clamping sectors 401 when the related cell 397 is positioned at the transfer station, to produce a moderate clamping action when the container body supporting cell is located at a following station at which flutes are formed in the neck portion of the container body, the bead at the container mouth is shaped and glue is applied to the interior surface of the container body adjacent the base end thereof, to produce a strong clamping action on the container body while the supporting cell is indexed to two subsequent stations at which a bottom is inserted in the base end of the container body and the mouth bead is further shaped and at which the base end of the container body and the edge of the bottom forming member are rolled together by a spinning operation, and finally to effect the return of the sectors to release positions when the cell reaches a later ejector station at which the container is pneumatically removed from the cell.

After receiving the container body at the transfer station, indicated at A in Fig. 52, the lower turret is indexed one-sixth of a revolution, in a clockwise direcion as viewed from the top, to position the container body supporting cell 397 at the fluting, mouth shaping and glue applying station, indicated at B in Fig. 52. A glue applying and anvil assembly 416 (Figs. 2 and 53 to 57) is positioned above the turntable and a flute forming and mouth shaping assembly 417 (Figs. 43, 45, 52, 58 and 59) is positioned below the turntable at station B.

The assembly 416 includes a frame 418 which is substantially C-shaped and secured to the rear face of the frame 273 (Fig. 2) and has an air cylinder assembly 419 mounted on the top thereof with the vertical piston rod 420 of the air cylinder extending slidably through the horizontal flanges of the frame and carrying a flute forming anvil 421 at its lower end. A tubular shaft 422 is slidable freely on the piston rod 420 and has a stop collar 423 at its upper end to engage a bumper pad 424 on the top surface of the lower flange of the frame 418 for limiting the downward movement of the tubular shaft 422. A lower circular retainer or rim 425 is fixed to the lower end of the hollow shaft 422 while an upper retainer or rim 426 is positioned above the rim 425 and provided with projections extending inwardly through longitudinal slots in the hollow shaft 422 to slidably engage the piston rod 420 and to be movable axially relative to the lower rim 425. A glue applicator 427 in the form of a rubber ring is mounted between the upper and lower rims to be radially contracted when the rims are spaced relatively far apart and conversely to be radially expanded when the rims are urged axially together. In order to effect the expansion of the glue applicator ring 427 for depositing a band of glue on the inner surface of the container body adjacent its base or uppermost end as supported in the cell at station B a collar 428 is fixed on the piston rod 420 for movement with the latter within the hollow shaft 422. The collar 428 is positioned on the piston rod so that it engages the projections of the upper rim 426 before downward movement of the piston rod is completed and urges the upper rim toward the lower rim during the final increment of the down stroke of the piston rod while the lower rim is held immobile with the hollow shaft 422 by engagement of the collar 423 with the bumper 424 (Fig. 54). A coil spring 429 is interposed between the upper and lower rims 426 and 425, respectively, to continuously urge the rims apart for contracting the glue applicator ring 427. Thus, the glue applicator may be moved downwardly into the container body in residence at the related station B without contacting the body and is expanded to apply glue to the inner surface of the container only after the length of the hollow shaft has established the vertical location of the applicator ring 427 and the piston rod 420 has undergone the final increment of its downward stroke.

When the piston rod is moved upwardly (Fig. 53) during the return stroke of the air cylinder 419, a cushion 430 rotatable on the upper face of the anvil 421 engages the lower rim 425 and moves the lower rim, applicator ring, upper rim and hollow shaft upwardly until the upper rim 426 engages against the lower face of a clutch plate 431 of a clutch assembly which is rotatably mounted below the lower horizontal flange of the supporting frame 418. The clutch plate 431 has a spur gear 432 rotatable therewith and driven by another spur gear 433 mounted on a stub shaft 434 (Fig. 54) which is also provided with a sprocket 435. As seen in Fig. 56, the sprocket 435 is rotated by engagement with a driving chain 436 trained over the sprocket 435, an idler sprocket 437 and a driving sprocket 438 on the vertical shaft 439 effecting indexing movement of the upper turret, in a manner hereinafter indicated, so that the clutch plate 431 is rotated only during the movement of the turrets from one position to the next indexed position. Since the upper rim 426 is restrained in its upward movement after contact with the clutch plate face 431, the final increment of the return stroke of piston rod 420 causes the anvil cushion 430 to press against and urge the lower rim toward the upper rim to once again radially expand the glue applicator ring.

A glue dispenser assembly 440 (Figs. 53, 55 and 57) is mounted on the frame 418 at a side of the raised position of the glue applicator ring 427 and includes a reservoir 441 having an opening 442 in the side thereof facing toward the path of the applicator ring, in which opening a dispensing roller 443 is rotatable with the roller being resiliently urged outwardly by springs 443a to close the opening. When the applicator ring 427 is radially expanded in its raised position, the ring engages the dispensing roller 443 to move the latter inwardly so that glue may escape through the opening of the reservoir. Since the upper rim 426 effects intimate contact with the rotated clutch plate 431 when in its raised position, the upper and lower rims, hollow shaft 422, and applicator ring 427 are also rotated so that the glue escaping through the reservoir opening 442 is evenly spread on the surface of the applicator ring 427.

Since it is desirable to interrupt the transfer of glue to the applicator ring 427 during initial operation of the machine, that is, when a container body has not yet been deposited in the cell in residence at the fluting, glue applying and mouth shaping station B, the glue dispensing assembly 440 is mounted for lateral movement bodily toward and away from the operative position in which the dispensing roller 443 thereof is engageable by the applicator ring 427. In order to provide for the bodily lateral movement of the glue dispensing assembly 440, the reservoir 441 is formed with lugs 444 (Fig. 55) at one side, which are pivotally mounted on the frame 418, and with an arm 445 extending from the other side for pivotal connection to an actuating link 446. A spring 447 acts on the link 446 to continuously urge the link in the direction moving the glue dispensing assembly to its inoperative position, and a solenoid 448 also acts on the link 446 to move the latter, when energized, in the direction displacing the glue dispensing assembly to its operative position.

The flow of compressed air to the air cylinder assembly 419 is controlled so that the latter effects a downward and upward return stroke during the residence of a container body carrying cell 397 at the related station B and retains the anvil and glue applicator in raised position clear of the lower turret or turntable during indexing of the turrets.

The assembly 417 (Figs. 43, 45, 52, 58 and 59) mounted below the turntable 394 at the fluting, glue applying and mouth shaping station B includes a frame 449 mounted on the base of the machine and having the sides thereof cut out in line with the path of travel of the cells 397 to permit the several cups 400, and the mouth ends of the container bodies supported therein, to pass through the frame when the turntable is indexed to and from the fluting, glue applying and mouth shaping station B. A swager assembly is mounted within the frame 499 for vertical movement and includes a body formed of a substantially cylindrical upper portion 450 and a cylindrical lower portion 451 joined to the upper portion 450 and of smaller diameter. An outer cylindrical or ring member 452 is slidable on the outside of the upper portion 450 of the body and is connected rigidly to a bottom plate 453 disposed below the lower body portion 451 by posts 454. Heavy compression springs 455 are positioned between the inner body portion 451 and the bottom plate 453 to resiliently urge the latter downwardly relative to the inner body. Diametrically opposed, grooved guide wheels 456 (Fig. 59) are rotatably mounted on the upper body portion 450 and ride on vertical guide shafts 457 extending within the frame 449 to guide the vertical movements of the swager assembly.

The lower inner body portion 451 is formed with radially extending lugs 458 to which triangular toggle links 459 are pivotally connected. Inner connecting links 460 are pivotally connected between each of the toggle links 459 and the outer ring 452 so that upward rocking of the toggle links will effect upward movement of the outer ring 452 and the bottom plate 453 relative to the inner body.

Twelve fluting fingers 461 are disposed in a circular series within the upper inner body portion 450 and are pivotally mounted at their upper ends for swinging from inoperative positions against the wall of the upper inner body portion inwardly to form inwardly pressed axial flutes in the neck portion of a container body surrounded by the upper inner body portion 450. Each fluting finger 461 is operatively connected by a link 462 to the outer ring 452 so that upward movement of the latter relative to the inner body effects inward swinging of the fluting fingers 461.

The upper inner body portion 450 also carries a group of radially expansible and contractible mouth shaping sector elements 463 shaped to extend loosely, when contracted, into the mouth of a container body extending into the upper body portion, and to form a circumferential groove in the internal surface of the mouth, when expanded, which groove is adapted to grip a closure cap in the mouth of the completed container. The mouth shaping sector elements 463 are resiliently urged to the contracted condition by a circumferentially disposed spring element 464 and are inclined at their inner ends to define an upwardly tapering conical space at the center of the series of mouth shaping elements 463. In order to move the elements 463 to mouth shaping position, a rod 465 extends vertically from the base plate 453 and slidably through the lower body portion 451 and is formed with a conical upper end 466 extending into the space at the center of the mouth shaping elements 463. When the outer ring 452 and base plate 453 are moved upwardly relative to the inner body, the conical end 466 of the rod engages against the inner ends of the mouth shaping elements 463 and moves the latter outwardly by a wedging action to mouth shaping position, and when the outer ring and base plate drop relative to the inner body, the rod 465 is withdrawn from the central space of the series of mouth shaping elements 463 and the latter are contracted by the encircling spring 464.

In order to effect vertical movement of the swager assembly and relative movement between the outer ring and base plate on the one hand and the inner body on the other hand, at the concluding portion of the upward stroke of the assembly, vertically movable gear racks 467 are mounted within the frame 449 and connected at the lower ends thereof to the outer corners of the toggle links 459 by pivoted links 468. Shafts 469 (Figs. 45 and 58) are rotatably mounted at the sides of the frame 449 and have spur gears 470 fixed thereon and meshing with the gear racks 467 so that rotation of the shafts 469 effects vertical movement of the gear racks.

When the gear racks 467 are displaced upwardly, the internal swager assembly is moved upwardly as a unit to envelop the neck and mouth portion of the container body supported in the cell in residence at the fluting, glue applying and mouth shaping station B. Before the gear racks 467 have completed their upward strokes, a bumper ring 471 on the upper end of the upper inner body portion 450 contacts stop plates 472 (Figs. 43 and 52) at the top of the frame 449 to prevent any further movement of the inner body. Continued upward movement of the gear racks 467 then rocks the triangular toggle links 459 to displace the outer ring 452 and base plate 453 upwardly relative to the inner body and against the force of the compression springs 455 so that the fluting fingers 461 and mouth shaping elements 463 are displaced to perform the respective operations on the container body. It should be noted at this point that the control for the air cylinder assembly 419 of the device 416 is regulated relative to the devices actuating the gear racks 467 so that the fluting anvil 421 is positioned within the neck portion of the container body before the final upward movement of the gear racks 467 takes place. Thus, the anvil 421 is positioned to cooperate with the fluting fingers 461 before the latter are pivoted inwardly to form the flutes.

In order to rotate the gear rack actuating shafts 469, an air cylinder assembly 473 (Fig. 60) is provided and includes a horizontal compressed air operated cylinder 474 mounted on a support bracket 475 carried by the base of the machine. A block or head 476 is secured to the end of the piston rod of the air cylinder 474 and carries horizontal, spaced apart lower and upper gear racks 477 and 478, respectively, with the upper horizontal gear rack 478 being longer and engaging a spur gear 479 adjacent the end of the shaft 469 at the far side of the frame 449 (Fig. 43) while the lower shorter gear rack 477 meshes with a spur gear 480 on the similar shaft 469 journalled at the near side of the frame 449. The racks 477 and 478 are supported in the area of contact with the related spur gears by suitable rollers 481, and the shaft at the far side of the frame has a sprocket 482 thereon to drive the actuating chain 382 which runs over a tensioning idler sprocket 483 carried by the frame 449 and over the sprocket 381 on the shaft 380 (Fig. 41) to drive the container transfer assembly 366 as indicated in the description of the latter. Thus, the air cylinder 474 provides the motive power for actuating the transfer assembly 366 as well as the swager assembly 417, and the supply of pressure fluid, or compressed air, to the air cylinder 474 is controlled so that the assembly 366 functions to transfer a container body from the upper turret to the lower turret and the assembly 417 functions to cooperate with the assembly 416 for forming flutes and shaping the mouth of a container residing at station B during the interval that the upper and lower turrets dwell at an indexed position.

When the operations performed at the fluting, glue applying and mouth shaping station B have been completed, the cell 397 carrying a container body is next moved to a bottom inserting and mouth shaping station C (Fig. 52) by further indexing the lower turret turntable one-sixth of a revolution. At this station, a bottom punching and inserting assembly 484 (Figs. 2, 61 and 62) is located above the turntable, while a second swager assembly 485 (Figs. 52, 60 and 63), is located below the turntable 394 to further shape and smooth the mouth of the container body.

The second swager assembly 485 (Fig. 63) includes a substantially cylindrical casing 486 having a vertically reciprocatable piston-like body 487 therein which is formed with a central bore 488 to slidably receive a rod 489 having a conical upper end 490. The lower end of rod 489 is mounted on a bottom plate or platform 491 below the body 487. Guide rods 492 extend axially on the body and slidably through suitable openings in the bottom plate or platform 491 to guide the latter in its movement relative to the body, and compression coil springs 493 are disposed on the guide rods to resiliently urge the platform 491, and hence the rod 489, downward relative to the body 487 and against stop nuts 494 on the lower ends of the guide rods 492.

An annular top plate 495 is secured to the top of the casing 486 and is formed with a central opening of a diameter smaller than that of the body 487 to limit the upward movement of the latter. A circular holder 496 is secured to the top of the body 487 and is formed with an outer diameter sufficiently small so that it may project upwardly through the opening of the top plate 495. The holder 496 is formed with circular recesses 497 and 498 in the top and bottom surfaces thereof, respectively, and with a central bore 499 communicating the recesses with each other. The top recess 497 is formed to receive the mouth portion of a container body carried by the cell in residence at the bottom punching and inserting and mouth shaping station C when the body 487 is in its raised position.

The holder 496 retains a series of radially movable circularly arranged mouth shaping sectors 500 having mouth shaping portions extending into the top recess 497 for engagement with the inner surface of the mouth portion of the container body. A circular spring 501 encircling the mouth shaping sectors 500 within the recess 498 resiliently urges the sectors to a radially retracted position, and the conical top end 490 of the central rod 489 extends into the central space defined by the inner ends of the sectors, when the platform 491 is moved upwardly relative to the body 487, to thereby radially expand the sectors 500.

In order to effect vertical reciprocation of the body 487, a rock shaft 502 is journalled in the lower portion of the casing 486 having a crank arm 503 fixed thereon and connected at its free end to the platform 491 by pivoted connecting links 504. When the rock shaft 502 is rocked in one direction, the platform 491 is raised and resiliently pushes the body 487 ahead of it until the latter contacts the top plate 495 and then the platform 491 and rod 489 continue upwardly against the force of the springs 493 to radially expand the mouth shaping sectors 500 and thus further shape and smooth the internal, circumferential groove at the mouth of the container body.

The action of the air cylinder 474 of assembly 473 (Fig. 60) is also utilized for rocking the rock shaft 502 and for this purpose an actuating arm member 505 extends radially from the rock shaft 502 with connecting links 506 being pivotally connected between the free ends of the actuating arm member 505 and the block or head 476 mounted on the piston rod of the air cylinder assembly. The actuating arm member 505 is angularly positioned on the rock shaft so that the platform 491 and body 487 are in downwardly retracted position during indexing of the turntable 394 and are raised to perform the mouth shaping and smoothing function during the dwell interval of the turntable.

The assembly 484 (Figs. 61 and 62) for punching and inserting the bottom for the container includes a housing 507 which is formed with pads 508 at one side to be secured to the rear of the turret supporting frame 273 and overlies an opening formed in the bottom flange of the latter. The housing 507 provides an open ended cylinder 509 within which a punch shear assembly, generally indicated by the numeral 510, reciprocates vertically. The punch shear assembly 510 includes a piston or punch ram 511 slidable in the cylinder 509 and having a centrally located, upwardly extending hollow tube 512 fixed thereto to project slidably through a central opening of a housing cover 513.

A cup shaped packing 514 is secured to the piston or punch ram 511 adjacent its upper end and a circular punch blade 515 is carried by the ram at its lower edge. A concentric, circular recess or counterbore 516 is formed in the piston or ram 511 and opens at the lower surface of the latter as well as into the lower end of hollow tube 512. A blank forming piston or ram 517 is disposed in the circular recess 516 of the ram and has an upstanding, central rod 518 fixed thereto to extend slidably upward through the hollow tube 512. The ram 517 has a cup-shaped packing 519 at its upper edge to provide an airtight seal against the surface of the circular recess 516 in which it works. The inner diameter of the hollow tube 512 is substantially greater than the diameter of the rod 518 to provide an annular space therebetween which opens at the bottom into the circular recess 516 of the ram 511 and is closed at the top by a bushing 520 carried by the hollow tube.

A fixed die cooperating with the above described structure for cutting the bottom blank and for forming this blank into a cup-like bottom includes a forming die 521 which is mounted in the opening of the bottom flange of frame 273 and is formed with a circular opening 522 having a stepped side wall providing an upwardly facing annular shoulder on which a circular blank cutting die 523 is carried. The blank cutting die 523 has an inner diameter sufficient to receive the cutting die 515 on the punch ram 511 when the latter is thrust downwardly, while the lower portion of the opening 522 in the forming die is large enough to receive the forming ram 517 but smaller than the diameter of the cutting die 515.

In cutting and forming blanks to provide bottoms for the container bodies, and in inserting each formed bottom into the base end of the container body in residence at the related station C, a strip of paper is fed across the bottom flange of the frame 273 and between the base of housing 507 and the downwardly spaced top surface of the fixed forming die 521. The punch ram 511 is then displaced downwardly to cooperate with the fixed cutting die 523 in punching a circular blank from the paper strip, which circular blank is deposited on the upwardly facing shoulder of the forming die 521. The forming ram 517 is then displaced downwardly relative to the punch ram 511 to move the cut blank through the part of the opening 522 of reduced diameter at the bottom of the forming die, thus shaping the blank into a cup-shaped bottom member. Further downward movement of the forming ram 517 carries the cup-shaped bottom member into the container body then disposed at station C where the upstanding marginal wall of the bottom member engages the band of glue applied to the inner surface of the container body at the preceding fluting, glue applying and mouth shaping station B. The punch and forming rams 511 and 517 are then raised to permit indexing of the lower turret turntable and the feeding of another section of paper strip into position for cutting and forming. In order to prevent removal of the formed bottom member from the container body when the forming ram is withdrawn, the latter is provided with vent openings 524 communicating with the lower surface to reduce any suction effect on the bottom member from the return stroke of the forming ram.

The above noted operating movements are produced by compressed air, effecting the downward strokes of the punch and forming rams, and by compression springs producing the return strokes. For this purpose, a suitably controlled supply of compressed air is led into the top of the housing 507 above the punch ram 511 through a suitable opening 525 in the cover 513. Radial openings 526 are formed in the hollow tube 512 to communicate with the atmosphere above the housing cover 513, when the punch ram 511 is in raised position, and to communicate with the space between the cover 513 and the top of the punch ram, when the latter has been driven downwardly by the compressed air, so that the compressed air may then flow through the annular space between the hollow tube 512 and the rod 518 into the recess 516 of the punch ram to act upon the forming ram 517 for moving the latter downwardly relative to the punch ram. A yoke 527 is fixed on the hollow shaft 512 above the housing cover and a compression spring 528 is interposed between the yoke and the housing cover for resiliently urging the hollow shaft and punch ram 511 upwardly to effect the return stroke of the latter when the supply of compressed air is interrupted. A spacer 529 is disposed between the housing cover and the yoke 527 to limit the downward stroke of the punch ram 511 so that the cut blank will not be clamped against the shoulder of the forming die 521 and may be moved into the container body by the downward stroke of the forming ram 517. Another yoke 530 is fixed on the upper end of the rod 518 above the hollow shaft, and a compression spring 531 is interposed between the yokes 527 and 530 to resiliently urge the forming ram 517 to a raised position within the punch ram 511. The upper end of the hollow shaft 512, when it is engaged by the yoke 530, acts as a stop to limit the extension of the forming ram 517 out of the punch ram 511.

In order to cushion the final increments of the downward strokes of the punch and forming rams, dash pot assemblies 532 are provided at diametrically opposed locations to cooperate with the yokes on the hollow shaft 512 and rod 518. Each dash pot assembly includes a cylindrical housing 533 mounted on the housing cover 513 and having a piston (not shown) working therein. A piston rod 534 extends upwardly from the piston and has a reduced diameter intermediate portion 535 on which the yoke 527 is slidable and an extension 536 at the top, of reduced diameter, on which the yoke 530 is slidable. The piston rod 534 is dimensioned so that the yoke 527 engages the shoulder 537 defining the lower end of the reduced diameter intermediate portion 535 during the final increment of the downward stroke of the punch ram 511 to slow the final movement of the latter, and so that the yoke 530 engages the shoulder 538 at the top end of the piston rod only during the final increment of the downward stroke of the forming ram 517 relative to the punch ram 511 to thereby slow the final movement of the forming ram. The piston rod 534 and piston connected thereto are raised during the return or upward stroke of the punch ram 511 by the engagement of the yoke 527 with the shoulder defining the upper end of the intermediate reduced diameter portion 535 of the piston rod.

The paper strip is fed to the bottom punching and forming assembly 484 from a paper roll 539 (Figs. 1 and 2) rotatably mounted at the adjacent end of the machine by a feeding device 540 (Figs. 2 and 64) which intermittently advances the paper strip during the indexing of the lower turret 393. This feeding device (Fig. 64) includes a bracket 541 mounted on the rear flange of frame member 273 and supporting a rotatable shaft 542 above that flange, which shaft has a driving sprocket 543 thereon which is continuously rotated in a manner hereinafter described. A series of feeding members 544 are fixed on shaft 542 and are formed with radially raised peripheral portions engageable with the paper strip drawn from the roll 539 and passing over a back-up roller 545 projecting through a suitable opening in the flange of the frame 273. Thus, the feeding members 544 are effective to advance the paper strip when the raised peripheral portions thereof are in engagement with the strip. In order to prevent backward movement of the paper strip, a stop member 546 is pivoted on the bracket 541 and inclines downwardly in the direction of the feeding movement of the paper strip for engagement with the latter. A suitable torsion spring (not shown) acts on the stop member 546 to urge the latter resiliently against the paper strip so that the stop member permits movement of the strip in the feeding direction and resists movement of the strip in the opposite direction.

In order to cut the paper scrap coming from the bottom punching and forming assembly 484 into easily disposable waste pieces, a vertically reciprocatable shear blade 547 is mounted at the exit side of the housing 507 to cooperate with a fixed blade 548 in cutting the paper scrap along spaced lateral lines. Suitable link means (not shown) is connected to the blade 547 to reciprocate the latter, preferably in response to movements of the punch ram 511.

The flow of compressed air to the bottom punching and forming assembly 484 is controlled so that the punch and forming rams 511 and 517, respectively, are retracted within the housing 507 during indexing of the lower turret turntable and are actuated through a bottom punching, forming and inserting cycle during each dwell interval of the turntable.

The next indexing movement of the lower turret turntable 394 carries the container body having a bottom member inserted therein from the bottom punching, forming and inserting station C, at which the mouth is also further shaped, to a bottom spinning station D, (Fig. 52), at which the base edge portion of the container body and the flange of the bottom member are rolled together to form a sturdy and leak-proof rolled joint which serves as a support base for the completed container.

To perform this function, a bottom spinner assembly 549 (Figs. 1 and 65) is disposed above the lower turret turntable, and a bottom erector assembly 550 (Figs. 52, 67, 68, 69 and 70) is disposed below the turntable, both assemblies being located at the bottom spinning station D. The bottom spinner assembly 549 includes a vertically arranged housing 551 formed with a bracket 552 thereon secured on the front face of the turret supporting frame 273 and having a vertically reciprocatable bearing barrel 553 therein. A vertical shaft 554 is rotatably mounted in the bearing barrel 553 for axial movement with the latter and has a bottom spinner 555 fixed on the lower end thereof. The upper portion of the shaft 554 extends slidably through a rotatable driving sleeve 556 and is keyed to the latter. A driving pulley 557 is fixed to the driving sleeve 556 and is engaged by a belt 558 extending over a pulley 559 on the shaft of the same electric motor 355 driving the mouth spinning assembly 345 and over an idler pulley 560 carried by the frame 273 (Fig. 66).

The bottom spinner 555 is formed with a circular groove 561 and a concentric circular recess 562 in the bottom face thereof and the shaft 554 is formed with a central bore 563 opening downwardly into the circular recess 562 of the bottom spinner. A push rod 564 is slidable in the central bore 563 of the shaft and at its lower end carries an umbrella plate 565 formed to fit into the circular recess 562 when the push rod is raised. A spring 566 is positioned within the central bore 563 and engages the upper end of the push rod 564 to resiliently urge the umbrella plate 565 to a downwardly projecting position relative to the spinner 555, with a radial pin 567 extending from the push rod and through an elongated slot in the shaft 554 to engage the bottom of the slot and thereby limit the downward movement of the umbrella plate 565.

A rocker 568 is pivoted on the shaft 554 and is engageable at one side with the radial pin 567 on the push rod and at its other side with a fixed guide member 569 to withdraw the umbrella plate within the circular recess of the spinner 555 when the spinner is in its raised position.

Axial reciprocation of the bearing barrel for moving the spinner 555 into and out of spinning engagement with the base or bottom end of the container body is effected by a bell-crank 570 which is rocked by a link 571 extending from the rocking lever 357 of the mouth spinning assembly 345 and connected by links 572 to trunnions 573 extending radially from the bearing barrel 553 through longitudinal slots 574 in the housing 551.

During indexing of the lower turret turntable 394 the spinner 555 is in raised position and the umbrella plate 565 is withdrawn within the recess 562 of the spinner. During the dwell interval of the turntable, the spinner 555 is moved downwardly, and as it moves downwardly, the umbrella plate 565 projects from the spinner to engage the bottom member of the container body in residence at the bottom spinning station. The rotated spinner then receives the upper or base edges of the container body and of the flange of the bottom member in its circular groove 561 and rolls the edges inwardly to form a rolled base while the umbrella plate steadies the bottom member and moves upwardly into the recess 562 as the spinning operation progresses.

The bottom erector assembly 550 (Figs. 52 and 67 to 70) operates to support the bottom member of the container body in residence at the bottom spinning station D while the spinner 555 is rolling the base edges thereof.

The bottom erector assembly includes a vertical air cylinder 575 having a head 576 through which a hollow tube 577 slidably extends. A sleeve 578 is fixedly mounted on the upper end of the hollow tube 577 and pivotally carries six fingers 579 which are supported at the lower ends thereof for swinging in radial planes. Each finger supports a sector plate 580 at its upper end for swinging between a contracted or stowed position (Fig. 67) in which each sector plate 580 lies substantially flat against a side of the supporting finger 579 and an active position (Figs. 68 and 70) in which the sector plates are horizontal and cooperate to provide a circular platform.

The supporting fingers 579 are actuated by a cam rod 581 which is formed to swing the fingers outwardly when the cam rod is raised relative to the sleeve 578 and to retract the fingers to axially extending positions when the cam rod is lowered relative to the sleeve. The cam rod 581 includes a collar 582 on its upper end which engages portions 583 of the fingers to effect the outward swinging of the latter (Fig. 68), and also attaches to links 584 connected to the sector plates to pivot the latter to active horizontal positions when the cam rod is raised relative to the sleeve and to swing the sector plates to stowed positions when the cam rod is lowered relative to the sleeve. The cam rod 581 is also formed with a series of circumferentially spaced axial grooves 585, positioned to receive projections 586 on the lower ends of the fingers 579 when the latter are swung outwardly (Fig. 68), and having sloped ends on which the projections 586 ride when the cam rod is lowered to move the fingers to their axially extending, or vertical, stowed positions (Fig. 67).

During indexing of the lower turret turntable 394, the hollow shaft 577 is in lowered position, as is the cam rod 581 relative to the sleeve 578, so that the fingers 579 and sector plates 580 are compactly arranged below the path of travel of the mouth portions of container bodies carried by the turntable. When the turntable is in the condition of dwell, the tube or shaft 577 is moved upwardly to extend through the relatively small opening of the mouth of the container body in residence at the bottom spinning station D. After the fingers and sector plates have passed, in their compactly arranged condition, through the restricted mouth opening, the cam rod 581 is raised relative to the hollow shaft and sleeve to spread out the sector plates and form a supporting platform below the bottom member of the container body, thus fixing the position of the bottom member in the container to provide completed containers of uniform capacity.

In the illustrated device, the necessary movements of the hollow shaft 577 and of the cam rod 581 are achieved pneumatically. For this purpose, a base 587 on the cylinder 575 and the head 576 thereof are provided with compressed air supplying and exhausting passageways 588 and 589, respectively, to selectively admit and exhaust compressed air above and below a packing assembly 590 at the lower end of the hollow tube 577. The packing assembly 590 is formed with a central bore formed to receive and be sealed by a metering tube 591 extending upwardly from the base 587 of the air cylinder. To raise the hollow tube 577, compressed air is admitted to the base end of the air cylinder. During initial upward movement of the hollow tube, the metering tube 591 prevents flow of compressed air into the interior of the hollow tube 577. However, when the lower end of the hollow tube 577 has cleared the upper end of the metering tube 591, the compressed air then enters the hollow tube to act upwardly against a packing assembly 592 on the lower end of the cam rod 581 and thereby raise the latter against the force of a return spring 593. Thus, the sector plates are moved through the container mouth in a compactly arranged condition, and only, when disposed in the wider portion of the container, are the sector plates opened to provide the supporting platform.

In lowering or returning the sector plates to the inoperative position, compressed air is admitted to the top of the air cylinder while the base end of the latter is exhausted. The spring 593 lowers the cam rod 581 to retract the sector plates as set forth above and then the compressed air moves the hollow shaft 577 downwardly to withdraw the sector plate assembly through the container mouth.

The flow of compressed air to the air cylinder 575 is suitably controlled to effect the desired movements of the erector assembly 550 in synchronism with the indexing movement and dwell interval of the lower turret turntable 394.

Further indexing of the lower turret turntable carries the completed container body, in mouth down position, from the bottom spinning station D to the container body ejecting station E (Fig. 52), at which station the container body is pneumatically removed upwardly from its supporting cell by an ejecting assembly 594 (Figs. 52 and 71) there located below the turntable 394.

The ejecting assembly 594 includes a vertical cylinder 595 having a hollow blow-out tube 596 extending slidably through the vented cover 597 thereof. A piston 598 is fixed on the lower end of the blow-out tube 596 and a fixed valve rod 599 extends vertically in the cylinder to engage in the blow-out tube until the lower end of that tube has been raised sufficiently to clear the top end of the valve rod. A spring 600 is interposed between the cylinder head and the piston to cushion the upward movement of the blow-out tube and to resiliently urge the blowout tube downwardly to its inoperative position below the path of travel of the mouths of the supported container bodies.

During the dwell interval of the turntable 394, compressed air is admitted to the air cylinder 595 below the piston 598 therein, thus driving the piston and blow-out tube upwardly. A cup-shaped head 601 is fixed on the upper end of the blow-out tube 596, and upward movement of the latter tube positions the head to receive the mouth portion of the container body at the ejecting station E in the annular space 602 between the head 601 and upper end of the tube 596. Further upward movement of the tube 596 causes the cup-shaped head to strike against the conical portion of the container, without striking the mouth rim or bead thereof, to jar the container loose from its supporting cell, and in this elevated position of the tube its lower end clears the valve rod 599 so that compressed air may now enter the blow-out tube 596 to be directed upwardly into the container body for blowing the latter upwardly into a suitable discharge conduit 603 (Fig. 1) extending from above the turntable at the ejecting station. When the flow of compressed air to the cylinder 595 is interrupted, gravity and the spring 600 move the piston and blow-out tube downwardly to the rest position. The flow of compressed air to the cylinder is controlled to occur only during the dwell interval of the lower turret.

It will be noted that, although the turntable has six cells thereon and is indexed one-sixth of a revolution during each cycle of the machine, only five operating stations are provided along the circular path of travel of the cells. The sixth station F (Fig. 52), following the ejecting station E, is utilized as an inspection or detecting station for determining whether the cell is empty and in condition to receive a container body at the subsequent transfer or loading station A.

In order to positively locate the turntable 394 during each dwell interval so that the cotnainers carried in the cells 397 will then be properly aligned with the mechanisms at the several operating stations, a turntable lock mechanism 604 (Fig. 52) provided for intermittently holding the turntable nonrotatable in any one of its indexed positions. The turntable lock mechanism 604 includes a bell-crank 605 pivotally mounted adjacent the periphery of the turntable 394 and having a locking pin 606 on the end of one arm which is engageable in equally spaced apart, radially opening recess members 607 carried by the table 394. A spring 608 is connected to the other arm of the bell-crank 605 to continuously urge the latter in the direction moving the pin 606 towards the periphery of the turntable, and a cam-follower roller 609 on the free end of said other end engages against a cam 610 mounted on a rotatable shaft 611, which is rotated in synchronism with the movement of the lower turret assembly 393, so that the cam 610 is periodically effective to displace the bell-crank 605 and remove the pin 606 from the recess members 607. The shaft 611 is driven in a manner hereinafter described so that the pin 606 engages in a registering recess 607 during the dwell interval of the turntable and is removed from the recess during indexing of the turntable.

Coordination of the mechanical drives

In order to synchronize the operation of all of the units combined and constructed as above to form a machine which continuously forms container bodies from strips of paper, the operation of all of these units is controlled from a single power source. Referring to Figs. 72, 73, 74, 75 and 76, it will be seen that the power source consists of an electric motor 612 mounted on the frame base 11 to one side of the pedestal 14 and having suitable reduction gearing embodied therein. The output shaft of the reduction gearing driven by the motor 612 is connected to a main shaft 613 through a clutch assembly 614 of conventional design, and a brake drum 615 is fixed on the main shaft 613 to be engaged by a friction band 616 which is operated by a brake lever 617 having a suitable pedal thereon for foot operation (Figs. 73 and 75) so that the movements of the units of the machine may be effectively halted when the clutch 614 is disengaged. A double sprocket 618 is fixed on the shaft 613 and drives a double chain 619 which runs over a sprocket 620 on a shaft 621 journalled above the shaft 613 and extending substantially parallel to the latter. The shaft 621 extends toward the end of the machine at which the arcuate blank cutting assembly 20 is located and drives a double sprocket 622 (Figs. 72, 73 and 76) through a suitable clutch 623 of conventional design. A double chain 624 is trained over the sprocket 622 and drives a double sprocket 625 fixed on the drive shaft 38 of the arcuate blank cutting assembly 20. As indicated in the description of the latter assembly, the drive shaft 38 drives an eccentric shaft 35 through a worm and worm gear connection and a sprocket 178 on the end of shaft 35 is effective to operate the arcuate blank feeding assembly 130 through a drive chain 179 running over the sprocket 178 and over a sprocket 180 on the shaft 136 of the assembly 130. Thus, the motor 616 is effective to operate and time the devices which cut the arcuate blanks and then feed these blanks to the winding station.

The devices which cut the straight blanks and feed these blanks to the winding station are also driven from the shaft 621 so that the operation of these last devices is synchronized with the operation of the devices cutting and feeding the arcuate blanks. For this purpose, a double sprocket 626 is fixed on the shaft 621 and drives a double chain 627 which runs over a double sprocket 628 on a stub shaft 629 journalled adjacent the rear of the central pedestal. The shaft 629 drives a gear reduction unit 630 (Figs. 72 and 73), through a suitable clutch 631 of conventional design, and the output shaft of the reduction unit 630 has a sprocket 632 thereon which drives a chain 633 extending upwardly and trained over a sprocket 634 (Figs. 73 and 74) fixed on the shaft of the back-up roller assembly 255 of the straight blank feeding assembly 230 (Fig. 22).

In order to permit manual actuation of all of the units of the machine when it is desired to check their synchronization, a hand crank 635 (Figs. 72 and 75) is rotatably supported at the front of the central pedestal 14 and drives a double sprocket 636 which in turn drives a chain 637 running over a sprocket 638 on the shaft 621.

The rotation of the pressure roller sections 300 and 302 of the winder assembly 294 is also obtained from the shaft 621. To accomplish this rotation, a sprocket 639 is fixed on the end of shaft 621 within the central pedestal 14 (Figs. 72, 73 and 75) and drives a chain 640 which runs on a sprocket 641 fixed to an idler shaft 642 also having the sprocket 313 thereon. As set forth in the description of the winder assembly, the sprocket 313 drives the pressure roller sections by a transmission including a chain driving the sprocket 312, a chain driven by the sprocket 312 and driving a sprocket 309, a gear 310 rotating with the sprocket 309, and the successively meshing gears 311, 308 and 307 (Figs. 32, 36 and 74).

The intermittent indexing of the upper turret assembly 272 and of the lower turret or turntable assembly 393 is effected by a drive arrangement powered by the shaft 613 driven by the motor 612. This drive arrangement includes a worm 643 on the shaft 613 meshing with a worm gear 644 on a vertical shaft 645 also having the driving arm 646 of a Geneva drive fixed thereto (Figs. 72, 73 and 74). A Geneva spider or gear 647 is fixed on a vertical shaft 648 and is positioned to receive a roller on the driving arm 646 in its radial grooves. The spider 647 is formed with four radial grooves, spaced angularly apart by 90°, so that each revolution of the shaft 645, corresponding to one cycle of the machine, effects a one-quarter turn of the spider gear 647, and the indexing of the turrets occurs during a period of substantially one-quarter of the time required for a cycle of the machine while the turrets are held at rest for the remaining three-quarters of the time required for a cycle.

A double sprocket 649 is fixed on the spider shaft 648 to rotate with the Geneva spider 647 and drives a double chain 650 (Fig. 72) which is trained around the sprocket 398 on the base of the lower turret or turntable assembly 393, around a sprocket 651 (Fig. 74) on the lower end of the vertical, upper turret drive shaft 439, and past an adjustable tensioning sprocket 650a. A bevel gear 652 on the top end of shaft 439 meshes with a bevel gear 653 on the upper turret axle 275 so that the rotation of the sprocket 651 is transmitted to the upper turret. The sprocket 398 and the sprocket 651 and gears 652 and 653 are proportioned relative to the sprocket 649 so that each one-quarter 90° turn of the latter effects a one-sixth turn of the lower turret or turntable and a one-quarter turn of the upper turret. As indicated in Fig. 56, the sprocket 438, fixed on shaft 439, effects the rotation of the glue applicator 427 (Fig. 53) during the indexing of the turrets.

An extension shaft 654 is coupled to the shaft 613, and coaxial with the latter, extends into a control housing 655 mounted on the base 11 at the end thereof remote from the arcuate blank cutting assembly. Within the housing 655, a worm 656 on the shaft 654 meshes with a worm gear 657 on the shaft 611 (Fig. 52) which drives the cam 610 for actuating the lower turret locking mechanism 604. A sprocket 658 is also fixed on the shaft 611 and drives a chain 659 which runs over the driving sprocket 543 of the device (Fig. 64) feeding the paper strip from the roll 539 to the bottom punching, forming and inserting device 484. The chain 659 is also trained over a sprocket 660 on the rear end of a shaft having the cam 361 thereon, which cam (Fig. 66) effects the axial movements of the mouth spinning assembly 345 and of the bottom spinning assembly 549. Finally, the chain 659 runs around and drives a sprocket 661 fixed on a cam shaft 662 which is journalled in a suitable auxiliary control housing (not shown) above the housing 655. Each of the shafts 611 and 662 has cam members (not shown) rotatable therewith to actuate suitable switches which control solonoid operated valves, of conventional construction, to control the flow of compressed air to and from the various air cylinders described above. Thus, the supply of compressed air to the cylinder 304 (Fig. 32), to the cylinder 333 (Fig. 37), to the cylinder 474 (Fig. 60), to the cylinder 419 (Fig. 53), to the housing 507 (Fig. 61), to the cylinder 575 (Fig. 67) and to the cylinder 595 (Fig. 71) is in each case controlled by cams driven in synchronism with the mechanically operated, as distinguished from the pneumatically operated, devices of the machine.

The portion of the machine so far described is thus operative to continuously cut curved or arcuate blanks from a paper strip, apply glue to suitable areas of the curved blanks, and feed the glued, curved blanks successively to a winding station; to apply printed matter at spaced locations to another continuous paper strip, cut the printed strips into straight or rectangular blanks, apply glue to portions of the rectangular blanks, and feed the glued rectangular blanks successively to the winding station in paired relationship to the curved or arcuate blanks; to receive the paired arcuate and rectangular blanks at the winding station and there wind such blanks into the form of a container body or shell, press the wound bodies or shells to compact the seams thereof, apply paraffin to the opposite ends of the wound, pressed bodies, spin the mouth ends of the bodies to form rims or beads thereat, and transfer the bodies to another support so that operations, requiring access to the interior of the bodies, may be performed; and to receive the wound bodies at a transfer station and support the transferred bodies at the exterior thereof, flute the neck areas of the container bodies and shape the mouth beads thereof while applying adhesive to the inner surface of the container bodies adjacent their base ends, punch circular blanks from a continuous paper strip, form such circular blanks into bottom members and insert the bottom members into the base ends of the container bodies, spin the base ends of the container bodies to form rolled rims joining the bottom members to the container bodies, and eject the completed container from its support.

While a preferred embodiment of the present invention has been described and shown in detail, by way of illustration, it is to be understood that the invention is not limited to that precise embodiment, and that changes and modifications, obvious to one skilled in the art, may be made therein without departing from the scope and spirit of the invention.

What is claimed is:

1. In a bottle shaped container forming machine of the described character; mechanism for preparing and feeding paired containers forming blanks to a mandrel at a winding station comprising a first section for preparing and feeding curved blanks to the winding station and a second section operating in synchronism with said first section for preparing and feeding rectangular blanks to the winding station in paired relationship to the curved blanks; said first section including means for intermittently advancing successive sections of a stock sheet to a cutting station, mechanism at said cutting station for cutting successive blanks of predetermined curved contour from the intermittently advanced sections of the stock sheet and for simultaneously transversely severing the unused portion of said stock sheet ahead of each of the curved cut blanks, intermittently operative means for initially advancing the unused portion of the stock sheet from said cutting station and then for advancing the successive curved cut blanks from said cutting station, means for separating the unused portions of the paper stock from the cut curved blanks during advancement of the latter from said cutting station, a conveyor for forwarding the curved blanks after separation from said unused portions to said winding station, means arranged adjacent said conveyor for crimping an end portion of each curved blank as the latter is forwarded, and glue applying means located at said conveyor for applying glue to selected areas of each curved blank as the latter is forwarded to said winding station.

2. In a bottle shaped container forming machine of the described character; mechanism for preparing and feeding paired container forming blanks to a mandrel at a winding station as set forth in claim 1, wherein said second section includes means for continuously feeding a stock sheet to a cutting station, means remote from said cutting station for imprinting the stock sheet at regularly spaced locations along the length thereof, means at said cutting station for cutting said stock sheet into successive rectangular blanks and for simultaneously crimping the trailing end portion of each cut blank, means for forwarding the cut rectangular blanks from the related cutting station at a speed greater than the speed at which said stock sheet is advanced thereto to positively separate each cut rectangular blank from the stock sheet therebehind, said last mentioned means including a glue applying roller for applying glue to a predetermined area of each cut rectangular blank, and intermittently operative means for advancing each cut rectangular blank, having glue applied thereto, to the winding station in paired relation to a cut curved blank while registering the rectangular blank laterally and longitudinally with respect to the mandrel at the winding station and with respect to the related cut curved blank.

3. In a bottle shaped container forming machine of the described character; the combination of at least one mandrel supported for movement to and from residence at a winding station, the mandrel at said winding station being disposed with its axis extending horizontally and including a tapering portion; and mechanism for preparing and feeding curved blanks to the winding station in position to be wound upon said tapering portion of the mandrel residing at said winding station, said mechanism including means for intermittently feeding sections of a continuous stock sheet to a cutting station along a horizontal path disposed at right angles to the axis of the mandrel at said winding station, means at said cutting station for cutting a curved blank having the configuration of a ring section from each section of the stock sheet fed thereto and for simultaneously severing the unused portion of the sheet ahead of the cut curved blank, said cutting means being arranged so that each curved blank is symmetrical relative to the longitudinal medial line of the stock sheet and curved away from the direction in which the latter is fed, intermittently operative means for initially advancing the unused portion ahead of the cut blank away from the cutting station and then for advancing the following cut blank away from said cutting station, means for segregating the unused portions of the stock sheet from the cut blanks during advancement thereof away from the cutting station, means for turning the cut blank after segregation from the unused portion to a position in which the straight edge of the blank furthest from said winding station is disposed parallel to the axis of a mandrel residing at said winding station, conveyor means for forwarding each turned cut blank toward the winding station along a straight horizontal path extending parallel to said axis, and a turntable assembly including an inclined table positioned to receive the blanks from said conveyor means and formed to provide a curved feed channel extending tangentially to the surface of the tapering portion of a mandrel at said winding station, and means for propelling blanks along said curved feed channel to said winding station.

4. In a bottle shaped container forming machine of the described character; the combination as set forth in claim 3 wherein said cutting means includes an anvil table onto which the sections of stock sheet are intermittently fed, a cutting die mounted for vertical reciprocation above said anvil table, means for effecting vertical reciprocation of said cutting die in timed relation to the operation of said sheet feeding means so that the die is raised clear of said anvil table during feeding of said stock sheet and is lowered to cut the section of stock sheet disposed on the anvil table only during the intervals when the stock sheet is immobile, and stock sheet gripping means carried by said cutting die to hold the stock sheet immobile during initial upward movement of the die, and wherein the operation of said means for advancing the unused portions of the stock sheet and the cut blanks from the cutting station is synchronized with said means reciprocating the die so that advancement of the unused portion of the sheet is effected while the following cut blank is still engaged by the die and advancement of the cut blank is effected after the die has been raised clear of the cut blank but while said sheet gripping means is still in engagement with the stock sheet to thereby ensure separation of the unused portion of the sheet from the cut blank and separation of the cut blank from the following section of the stock sheet.

5. In a bottle shaped container forming machine of the described character; the combination as set forth in claim 4, wherein said means for advancing the unused portions of the stock sheet and the cut blanks from the cutting station includes continuously rotated first advancing roller means extending to the surface of said anvil table at a location to frictionally engage the under surface of a cut blank at said cutting station, continuously rotated second advancing roller means extending to the surface of said anvil table at a location to frictionally engage the under surface of an unused portion of the stock sheet ahead of a cut blank at the cutting station, first and second pressure roller means mounted for vertical movement above said first and second advancing roller means, respectively, and means for sequentially displacing said first and second pressure roller means between inoperative raised positions and operative lowered positions, in which operative positions said pressure roller means are effective to increase the contact pressure between the related advancing roller means and the parts of the stock sheet engaged thereby so that the related advancing roller means advances the engaged part of the stock sheet.

6. In a bottle shaped container forming machine of the described character; the combination as set forth in claim 5, wherein said means for sequentially displacing said pressure roller means includes resilient means continuously urging each of said pressure roller means to operative lowered positions, a lift rod assembly extending from each of said pressure roller means, a pivoted lever arranged to initially effect lifting engagement with the lift rod assembly extending from said first pressure roller means when rocked a predetermined degree in one direction and to effect lifting engagement with the lift rod assembly extending from said second pressure roller means upon further rocking of said lever in said one direction, and means for rocking said lever stage-by-stage in said one direction in synchronism with the operation of said means reciprocating the cutting die.

7. In a bottle shaped container forming machine of the described character; the combination as set forth in claim 6, wherein said means for intermittently feeding sections of the stock sheet to said cutting station includes a feed table opening onto said anvil table, a feeding shaft supported for rotation above said feed table, means driven by said means reciprocating the cutting die for rotating said shaft, and transport members on said shaft formed with radially enlarged peripheral sections for feeding engagement with a stock sheet on said feed table, and wherein said means for rocking the pivoted lever includes a cam member on said feeding shaft rotatable with the latter and a cam follower on said pivoted lever for engagement with said cam member.

8. In a bottle shaped container forming machine of the described character; the combination as set forth in claim 3, wherein said segregating means includes a table assembly positioned to receive the unused portions and cut blanks advanced from said cutting stations, said table assembly having a hinged door portion opening upwardly and toward said cutting station, and means for actuating said door portion in synchronism with said advancing means so that said door is raised during the advancement of the unused portions to deflect such portions downwardly below said table assembly and is lowered to a position level with the remainder of the table assembly during the advancement of the cut blanks to support the latter.

9. In a bottle shaped container forming machine of the described character; the combination as set forth in claim 8, wherein said actuating means includes a rotatable cam, a vertically reciprocatable plunger movable by said rotatable cam and engaging said door portion from below, and means operatively associated with said cutting means for rotating said cam.

10. In a bottle shaped container forming machine of the described character; the combination as set forth in claim 3, wherein said means for turning the cut blank after segregation from the unused portion includes a support table having fence means engageable with the leading curved edge of the cut blank to limit the movement of the latter over said support table under the influence of said means for advancing the cut blank from the cutting station, pushing means travelling laterally across the path of advancement of the cut blank from the cutting station and toward the winding station for engagement with a cut blank positioned by said fence means at a point in back of the center of area of that blank so that the blank is simultaneously turned and propelled laterally toward the entrance end of said conveyor means, and driving mechanism for said pushing means operatively associated with said cutting means and said advancing means so that said pushing means travels across the path of travel of the cut blank after a cut blank has been advanced from the cutting station to a limited position against said fence means.

11. In a bottle shaped container forming machine of the described character; the combination as set forth in claim 10, wherein said means for turning the cut blank after segregation from the unused portion further includes fence means positioned on said support table to engage the turned blank after the latter is positioned for entry into said conveyor means and to prevent further turning of the blank, and wherein said support table is positioned below the level of the blank at the cutting station so that the cut blank may be conveniently advanced from said cutting station over the last mentioned fence means.

12. In a bottle shaped container forming machine of the described character; the combination as set forth in claim 11, wherein said means for turning the cut blank after segregation from the unused portion further includes means frictionally engageable with a cut blank advanced onto said support table to increase the turning effect of said pushing means.

13. In a bottle shaped container forming machines of the described character; the combination as set forth in claim 12, wherein said means frictionally engageable with a cut blank advanced onto said support table includes rollers above and below said support table rotating in a vertical plane which is inclined toward the entrance end of said conveyor means relative to the path of advancement of the cut blank from the cutting station, said rollers above and below the support table being positioned to engage a cut blank positioned against the first mentioned fence means at points ahead of the center of area of the blank.

14. In a bottle shaped container forming machine of the described character; the combination as set forth in claim 3, wherein said conveyor means includes a feed table positioned to receive the turned blanks and providing a surface over which the successive curved blanks may be forwarded, guide means at the opposite sides of said feed table engageable with the outer curved edge and trailing straight edge of each blank as the latter is forwarded toward the winding station, means stationed at the entrance end of said feed table to engage a turned blank and to advance the engaged turned blank along the initial portion of the feed table while simultaneously crimping the trailing end portion of the blank, means at a following station adjacent said feed table adapted to receive the advanced and crimped blanks and to further forward the blanks along the feed table while simultaneously applying glue to selected areas of the top surface of each blank, means adjacent said feed table for receiving the successive blanks from said glue-applying station and for advancing the glued blanks toward said inclined table of the turntable assembly, and pusher means engageable with the trailing edge portion of each blank to propel the successive blanks from said last mentioned advancing into the curved feed channel of said inclined table.

15. In a bottle shaped container forming machine of the described character; the combination as set forth in claim 14, wherein said means stationed at the entrance end of said feed table includes a back-up roller assembly extending through an opening in said feed table to engage the bottom surface of a blank extending onto said feed table, and a transport roller assembly rotatably mounted above said feed table and having a plurality of transport members each formed with a radially enlarged peripheral portion operative to engage the blank, said transport members being arranged with their enlarged peripheral portions angularly displaced relative to each other so that the enlarged peripheral portion of each transport member comes into operative position as the related part of the blank passes over said back-up roller assembly.

16. In a bottle shaped container forming machine of the described character; the combination as set forth in claim 15, including a registration device at the entrance end of said feed table to longitudinally position a blank prior to engagement thereof by said transport roll assembly, said registration device including a stop member movable onto the surface of said feed table in the path of travel of the blank and cam means on said transport roller assembly for actuating said stop member so that the latter is raised off said feed table before the first of said transport members effects engagement with the related part of the blank.

17. In a bottle shaped container forming machine of the described character; the combination as set forth in claim 16, wherein said transport roller assembly and said back-up roller assembly include cooperating, circumferentially grooved rollers positioned to crimp the trailing end portion of the forwarded blank along lines parallel to the trailing straight edge thereof.

18. In a bottle shaped container forming machine of the described character; the combination as set forth in claim 17, wherein said means for advancing the glued blanks includes a back-up roller assembly extending from below through a suitable opening in said feed table to engage the lower surfaces of the blanks moving from the glue applying station, and a shaft assembly rotatably mounted above said feed table and having a walker wheel formed with a continuous series of blades arranged in zig-zag relationship on the circumference for contact with the glued areas of the successive blanks.

19. In a bottle shaped container forming machine of the described character; the combination as set forth in claim 18, including driving means for said back-up roller assembly stationed at the entrance end of the feed table operatively connected to said cutting means, and common driving means for said transport roller assembly, said glue applying means, said walker wheel shaft assembly, said back-up roller assembly associated with the latter, and said pusher means, said common driving means being driven from said back-up roller assembly so that the respective operations are synchronized with the operation of said cutting means.

20. In a container forming machine of the described character, mechanism for feeding successive curved blanks to the tapering portions of mandrels moved to and from horizontally extending residence at a winding station;

said mechanism comprising a feed table extending parallel to the axis of a mandrel at the winding station, means for advancing successive curved blanks along said feed table, and a turntable assembly including an inclined table defining a curved feed channel opening tangential to the surface of the tapering portion of a mandrel at said winding station, means for supporting said turntable assembly from said feed table, said supporting means including a mounting ring extending from said feed table, a hub formed on said inclined table concentric with the center of curvature of said curved feed channel to extend loosely into said mounting ring, and angularly spaced, radial retaining bolts extending threadably through said mounting ring to bear against said hub for holding said hub in the ring while providing for adjustment of the path of movement of the curved blank relative to the mandrel at said winding station, said inclined table being positioned to receive the successive curved blanks from the exit end of said feed table, and means operative to propel a curved blank in said feed channel along a curved path as limited by said channel to advance the leading end of the blank tangentially to the surface of the tapering portion of a mandrel at said winding station.

21. In a container forming machine of the described character, mechanism for feeding successive curved blanks to the tapering portions of mandrels moved to and from horizontally extending residence at a winding station; said mechanism comprising a feed table extending parallel to the axis of a mandrel at the winding station, means for advancing successive curved blanks along said feed table, a turntable assembly including an inclined table defining a curved feed channel opening tangential to the surface of the tapering portion of a mandrel at said winding station, said inclined table being positioned to receive the successive curved blanks from the exit end of said feed table, and propelling means including a curving longitudinal groove formed in the bottom of said channel concentric with the latter, a swinging arm mounted at one end for oscillation in a plane parallel to said inclined table and about an axis extending through the center of curvature of said groove, a pusher finger depending from the free end of said arm to project at its lower end into said groove, and means for oscillating said swinging arm in synchronism with said means advancing the blanks along said feed table so that said pusher finger is positioned at the end of the feed channel remote from the winding station when a curved blank is advanced into said channel and is then moved along the channel to propel the blank to the winding station at which the leading end of the blank tangentially engages the surface of the tapering portion of the mandrel in residence at said station.

22. In a container forming machine of the described character; mechanism as set forth in claim 21, wherein said means for oscillating the swinging arm includes a continuously rotated shaft coaxial with the axis of oscillation of said arm and having a radially extending pin thereon, a clutch pin formed with a rounded end carried by said swinging arm and resiliently urged to a position in which said rounded end projects into the path of movement of said radial pin so that the latter is effective to drive the arm in the direction toward the winding station, stop means limiting the swinging movement of the arm in the direction toward the winding station so that said radial pin is driven past said resiliently urged clutch pin, spring means connected to said swinging arm operative to swing the latter away from the winding station when said radial pin moves past said clutch pin, and stop means limiting the swinging movement of said arm in the direction away from the winding station.

23. In a container forming machine of the described character; mechanism for preparing and feeding successive container forming blanks to a mandrel at a winding station comprising a source of stock, means for continuously drawing the stock sheet from said source and for feeding said stock sheet to a cutting station, means at said cutting station for cutting said stock sheet along spaced transverse lines to form successive rectangular blanks, means for forwarding the cut blanks from the cutting station and including a glue applying roller for applying glue to a predetermined area of each blank, a feed table for the cut blanks extending at right angles to the axis of the mandrel at the winding station and defining a feeding surface which is tangential to the surface of the mandrel at the bottom thereof, a guide member extending along one side of the portion of said feeding surface adjacent the winding station, and means adjustably supporting said guide member to provide for the directional and lateral orientation of said guide member relative to the mandrel, and intermittently operative means for advancing each cut blank, having glue thereon, along said feeding surface while effecting longitudinal and lateral registration of the blank, including a shaft rotatably mounted above said feed table, an advancing member on said shaft formed with radially extending blades on a portion of the periphery thereof in zig-zag arrangement to engage the glued portion of each blank and advance the latter from said glue applying roller, an opening in said feed table, a longitudinal registration device including a lever swingable below said table, a pusher finger pivoted on said swingable lever, spring means continuously urging said pusher finger to a position projecting through said opening and above said feeding surface for engagement with the trailing end of a blank, means for swinging said lever toward and away from the winding station, and means engageable with said pusher finger during the final increment of the movement of said swingable lever away from the winding station to retract said pusher finger below said feeding surface so that a blank may then be advanced over said opening without interference from said pusher finger.

24. In a container forming machine of the described character; mechanism for preparing and feeding successive container forming blanks to a mandrel at a winding station as set forth in claim 23; wherein said means for swinging said lever toward and away from the winding station includes a cam member on said shaft, an actuating lever pivotally supported for engagement with said cam member, adjustable link means connecting said actuating lever to said swingable lever to provide for varying the extent of the swingable movement of the latter, and spring means acting on said actuating lever to move the latter against said cam member in the direction tending to swing said swingable lever away from the winding station.

25. In a container forming machine of the described character; mechanism for preparing and feeding successive container forming blanks to a mandrel at a winding station as set forth in claim 24; wherein said intermittently operative means further includes a lateral registration member mounted above said feed table at the side of the latter opposite to said guide member for movement toward and away from said guide member, spring means continuously urging said registration member toward said guide member so that the registration member engages the adjacent side edge of an advancing blank and urges the latter against said guide member, a face cam member on said shaft, and cam follower means on said lateral registration member engageable with said face cam member so that the latter is operative to intermittently displace said lateral registration member to an inoperative position.

References Cited in the file of this patent

UNITED STATES PATENTS

| | | |
|---|---|---|
| 148,653 | Beecher | Mar. 17, 1874 |
| 1,107,348 | Powers | Aug. 18, 1914 |

(Other references on following page)

UNITED STATES PATENTS

| Number | Name | Date |
|---|---|---|
| 1,213,054 | Wright | Jan. 16, 1917 |
| 1,460,750 | Eppler | July 3, 1923 |
| 1,489,691 | Barbieri | Apr. 8, 1924 |
| 1,495,038 | Barbieri | May 20, 1924 |
| 1,540,336 | Huyett | June 2, 1925 |
| 1,738,271 | Andrews | Dec. 3, 1929 |
| 2,001,177 | Bodor | May 14, 1935 |
| 2,022,309 | Bodor | Nov. 26, 1935 |
| 2,099,934 | Joplin | Nov. 23, 1937 |
| 2,141,634 | Affelder | Dec. 27, 1938 |
| 2,248,535 | Meyer et al. | July 8, 1941 |
| 2,277,128 | Miller | Mar. 24, 1942 |
| 2,367,884 | Monroe | Jan. 23, 1945 |
| 2,456,699 | Hanson et al. | Dec. 21, 1948 |
| 2,471,447 | Perkins | May 31, 1949 |
| 2,521,110 | Wixon et al. | Sept. 5, 1950 |